(12) United States Patent
Kallfass et al.

(10) Patent No.: US 10,875,768 B2
(45) Date of Patent: Dec. 29, 2020

(54) OXYGEN GENERATOR AND METHOD OF CONTROLLING THE OXYGEN PRODUCTION RATE OF AN OXYGEN GENERATOR

(71) Applicant: DIEHL AVIATION GILCHING GMBH, Gilching (DE)

(72) Inventors: Christoph Kallfass, Schwaebisch Hall (DE); Andreas Hinterberger, Munich (DE); Fritz Kuehn, Garching (DE)

(73) Assignee: Diehl Aviation Gilching GmbH, Gilching (DE)

( * ) Notice: Subject to any disclaimer, the term of this patent is extended or adjusted under 35 U.S.C. 154(b) by 0 days.

(21) Appl. No.: 16/525,902

(22) Filed: Jul. 30, 2019

(65) Prior Publication Data

US 2020/0031665 A1 Jan. 30, 2020

(30) Foreign Application Priority Data

Jul. 30, 2018 (EP) .................................... 18186432

(51) Int. Cl.
*C01B 13/02* (2006.01)
*B01J 23/34* (2006.01)
(Continued)

(52) U.S. Cl.
CPC ......... *C01B 13/0211* (2013.01); *B01J 23/007* (2013.01); *B01J 23/26* (2013.01);
(Continued)

(58) Field of Classification Search
None
See application file for complete search history.

(56) References Cited

U.S. PATENT DOCUMENTS

| 2,035,896 A | 3/1936 | Kerwin |
| 6,007,736 A | 12/1999 | Zhang et al. |

(Continued)

FOREIGN PATENT DOCUMENTS

| DE | 19602149 A1 | 7/1997 |
| EP | 3323471 A1 | 5/2018 |

(Continued)

OTHER PUBLICATIONS

Stein, Florian: "Neue Anwendungen fuer ionische Fluessigkeiten in der Technik and Medizintechnik". Dissertsation by F. Stein, University of Rostock, Germany, 2014: English abstract on p. 8.

*Primary Examiner* — Melissa S Swain
(74) *Attorney, Agent, or Firm* — Laurence A. Greenberg; Werner H. Sterner; Ralph E. Locher

(57) ABSTRACT

An oxygen generator has a composition for generating oxygen and an acidic compound and/or a basic compound. The composition for generating oxygen includes an oxygen source, an ionic liquid, a metal oxide compound and/or a metal salt, and optionally a basic compound. The oxygen source is a peroxide compound, the ionic liquid is in the liquid state at least in a temperature range from $-10°$ C. to $+50°$ C., the metal oxide compound is an oxide of a single metal or of two or more different metals selected from the metals of groups 2 to 14 of the periodic table of the elements. The metal salt has a single metal or two or more different metals, and an organic and/or an inorganic anion. There is also described a method for controlling the oxygen production rate of the oxygen generator, and a device for generating oxygen in a controlled manner.

24 Claims, 32 Drawing Sheets

(51) Int. Cl.
    *B01J 23/26*           (2006.01)
    *B01J 23/62*           (2006.01)
    *G05D 11/13*          (2006.01)
    *B01J 23/75*           (2006.01)
    *B01J 23/72*           (2006.01)
    *B01J 23/00*           (2006.01)
    *B01J 23/745*         (2006.01)

(52) U.S. Cl.
    CPC ............. *B01J 23/34* (2013.01); *B01J 23/628* (2013.01); *B01J 23/72* (2013.01); *B01J 23/745* (2013.01); *B01J 23/75* (2013.01); *G05D 11/138* (2013.01)

(56) References Cited

U.S. PATENT DOCUMENTS

| | | |
|---|---|---|
| 2011/0073331 A1 | 3/2011 | Xu |
| 2018/0141810 A1 | 5/2018 | Kuehn et al. |
| 2018/0142361 A1 | 5/2018 | Kuehn et al. |

FOREIGN PATENT DOCUMENTS

| | | |
|---|---|---|
| EP | 3323782 A1 | 5/2018 |
| EP | 3323783 A1 | 5/2018 |
| JP | S61227903 A | 10/1986 |
| WO | 8602063 A1 | 4/1986 |
| WO | 9743210 A1 | 11/1997 |

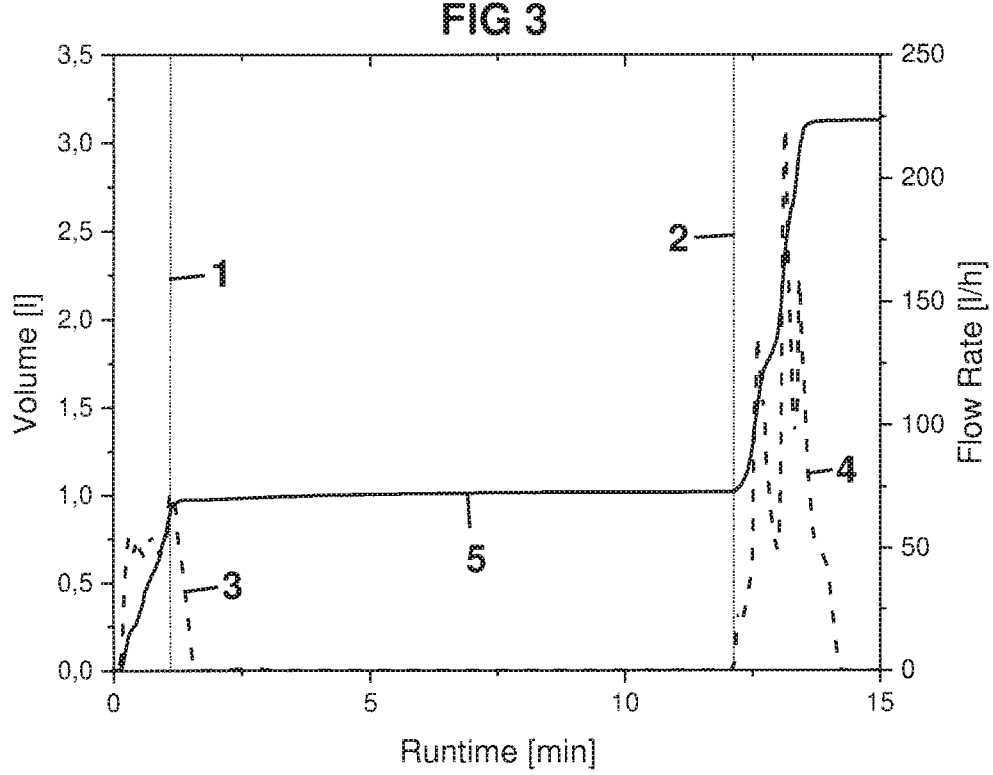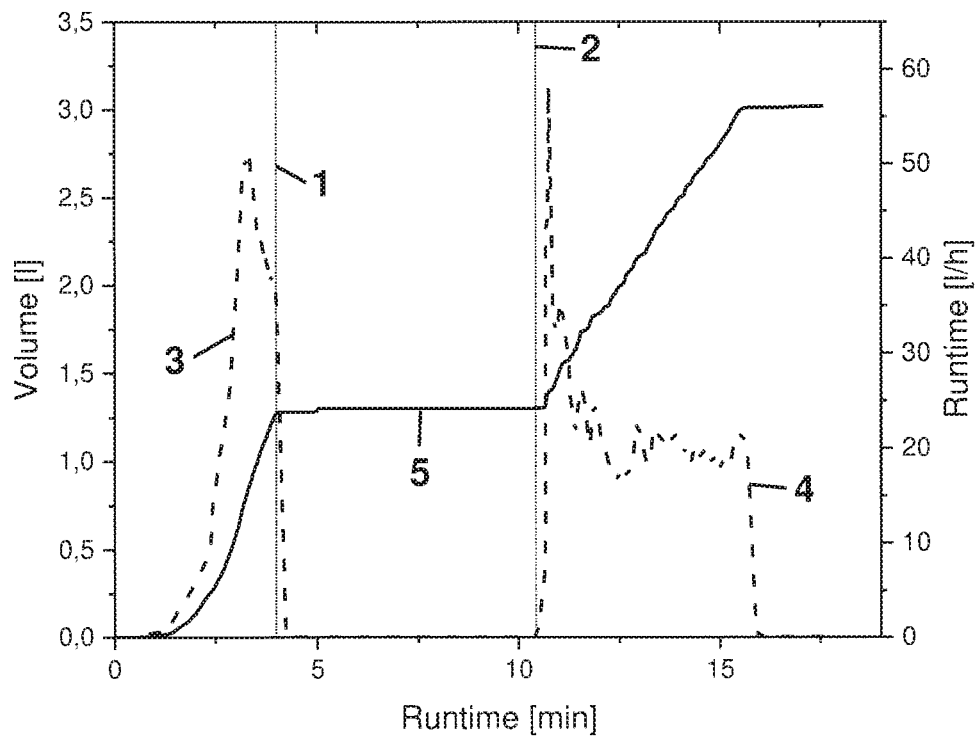

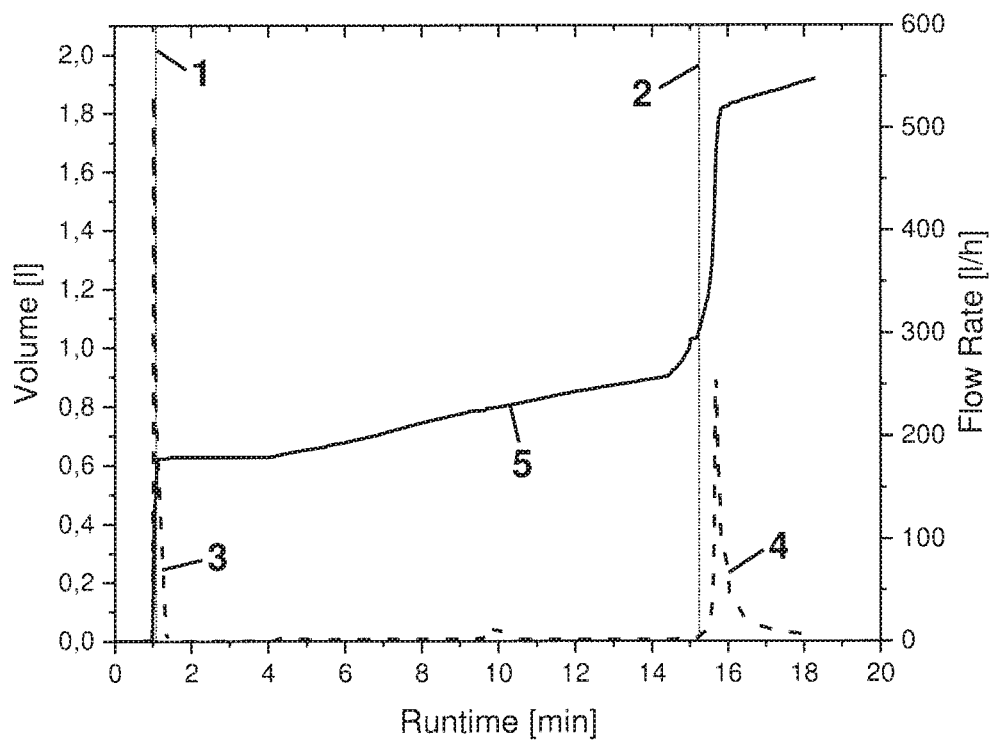
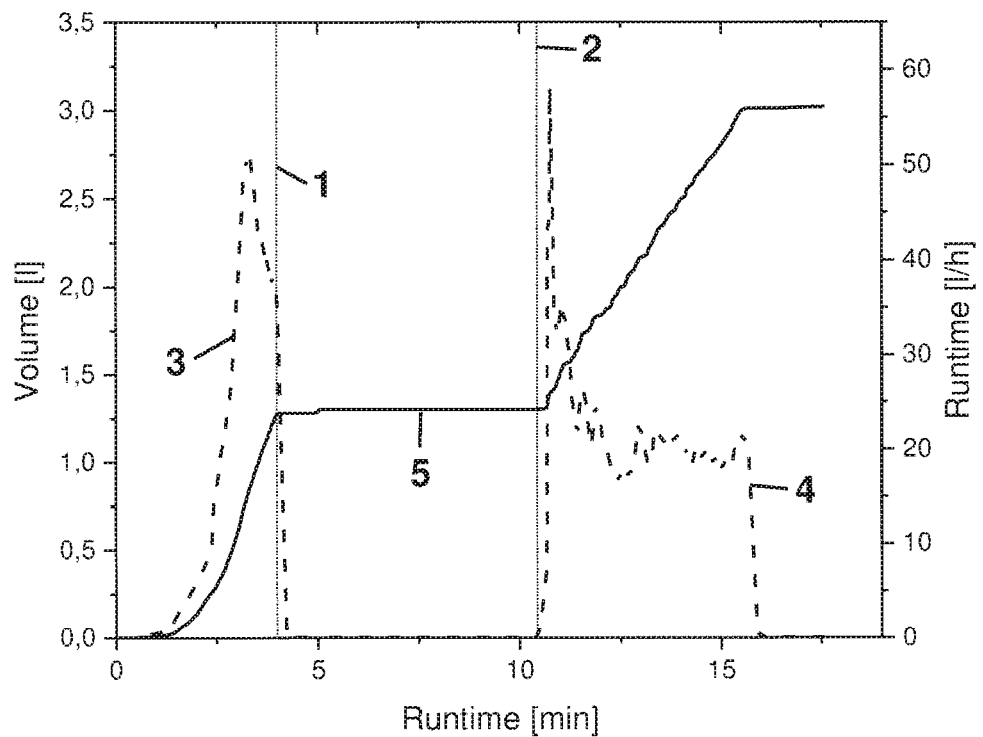

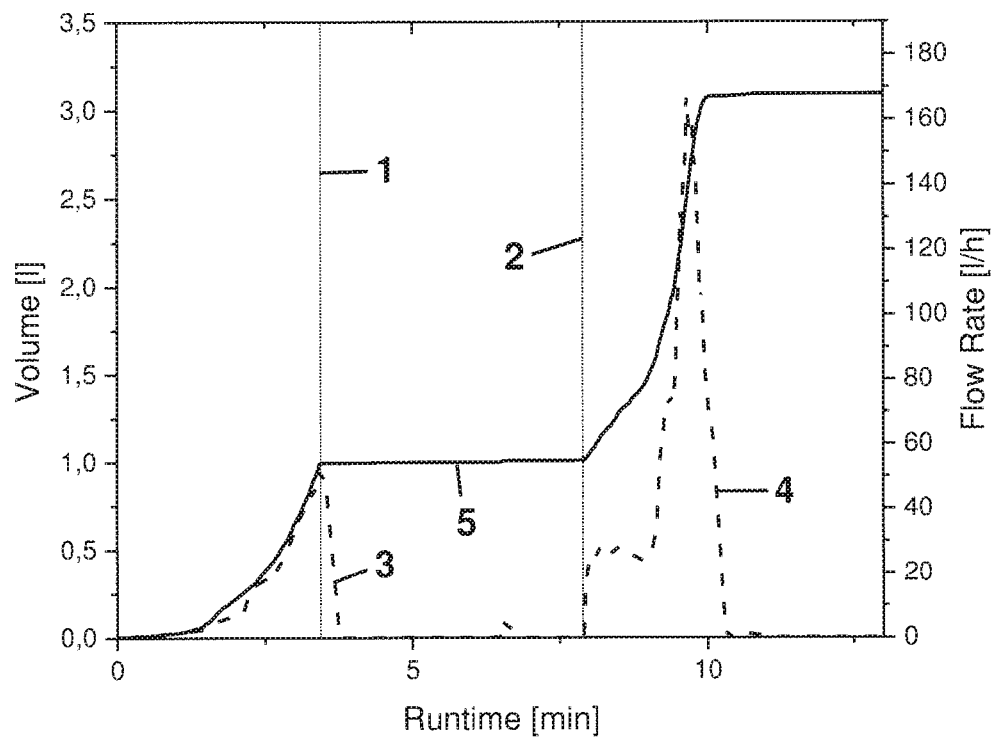
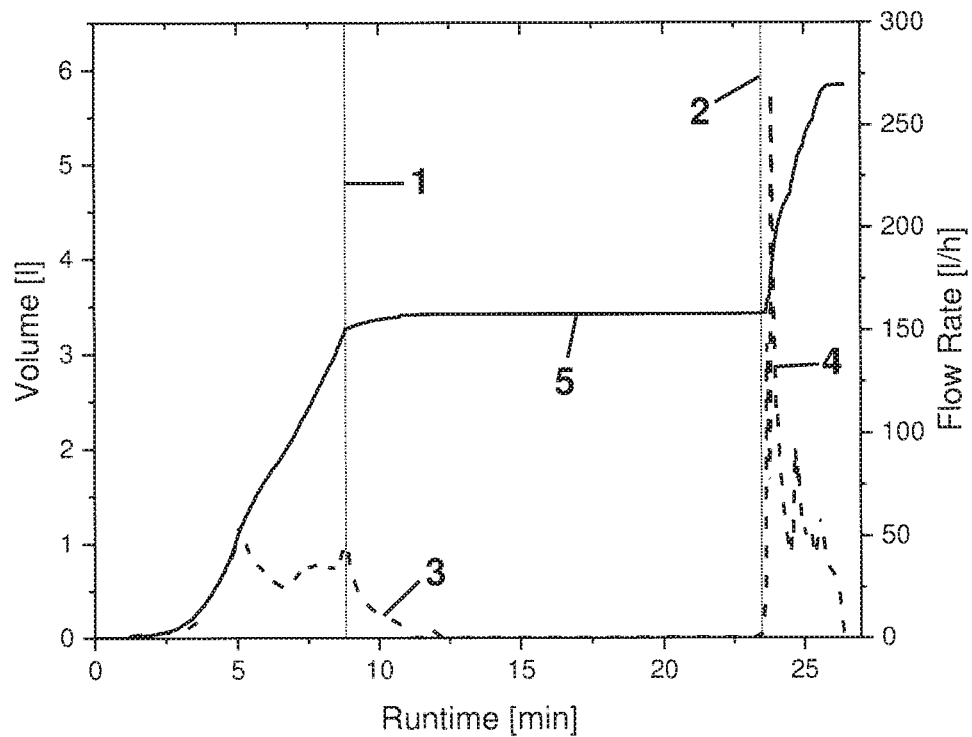

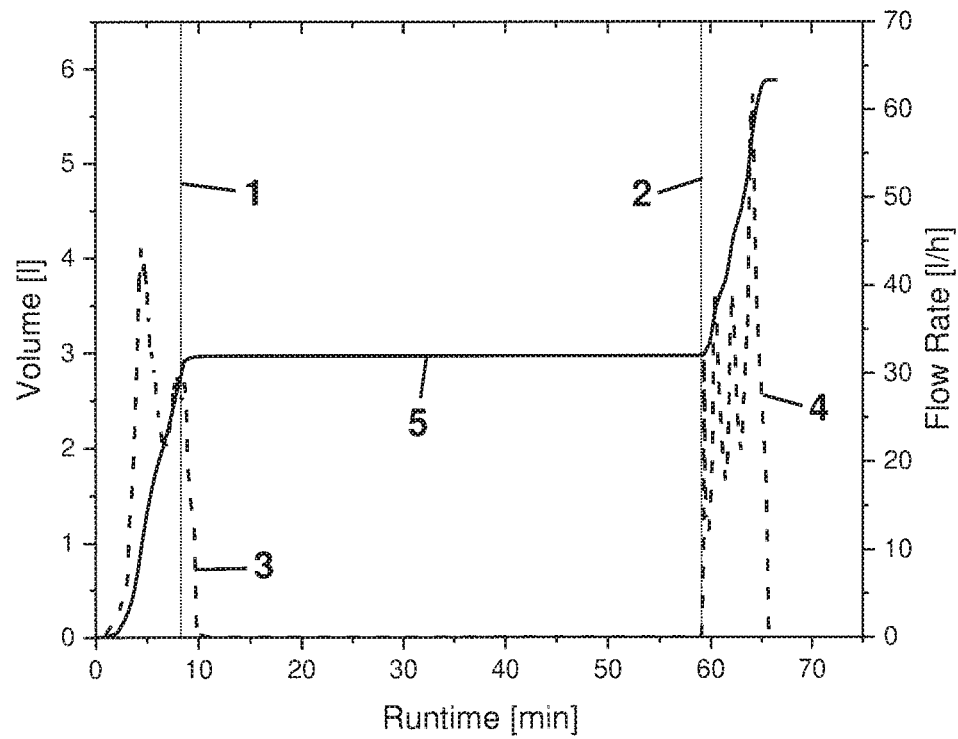
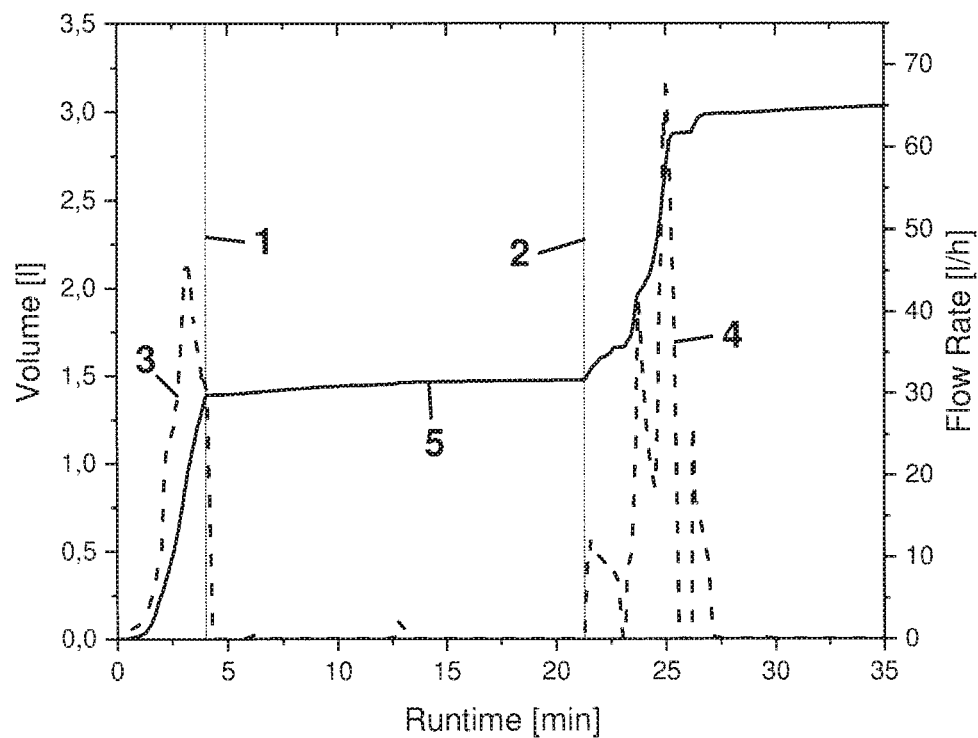

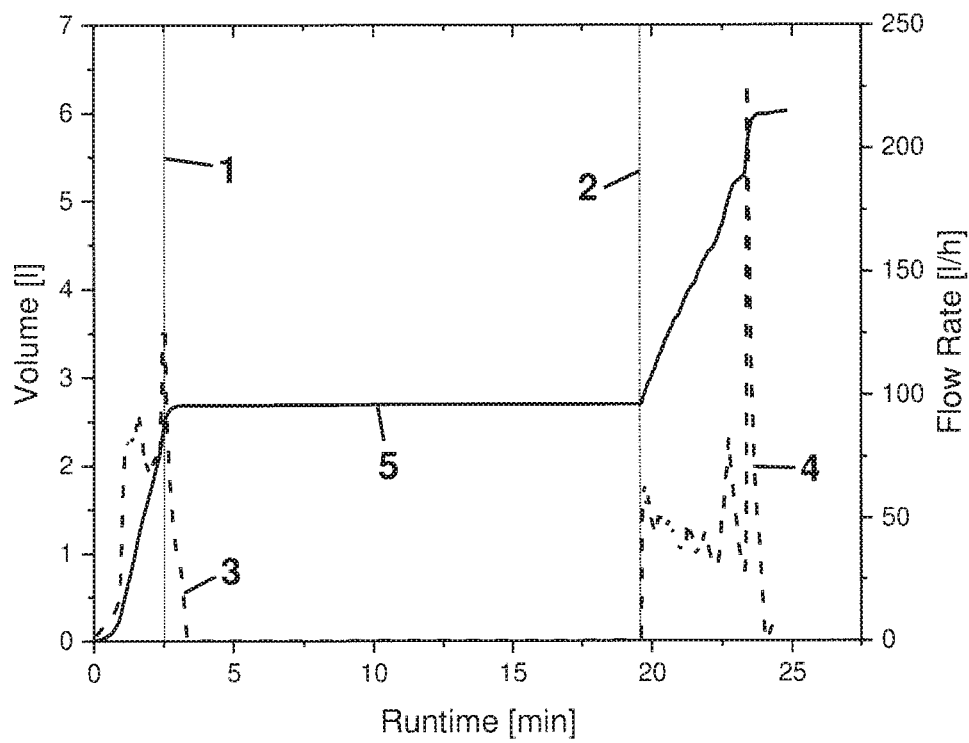
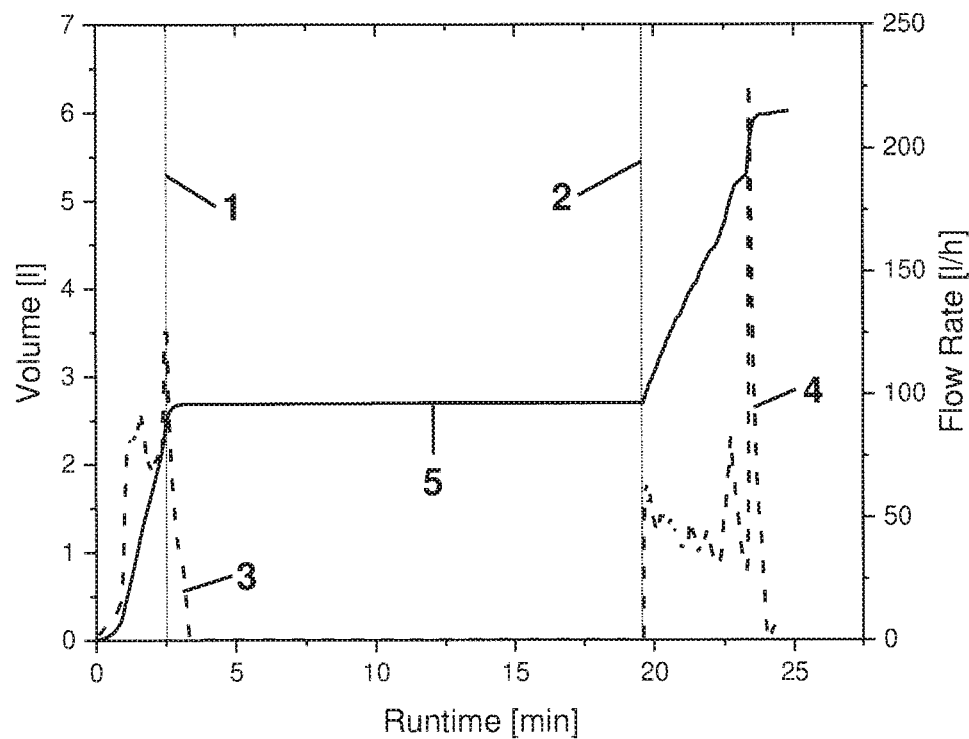

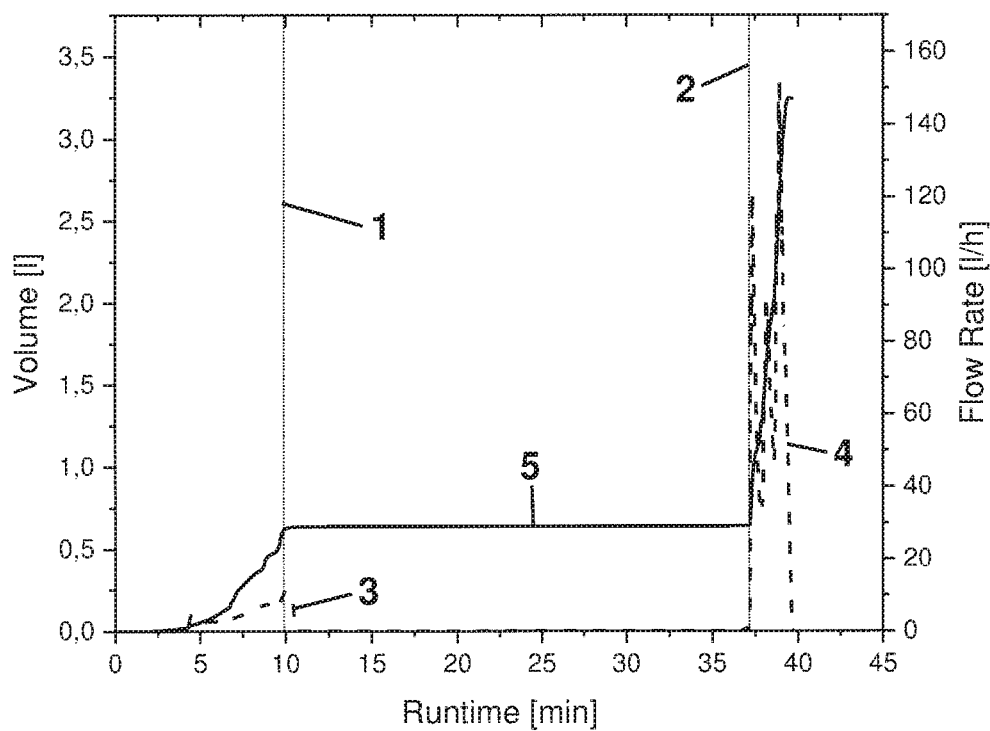
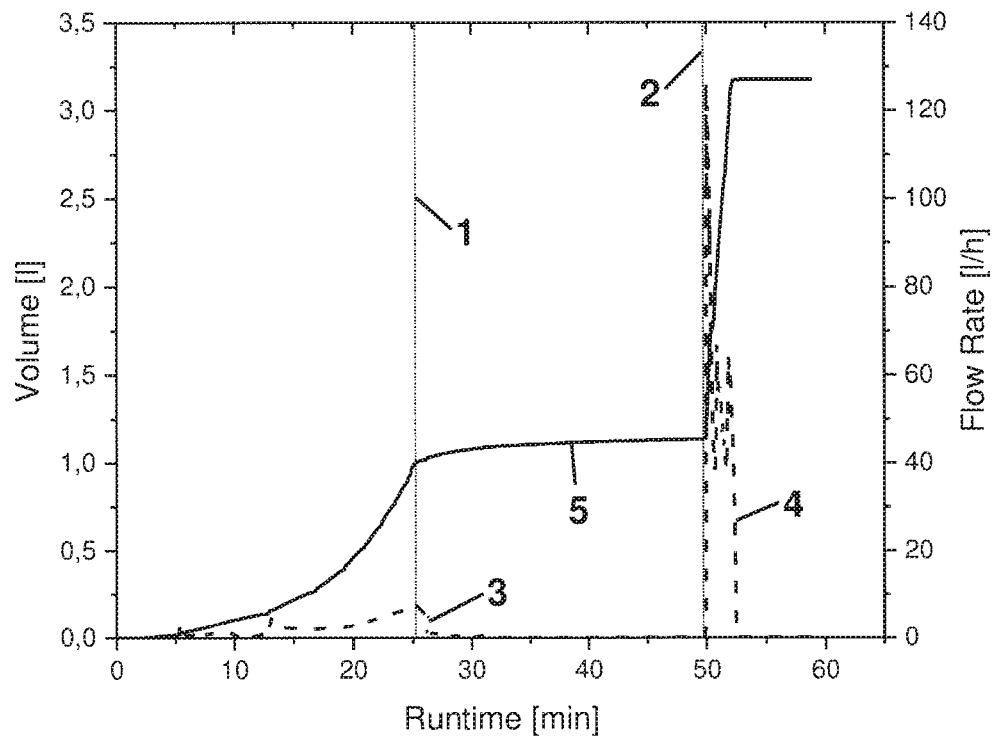

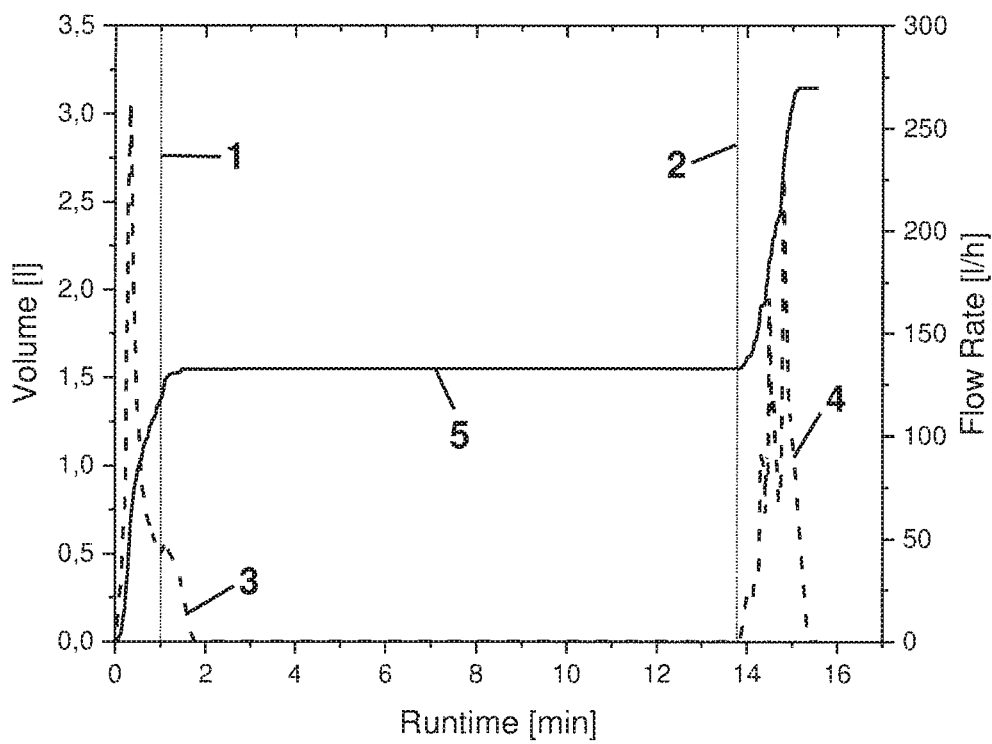
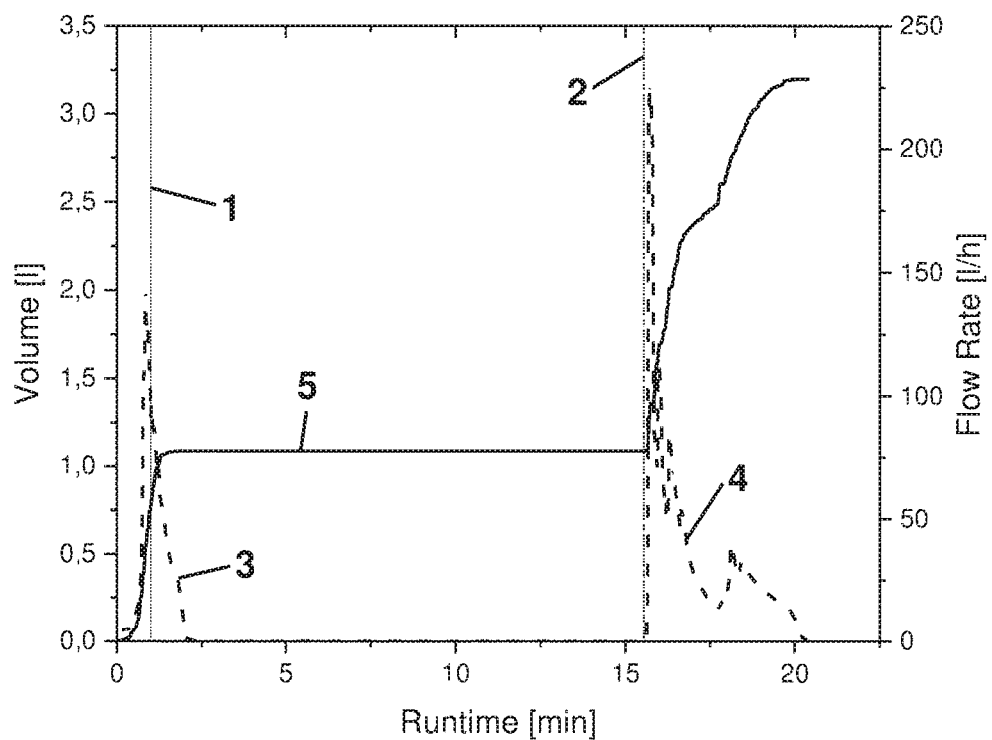

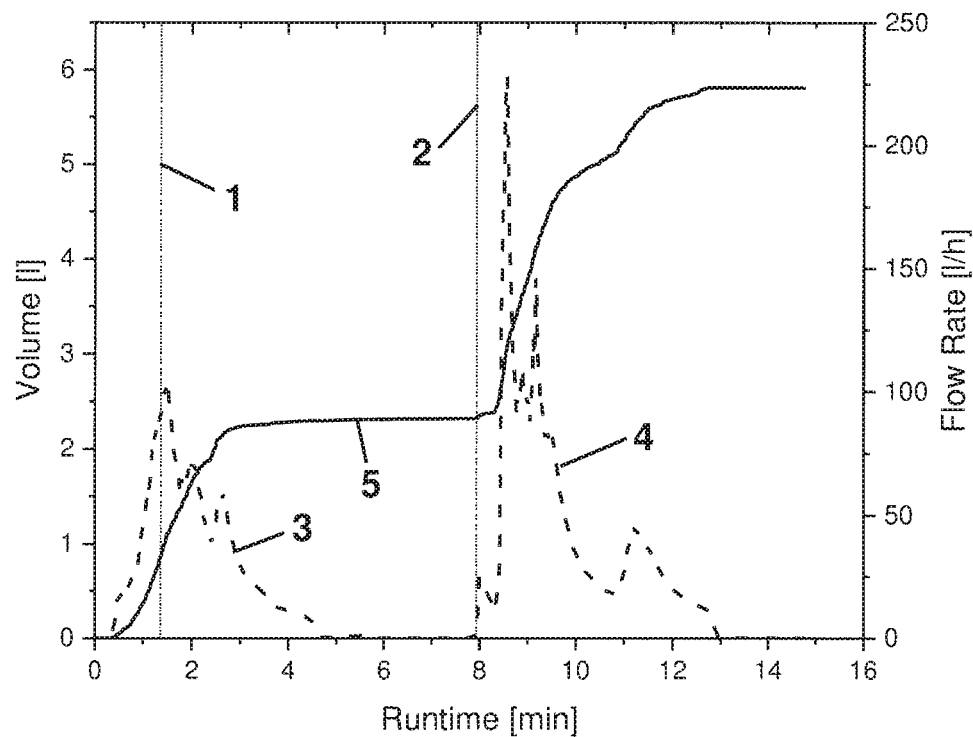
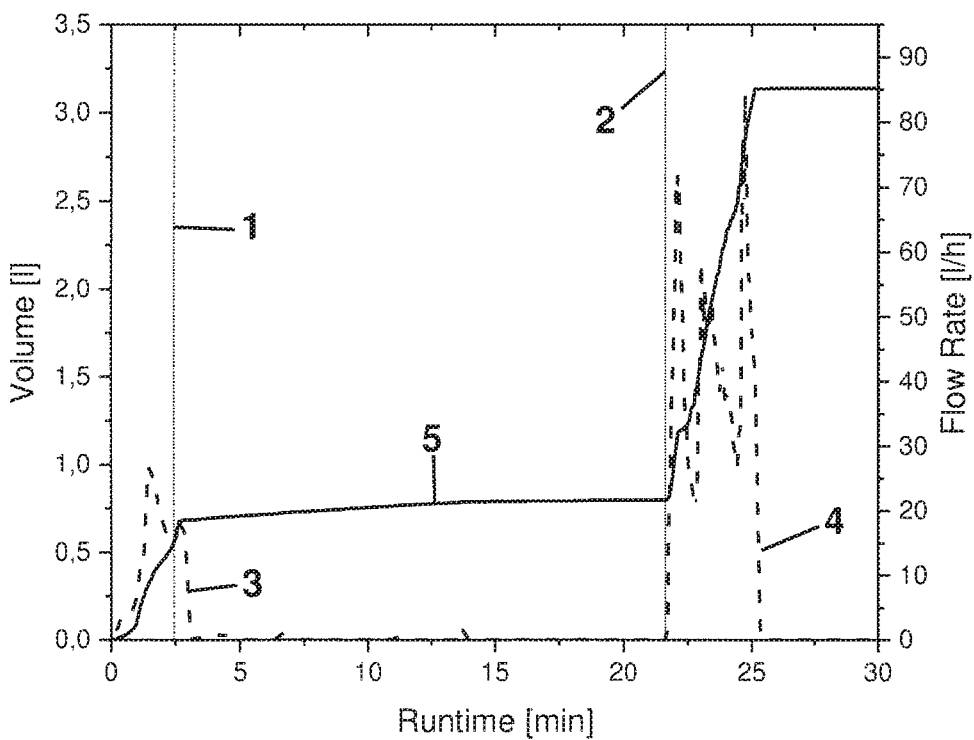

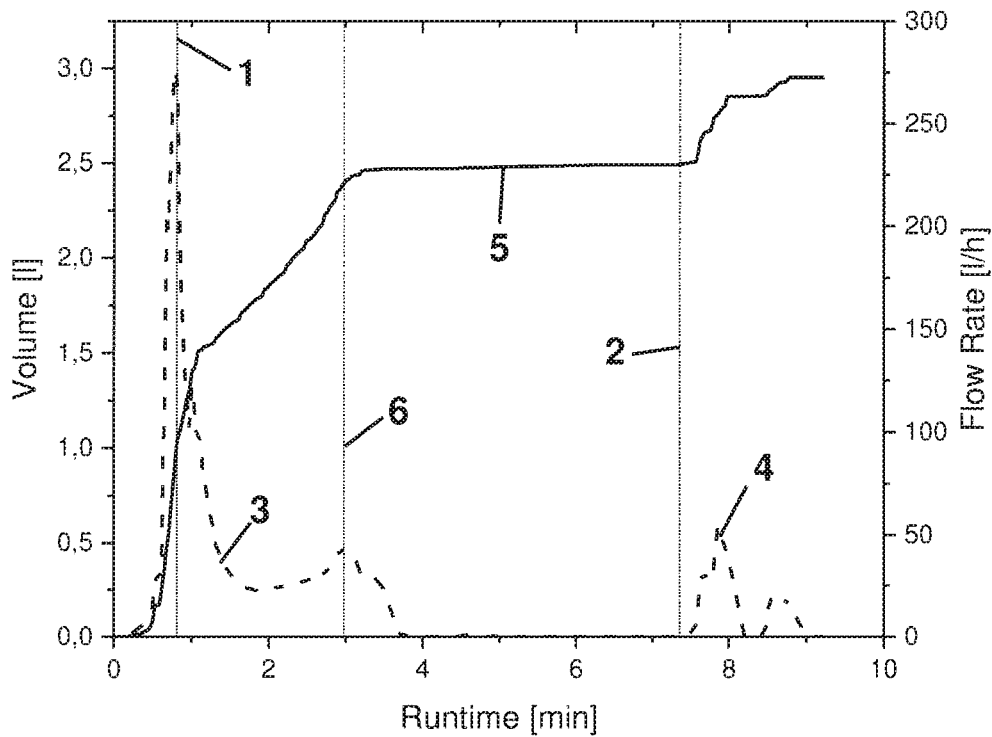
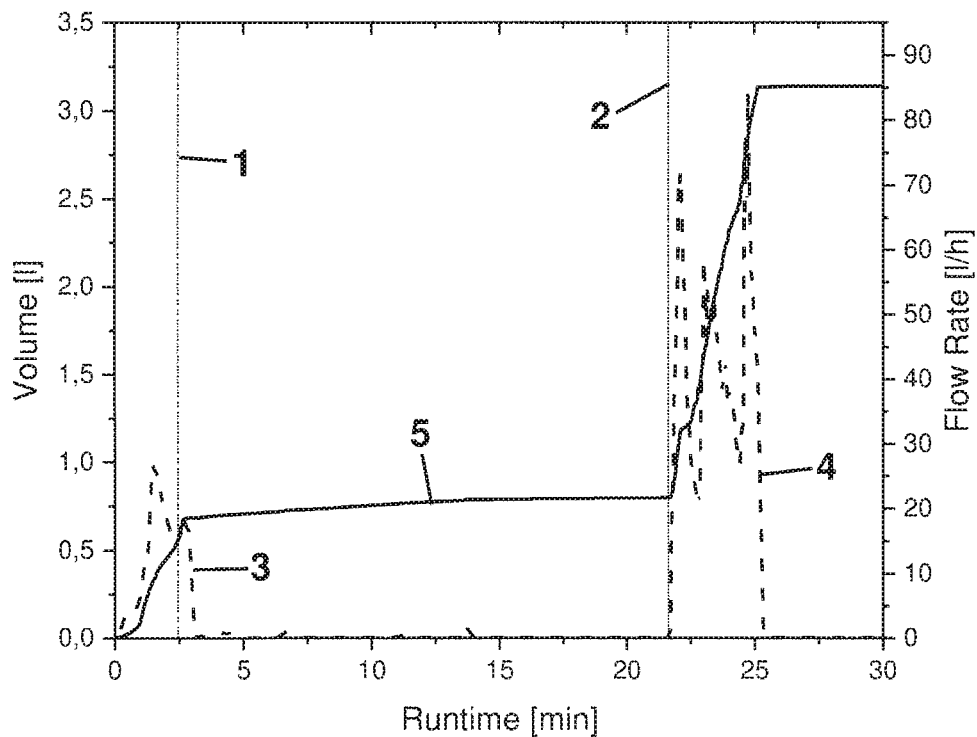

OXYGEN GENERATOR AND METHOD OF CONTROLLING THE OXYGEN PRODUCTION RATE OF AN OXYGEN GENERATOR

CROSS-REFERENCE TO RELATED APPLICATION

This application claims the priority, under 35 U.S.C. § 119, of European patent application EP 18 186 432.3, filed Jul. 30, 2018; the prior application is herewith incorporated by reference in its entirety.

BACKGROUND OF THE INVENTION

Field of the Invention

The present invention relates to oxygen generators, methods and devices for generating oxygen in a controlled manner.

Humans cannot exist without oxygen. In many environments, however, oxygen supply is insufficient or there is a risk of emergency situations involving a shortage of oxygen, for example in SAR (search and rescue) applications, in submarines, in mines, in space capsules, and also in airplanes. Air pressure decreases with increasing flight altitude, and at cruising altitudes of many aircraft, in particular long-haul aircraft, sufficient oxygen for human beings is no longer available. Therefore, the aircraft cabins are pressurized in order to ensure sufficient oxygen supply. In case of a sudden de-pressurization of an aircraft cabin, oxygen masks must be available, which supply oxygen to crew and passengers until the aircraft reaches a flight level where sufficient oxygen is available.

The oxygen which is provided by these emergency systems is typically produced by so-called "chlorate candles" or "oxygen candles." These chemical oxygen generators contain chlorates or perchlorates as an oxygen source, as well as various additives such as fuels, catalysts, binders and moderators. Chlorate candles are often in the form of cylindrical rods, i.e. they have a shape similar to candles. Chlorate candles are disclosed, for example, in U.S. Pat. No. 6,007, 736 and its counterpart International patent publication WO 97/43210.

Known chlorate candles require high temperatures at which the oxygen production takes place. Namely, in chlorate candles the decomposition reaction requires a temperature of about 350° C. for initiation, and the oxygen is released at temperatures between 450° C. and 700° C. Therefore, effective heat insulation of chlorate candles is required, resulting in a weight and size penalty. Furthermore, decomposition of chlorates and perchlorates tends to produce toxic side products, in particular chlorine, which must be removed from the oxygen stream, thus additionally adding size and weight. Furthermore, there is a risk of system failure. In chlorate candles the reaction zone is normally liquid, i.e. there is a liquid zone traveling through the candle, starting at the point of ignition. The liquid zone within the otherwise solid candle considerably destabilizes the candle such that mechanical shocks or even slight vibrations may result in separation of the candle portions, thus interrupting the heat transfer and discontinuing the chlorate or perchlorate decomposition. In such a case, oxygen production may be interrupted, although oxygen is still vitally needed.

A different type of chemical oxygen generators uses peroxides as oxygen sources, for example sodium percarbonate, sodium perborate, or an urea adduct of hydrogen peroxide. Decomposition of the peroxides yields oxygen, and the decomposition reaction can be started by contacting the peroxide compounds with an appropriate enzyme or transition metal catalyst. Chemical oxygen generators of this type are disclosed in U.S. Pat. No. 2,035,896, in international patent publication WO 86/02063, in Japanese patent publication JP 61227903, and in German published patent application DE 196 02 149.

Many known peroxide-based oxygen generators use water for providing contact between the peroxides and the catalysts. Unfortunately, water freezes at 0° C. and, therefore, no oxygen can be produced below 0° C., while some emergency systems must be operational below 0° C. Also, the decomposition of peroxides in aqueous solutions may result in vehement effervescing of the reaction mixture. As a consequence, an oxygen generating device containing a peroxide-based oxygen generating composition must have a complicated structure.

A new concept is disclosed in U.S. patent application publication US 2018/0141810 A1 and its counterpart European publication EP 3 323 782 A1. This document discloses compositions and methods for generating oxygen from peroxides in ionic liquids. The compositions comprise at least one oxygen source, at least one ionic liquid, and at least one metal oxide compound, wherein the oxygen source comprises a peroxide compound, the ionic liquid is in the liquid state at least in a temperature range from −10° C. to +50° C., and the metal oxide compound is an oxide of one single metal or of two or more different metals, said metal(s) being selected from the metals of groups 2 to 14 of the periodic table of the elements.

The use of ionic liquids provides for distinct advantages. Ionic liquids are environmentally friendly compounds. They are liquid over a broad temperature range and exhibit a low to non-existing vapor pressure. Moreover, these liquids are non-flammable and are even used as flame retardants which makes them highly attractive for the use in an air plane. Many of their other properties can be varied by changing their molecular structures. Their high heat capacity enables them to dissipate the reaction heat from the decomposition of peroxides to oxygen.

The compositions disclosed in US 2018/0141810 A1 and EP 3 323 782 A1 produce breathable oxygen, for instance for human breathing, reliably and continuously in a wide temperature range, also including subfreezing temperatures. The oxygen produced is at a low temperature, such as below 150° C. or even lower. It is typically free from toxic or otherwise noxious components such as chlorine or carbon monoxide. The compositions are capable to produce oxygen over an extended period of time and with a significant flow rate, and promptly upon demand.

However, all oxygen generating compositions described above have in common that they produce oxygen at a flow rate inherent to the particular system, and once the decomposition reaction of the oxygen source has started, it cannot be stopped until all of the oxygen source has been decomposed. Thus, there may be situations, where oxygen is produced although it is not needed, while later, when oxygen may be needed again, there is no longer any oxygen available. Such situations occur frequently in SAR applications, in mining, submarine and space flight applications. If in a conventional oxygen generator the oxygen production is interrupted, intentionally or unintentionally (as may happen in chlorate oxygen candles), there is no possibility to restart the oxygen production. Furthermore, under phases of particularly severe physical strain of a user, there is temporarily more oxygen required, but prior art oxygen generators cannot provide an increased oxygen supply for a desired period of time.

SUMMARY OF THE INVENTION

It would be beneficial to provide a solution to at least some of the problems of the prior art outlined above and to provide an oxygen generator allowing to modify the oxygen production rate, i.e. to increase or decrease the oxygen flow rate. It would be also beneficial to provide an oxygen generator which allows to stop the oxygen production when no oxygen is needed, and to restart the oxygen production whenever oxygen is needed. It would be particularly beneficial, when stoppage and restart of the oxygen production could be performed several times.

In addition, it would be beneficial if this oxygen generator would be capable of producing breathable oxygen reliably and continuously in a wide temperature range, and preferably including subfreezing temperatures. The oxygen produced should be at a low temperature, such as below 150° C. or even lower. Desirably, the oxygen should be free from toxic or otherwise noxious components such as chlorine or carbon monoxide, so that it is suitable for human breathing. It would be also beneficial if the oxygen generator would be capable to produce oxygen over an extended period of time and with a significant flow rate, and preferably promptly upon demand.

With the above and other objects in view there is provided, in accordance with the invention, an oxygen generator comprising a composition for generating oxygen, the composition including an oxygen source, an ionic liquid, and a metal oxide compound and/or a metal salt; and an acidic compound and/or a basic compound; or if the ionic liquid is an acidic compound or contains an acidic compound, a composition for generating oxygen, the composition including an oxygen source, the ionic liquid, a metal oxide compound and/or a metal salt, and a basic compound, and, optionally, a further acidic compound and/or a further basic compound; and wherein:

the oxygen source is a peroxide compound;

the ionic liquid is in the liquid state at least in a temperature range from −10° C. to +50° C.;

the metal oxide compound is an oxide of a single metal or of two or more different metals selected from the metals of groups 2 to 14 of the periodic table of the elements; and the metal salt includes a single metal or two or more different metals, and one or both of an organic anion and/or an inorganic anion.

Exemplary embodiments of the invention include an oxygen generator comprising a composition for generating oxygen comprising an oxygen source, an ionic liquid and a metal oxide compound and/or a metal salt, and an acidic compound and/or a basic compound, or, if the ionic liquid is an acidic compound or contains an acidic compound, a composition for generating oxygen comprising an oxygen source, an ionic liquid, a metal oxide compound and/or a metal salt, and a basic compound, and, optionally, a further acidic compound and/or a further basic compound, wherein the oxygen source comprises a peroxide compound, the ionic liquid is in the liquid state at least in a temperature range from −10° C. to +50° C., the metal oxide compound is an oxide of one single metal or of two or more different metals, said metal(s) being selected from the metals of groups 2 to 14 of the periodic table of the elements and the metal salt comprises one single metal or two or more different metals, and an organic and/or an inorganic anion.

Further exemplary embodiments of the invention include a method for controlling the oxygen production rate of an oxygen generating composition, the method comprising providing an oxygen source, providing an ionic liquid, providing a metal oxide compound and/or a metal salt, generating oxygen by contacting the oxygen source, the ionic liquid and the metal oxide compound and/or the metal salt, and modifying the oxygen production rate by adding an acidic compound and/or a basic compound to the oxygen source, the ionic liquid and the metal oxide compound and/or the metal salt, or, if the ionic liquid is an acidic compound or contains an acidic compound, providing an oxygen source, providing an ionic liquid, providing a metal oxide compound and/or a metal salt, providing a basic compound, generating oxygen by contacting the oxygen source, the ionic liquid, the metal oxide compound and/or the metal salt and the basic compound and, optionally, modifying the oxygen production rate by adding a further acidic compound and/or a further basic compound to the oxygen source, the ionic liquid, the metal oxide compound and/or the metal salt and the basic compound, wherein the oxygen source comprises a peroxide compound, the ionic liquid is in the liquid state at least in the temperature range from −10° C. to +50° C., the metal oxide compound is an oxide of a single metal or of two or more different metals, said metal(s) being selected from the metals of groups 2 to 14 of the periodic table of the elements, and the metal salt comprises one single metal or two or more different metals and an organic and/or an inorganic anion.

Further exemplary embodiments of the invention include a device for generating oxygen in a controlled manner, the device comprising a reaction chamber housing a composition for generating oxygen, the composition comprising a combination of constituents consisting of an oxygen source, an ionic liquid, and a metal oxide compound and/or a metal salt, at least one dosing device housing an acidic compound and/or at least one dosing device housing a basic compound, the dosing device(s) being adapted to introduce the acidic compound and/or the basic compound into the reaction chamber, means for maintaining at least one of the oxygen source, the ionic liquid and the metal oxide compound and/or the metal salt physically separated from the remaining constituents, means for establishing physical contact of the oxygen source, the ionic liquid and the metal oxide compound and/or the metal salt, and means for allowing oxygen to exit the reaction chamber, or, if the ionic liquid is an acidic compound or contains an acidic compound, a reaction chamber housing a composition for generating oxygen, the composition comprising a combination of constituents consisting of an oxygen source, an ionic liquid, and a metal oxide compound and/or a metal salt, means for allowing oxygen to exit the reaction chamber, at least one dosing device housing a basic compound and, optionally, at least one dosing device housing an acidic compound, the dosing device(s) being adapted to introduce the basic compound and, optionally, the acidic compound into the reaction chamber, wherein the metal oxide compound is an oxide of an single metal or of two or more different metals, said metal(s) being selected from the metals of groups 2-14 of the periodic table of the elements, and wherein the metal salt comprises a single metal or two or more different metals, and an organic and/or an inorganic anion, the oxygen source comprises a peroxide compound, and the ionic liquid is in the liquid state at least in the temperature range from −10° C. to +50° C.

Technical implementations of the inventive concept as claimed herein include a composition for generating oxygen, an oxygen generator comprising a composition for generating oxygen, an oxygen generator comprising a composition for generating oxygen, a method for generating oxygen, a method for controlling the oxygen production rate of the oxygen generator, and a device for generating oxygen, optionally in a controlled manner.

In the method of this invention, oxygen is produced from the composition for generating oxygen, and the oxygen production rate is controlled by adding, when control is desired, either an acidic compound or a basic compound, depending on whether the oxygen production rate shall be decreased or increased, stopped, started or restarted.

As can be easily understood, the constituents of the composition for generating oxygen correspond with one another, irrespective of which technical implementation of the invention is contemplated. Therefore, any disclosure provided for a particular implementation, such as composition, oxygen generator, method or device is analogously applicable to the other implementations of this invention.

A composition for generating oxygen, an oxygen generator (including a composition for generating oxygen and an acidic compound and/or a basic compound), a method for controlling the oxygen production rate, and a device for generating oxygen in the sense of this invention is a composition, generator, method or device intended for generating oxygen, while any composition, generator, method or device yielding oxygen as a side reaction product does not constitute a composition, a generator, a method or device in the sense of this invention.

The compositions for generating oxygen according to exemplary embodiments of the invention comprise at least the following constituents: a peroxide compound as an oxygen source, a metal oxide compound as a catalyst triggering the oxygen release reaction, and an ionic liquid as a carrier for providing contact between the oxygen source and the catalyst, and for dissipating the heat generated during the peroxide decomposition reaction.

The compositions for generating oxygen according to further exemplary embodiments of the invention comprise at least the following constituents: a peroxide compound as an oxygen source, a metal salt as a catalyst triggering the oxygen release reaction, and an ionic liquid as a carrier for providing contact between the oxygen source and the catalyst, and for dissipating the heat generated during the peroxide decomposition reaction. In exemplary embodiments the metal salt is soluble in the ionic liquid. The term "soluble" means that essentially the complete amount of the metal salt of a particular oxygen generating composition can be dissolved in the amount of ionic liquid used in this particular composition. The ratio of oxygen source:ionic liquid:metal salt can be varied, however, due to space constraints and also for economical reasons it is advantageous to keep the amount of ionic liquid reasonably small. Therefore, for the purpose of this invention, "soluble" means a solubility of at least 10 nmol (nanomol) metal salt in 1 g ionic liquid. In further exemplary embodiments, the metal salt is only partially soluble or insoluble in the ionic liquid. Typically, the metal salt catalysts have at least some solubility, i.e. are partially soluble. Metal oxide catalysts are, at most, partially soluble, i.e. have a solubility of less than 10 nmol/1 g ionic liquid, or insoluble, i.e. have a solubility of less than 0.1 nmol metal oxide/1 g ionic liquid.

Peroxide compounds such as hydrogen peroxide adduct compounds, can be decomposed in ionic liquids by contacting them with metal salts or metal oxide compounds in a similar manner as metal salts in aqueous solution, but without the disadvantages of reactions catalyzed by metal salts in aqueous solutions. Exemplary compositions of this invention do not contain any water. In particular, decomposition of peroxide compounds in ionic liquids yields breathable oxygen at low temperatures, and without requiring bulky thermal insulations for the oxygen generating device.

This can be attributed to the use of ionic liquids as a medium for providing contact between the oxygen source and the catalyst.

Ionic liquids are salts in the liquid state. Therefore, any salt that melts without decomposing or vaporizing yields an ionic liquid. Sometimes, salts which are liquid below the boiling point of water are considered as ionic liquids. Technically interesting are in particular those ionic liquids which are in the liquid state at relatively low temperatures such as at room temperature or even below room temperature.

An ionic compound is considered as an ionic liquid herein when it is in the liquid state at least in a temperature range from −10° C. to +50° C. (at standard pressure of $10^5$ Pa). Exemplary ionic liquids are in the liquid state at least from −30° C. to +70° C., and further exemplary ionic liquids are in the liquid state in an even broader temperature range such as from −70° C. to +150° C.

The properties of ionic liquids can be modified and adapted to the particular needs by varying the chemical structure. Typically, ionic liquids are thermally stable, have wide liquid regions, a high heat capacity and nearly no vapor pressure. Most of them are incombustible. They can be even used as flame retardants. Reference is made to published patent application No. US 2011/0073331 A1 disclosing ionic liquid flame retardants, and quoting literature disclosing preparation methods (cf. para. [0127]).

As indicated above, the ionic liquids used in the present invention should be in the liquid state at a low temperature, such as down to −10° C., or down to −30° C. or even below. Such ionic liquids are salts consisting of organic cations and organic or inorganic anions, and both cations and anions are bulky. In exemplary embodiments, they are bulky and asymmetric. As a general rule, the melting temperature decreases with increasing bulkiness and decreasing symmetry of cations and anions. Combinations of highly bulky and asymmetric cations and anions may not freeze down to temperatures as low as −120° C. Many ionic liquids are available which are liquid at −70° C. and above.

Suitable cations are, for example, imidazolium, pyrrolidinium, ammonium, pyridinium, pyrazolium, piperidinium, phosphonium, and sulfonium cations. The cations may or may not have substituents. Particularly, the cations may have one or more substituents, for example alkyl side chains such as methyl, ethyl or butyl side chains. The substitution may be symmetric or asymmetric.

Suitable anions include, for example, dimethylphosphate, methylsulfate, ethylsulfate, trifluoromethylsulfonate, bis(trisfluoromethylsulfonyl)imide, chloride, bromide, iodide, tetrafluoroborate, hexafluorophosphate, acetate, and but-3-enoate. In the case of "small" anions such as chloride, bromide, and iodide, particularly bulky cations can be selected, in order to provide for the desired low temperature liquidity.

Some exemplary ionic liquids are
1-butyl-3-methylimidazoliumdimethylphosphate
([BMIM][PO$_4$Me$_2$]), 1,3-dimethylimidazoliumdimethylphosphate ([MMIM][PO$_4$Me$_2$]),
1-butyl-3-methylimidazoliumacetate ([BMIM][OAc]),
1-ethyl-3-methylimidazoliumethylsulfate ([EMIM][EtSO$_4$]),
tetraethylammonium but-3-enoate ([NEt$_4$][but-3-enoat]),
1,3-dimethylimidazoliummethylsulfate ([MMIM][MeSO$_4$]),
1-butyl-3-methylimidazoliummethylsulfate ([BMIM][MeSO$_4$]),
1,1-butylmethylpyrrolidiniumbis(trifluoromethylsulfonyl)imide ([BMPyrr][TFSI]),
butyltrimethylammoniumbis(trifluoromethylsulfonyl)imide ([Me$_3$BuN][TFSI]),
1-butyl-3-methylimidazoliumtrifiuoromethanesulfonate ([BMIM][OTf]),
1-ethyl-3-methylimidazolium acetate ([EMIM][OAc]),
tetrabutylammonium arginine ([TBA][Arg]),
trimethylammonium propanesulfonic acid hydrogen sulfate ([TMPSA][HSO$_4$]),
1-(4-sulfobutyl)-3-methylimidazolium hydrogen sulfate ([SBMIM][HSO$_4$]),
diethylmethylammonium methansulfonate ([NEt$_2$MeH][MeSO$_3$]), and
1-ethyl-3-methylimidazolium hydrogen sulfate ([EMIM][HSO$_4$]).

[NEt$_4$][but-3-enoate], [EMIM][OAc] and [TBA][Arg] are basic ionic liquids, and [TMPSA][HSO$_4$], [SBMIM][HSO$_4$], [NEt$_2$MeH][MeSO$_3$] and [EMIM][HSO$_4$] are acidic ionic liquids.

Further ionic liquids can be found in "*Neue Anwendungen für ionische Flüssigkeiten in der Technik und Medizintechnik*" (Novel Applications for Ionic Liquids in Technology and Medical Technology), Dissertation by F. Stein, University of Rostock, Germany, 2014, at p. 43.

The ionic liquids usable herein are, however, not particularly limited. It is only required that they be liquid and stable (i.e. they do not decompose) in the desired temperature range. Of course, the ionic liquids should not react with any constituents of the oxygen generating composition, the acidic compound and the basic compound. The ionic liquids may be used singly or in combinations of two or more. Thus, in exemplary embodiments, this invention uses ionic liquid formulations containing one or more ionic liquids and, optionally, contain further additives which do not detrimentally interfere with the peroxide decomposition reaction.

As an oxygen source, peroxide compounds, in particular solid hydrogen peroxide adduct compounds are used. Solid hydrogen peroxide adduct compounds constitute suitable and stable substituents for liquid hydrogen peroxide, are easily storable, long term stable and safe to work with. Exemplary oxygen sources are alkali percarbonates, e.g. sodium percarbonate (Na$_2$CO$_3$×1.5H$_2$O$_2$), alkali perborates, e.g. sodium perborate (NaBO$_3$×4H$_2$O, NaBO$_3$×H$_2$O), and urea hydrogen peroxide (UHP). In UHP, the components urea and hydrogen peroxide are present in a molar ratio of about 1:1.

The peroxide compounds are not particularly limited, as long as they are stable under usual storage conditions. Exemplary peroxide compounds are stable also at elevated temperatures, for example in the vicinity of a fire. The peroxide compounds can be soluble or partially soluble or insoluble in the ionic liquids. The peroxide compounds can be used singly or in combinations of two or more, i.e. as oxygen source formulations containing, optionally, further additives which do not detrimentally interfere with the peroxide decomposition reaction.

In exemplary embodiments, the decomposition reaction of the peroxide compound is catalyzed by metal oxide compounds. Suitable metal oxide compounds are, for example, those which are known to catalyze the decomposition of peroxides in aqueous solutions.

Generally speaking, metal oxide compounds catalyzing peroxide decomposition in compositions comprising ionic liquids, are oxides of one single metal or of two or more different metals. The metal or the metals are selected from the group which consists of the elements of groups 2 to 14 of the periodic table of the elements. The periodic table has 18 groups (see: Pure and Applied Chemistry, vol. 60, 3, pages 431-436).

In exemplary embodiments the metal oxide compound is an oxide of one or more metals belonging to the fourth period of the periodic table of the elements. In an alternative embodiment, the metal oxide compound is an oxide comprising, in addition to one or more metals belonging to the fourth period, one or more metal(s) belonging to the second and/or third and/or fifth and/or sixth period(s).

In further exemplary embodiments, the metal oxide compound is an oxide of one or more metals belonging to the fifth and/or sixth period of the periodic table.

In all embodiments, each metal may be present in one single oxidation state or in different oxidation states.

The metal oxide compounds may be used singly or in combinations of two or more different metal oxide compounds, i.e. metal oxide formulations may be used comprising one or more metal oxide compounds and, optionally, further additives which do not detrimentally interfere with the peroxide decomposition reaction.

Many metal oxide compounds are transition metal oxides. Such transition metal oxides may contain one transition metal, and may as well contain two or more different transition metals. Each transition metal may be present in one single or in different oxidation states. In addition, the transition metal oxides may contain one or more non-transition metals. The transition metal oxides may be used singly or in combinations of two or more different transition metal oxides.

Exemplary transition metal oxide catalysts include oxides of manganese, cobalt, chromium, silver and copper, and mixed oxides of iron and another transition metal such as cobalt, copper, nickel, or manganese, mixed oxides of manganese and another transition metal such as cobalt, nickel, or copper, and mixed oxides containing nickel and cobalt.

As regards structural types, spinel type oxides, ilmenite type oxides, and perovskite type oxides may be specifically mentioned.

As exemplary compounds catalyzing the peroxide decomposition reaction may be mentioned: manganese (IV) oxide (MnO$_2$), cobalt (II, III) oxide (Co$_3$O$_4$), chromium (VI) oxide (CrO$_3$), silver (I) oxide (Ag$_2$O), Fe (II, III) oxide (Fe$_3$O$_4$), and copper (II) oxide (CuO), as well as spinel type mixed metal oxides like cobalt iron oxide (Co$_x$Fe$_{3-x}$O$_4$, with $0 \leq x \leq 3$), such as CoFe$_2$O$_4$, Co$_{1.5}$Fe$_{1.5}$O$_4$, and Co$_2$FeO$_4$, copper iron oxide (Cu$_x$Fe$_{3-x}$O$_4$, with $0 \leq x \leq 3$), such as CuFe$_2$O$_4$, nickel iron oxides (Ni$_x$Fe$_{3-x}$O$_4$, with $0 \leq x \leq 3$), manganese iron oxides (Mn$_x$Fe$_{3-x}$O$_4$, with $0 \leq x \leq 3$), copper manganese oxides such as Cu$_{1.5}$Mn$_{1.5}$O$_4$, cobalt manganese oxides such as Co$_2$MnO$_4$, nickel cobalt oxides such as NiCo$_2$O$_4$, as well as ilmenite type oxides like nickel manganese oxides such as NiMnO$_3$ or oxides containing more than two transition metals, for example LaFe$_x$Ni$_{1-x}$O3, with $0 \leq x \leq 1$, or La$_x$Sr$_{1-x}$MnO$_3$ with $0 \leq x \leq 1$.

Transition metals as understood herein are those elements which have an incomplete d-shell, or which may form ions having an incomplete d-shell, including lanthanides and actinides. It goes without saying that only oxides may be used which undergo a redox reaction with hydrogenperoxide. Zincoxide, for example, may not be used as a catalyst, although zinc constitutes a transition metal. It is, however, stressed that the metal oxide compounds are not limited to transition metal oxides. Rather, the metal oxide compounds may be oxides of main group metals, such as $PbO_2$, or oxides of main group metals and transition metals in combination, such as $La_{0.5}Sr_{0.5}MnO_3$.

In further exemplary embodiments, the decomposition reaction of the peroxide compound is catalyzed by metal salts. The metals salts comprise one single metal or two or more different metals and an organic and/or an inorganic anion.

In exemplary embodiments the metal salt is soluble in the ionic liquid, and in further exemplary embodiments, the metal salt is not soluble or partially soluble in the ionic liquid. Selecting a metal salt and an ionic liquid such, that the desired amount of metal salt is completely dissolved in the desired amount of ionic liquid provides the advantage that the metal salt and the ionic liquid can be provided in the form of one single homogeneous component. The solutions are stable, and even during long term storage, no sedimentation takes place. Providing the metal salt and the ionic liquid in the form of a homogeneous solution simplifies the design of oxygen generating devices, results in a higher activity of the mixture of catalyst and ionic liquid and, in turn, reduces the required amount of catalyst. A further advantage is the prolonged shelve life of the compositions, as compared to compositions containing the catalyst in suspended form.

The solubility behavior of metal salts in ionic liquids is, at least roughly, analogous to the solubility behavior in water. Therefore, if readily soluble catalysts are desired, metal salts known to be readily soluble in water can be used, and if hardly soluble catalysts are desired, metal salts known to be hardly soluble in water can be used.

As regards inorganic anions, anions such as chlorides, sulfates, carbonates, hydroxides, and nitrates are known to provide water solubility, and as regards organic anions, anions such as chelating agents, i.e. anions forming coordination complexes with metals, are known to provide water solubility.

Accordingly, in exemplary embodiments, the metal salt is at least one selected from the group consisting of chlorides, sulfates, carbonates, hydroxides, and nitrates. Metal salts having these inorganic anions are generally well soluble in many ionic liquids.

In further exemplary embodiments, the metal salt is at least one selected from the group consisting of acetates, acetylacetonates, oxalates, tartrates, and citrates. Metal salts having these chelating organic anions are generally well soluble in many ionic liquids.

In further exemplary embodiments, a fraction of the organic or inorganic anions is substituted by oxygen anions, thus yielding mixed catalysts, i.e. metal compounds comprising both oxidic anions and inorganic anions or organic anions, or even metal compounds comprising oxidic anions, inorganic anions, and organic anions.

The metal salt, in exemplary embodiments, contains one single metal, optionally in different oxidation states, the metal being selected from the metals belonging to groups 5 to 14 and periods 4 to 6 of the periodic table of the elements. The periodic table has 18 groups and 7 periods (see: Pure and Applied Chemistry, 1988, Vol. 60, No. 3, pages 431-436).

In further exemplary embodiments, the metal salt comprises at least two different metals, with at least one metal being selected from the metals belonging to groups 5 to 14 and periods 4 to 6 of the periodic table of the elements.

The metal salts may be used singly or in combinations of two or more different metal salts. The salts may have different cations or different anions or both different cations and different anions. The metal salts may be provided in the form of metal salt formulations, i.e. the catalyst may be one single metal salt or a combination of two metal salts, and optionally additives which do not detrimentally interfere with the peroxide decomposition reaction may also be contained.

The metal salt comprises at least one metal in an oxidation state allowing a reaction with hydrogen peroxide, assuming basic conditions in aqueous reaction media, i.e. the redox potential of the oxidation state transition which the metal undergoes during the catalytic reaction must allow a reaction with hydrogen peroxide.

Exemplary metal salt catalysts include salts of vanadium, chromium, manganese, iron, cobalt, copper, molybdenum, ruthenium, iridium, and lead.

Exemplary oxidation states are +2 for vanadium, +3 and +6 for chromium, +2 and +3 for manganese, +2 and +3 for iron, +2 for cobalt, +1 and +2 for copper, +6 for molybdenum, +3 for ruthenium, +3 for iridium, and +2 and +4 for lead.

As exemplary inorganic salts catalyzing the peroxide decomposition reaction may be mentioned: $PbCl_2$, $CrCl_3$, $CoCl_2$, $COCO_3$, $CoSO_4$, $IrCl_3$, $MnCl_2$, $VCl_2$, $KCr(SO_4)_2$, $FeCl_3$, $CuCl_2$, and their respective hydrates.

As exemplary organic salts catalyzing the peroxide decomposition reaction may be mentioned: $Mn(OAc)_2$, $Mn(OAc)_3$, $Mn(acac)_2$, $Mn(oxalate)$, $Pb(acac)_2$, $Pb(OAc)_2$, $Pb_3(citrate)_2$, $Pb(tartrate)$, $Co(OAc)_2$, $MoO_2(acac)_2$, $Ru(acac)_3$, and their respective hydrates. OAc means acetate and acac means acetylacetonate.

The above listed inorganic and organic salts constitute active catalysts in many ionic liquids.

The acidic compounds according to exemplary embodiments are inorganic acids, organic acids, acidic salts, or ionic liquids with acidic properties.

Examples for inorganic acids are hydrochloric acid, sulfuric acid, nitric acid and phosphoric acid; examples for organic acids are acetic acid, succinic acid, citric acid, and benzoic acid, examples for acidic salts are sodium hydrogen sulfate and monopotassium phosphate, and examples for ionic liquids with acidic properties are 1-ethyl-3-methylimidazolium hydrogen sulfate ([EMIM][$HSO_4$]), trimethylammonium propanesulfonic acid hydrogen sulfate ([TMPSA][$HSO_4$]), 1-(4-sulfobutyl)-3-methylimidazolium hydrogen sulfate ([SBMIM][$HSO_4$]) and diethylmethylammonium methanesulfonate ([$NEt_2MeH$][$MeSO_3$]).

In the oxygen generators of the present invention, the acidic compounds ("acids") may be provided in liquid form. Liquid forms include the pure liquid compound, concentrated or diluted solutions of liquids or gases (for example concentrated or diluted solutions of hydrochloric acid or acetic acid), and solutions and dispersions of solid acids or acidic salts in a solvent or dispersing agent.

Exemplary solvents or dispersing agents are water and ionic liquids. Ionic liquids having high viscosity can be used, for example, in admixture with ionic liquids having lower viscosity.

In exemplary embodiments, the acidic compounds are provided in solid form, for example in the form of a powder, of pellets or beads. Acidic compounds that may be provided in a solid form are solid acids such as succinic acid, citric acid or benzoic acid, and acidic salts such sodium hydrogen sulfate or monopotassium phosphate.

The basic compounds ("bases") according to exemplary embodiments are provided in solid form, for example in the form of a powder, of pellets or of beads. According to further exemplary embodiments the basic compounds are provided in the form of the pure liquid compounds, or in the form of concentrated or diluted solutions or dispersions in a solvent or dispersing agent.

Exemplary solvents or dispersing agents are water and ionic liquids. Ionic liquids having high viscosity may be used, for example, in admixture with ionic liquids having lower viscosity.

Exemplary bases are hydroxides such as potassium hydroxide, sodium hydroxide and calcium hydroxide, basic salts such as potassium phosphate, sodium acetate, sodium percarbonate, potassium carbonate, basic oxides such as calcium oxide, and ionic liquids with basic properties, such as 1-ethyl-3-methylimidazolium acetate ([EMIM][OAc]), tetrabutylammonium arginine ([TBA][Arg]), and tetrabutylammonium but-3-enoate ([NEt$_4$][but-3-enoate]).

In the context herein, the term "composition" includes embodiments wherein all constituents of the composition are mixed, i.e. are in contact with each other, as well as embodiments wherein the constituents are not in contact with each other, i.e. are physically separated, or wherein at least not all constituents are in contact with each other. It must be considered that a mixture comprising an ionic liquid, a peroxide compound dissolved or dispersed therein, and a catalyst, is not stable, unless the ionic liquid is an acidic compound or contains an acidic compound. When ionic liquids without acidic functionality, or even ionic liquids having basic functionality are used, the decomposition of the peroxide compound starts as soon as the catalyst comes into contact with the peroxide compound, in the ionic liquid, or at least shortly thereafter. Therefore, the constituents of the composition for generating oxygen must be stored in a condition wherein the catalyst cannot trigger the release of oxygen from the peroxide compound. This can be achieved by providing the composition for generating oxygen in the form of a "kit of parts", i.e. as a combination of at least two components, the two components comprising the at least one oxygen source, the at least one ionic liquid, and the at least one catalyst compound. In the at least two components, at least one of the three constituents (the oxygen source(s), the ionic liquid(s), and the catalyst is not in contact with the other constituents of the composition for generating oxygen.

For example, the composition may comprise a first component and a second component, the first component comprising the oxygen source and the catalyst, and the second component comprising the ionic liquid.

The situation is different when the ionic liquid has acidic properties or when the ionic liquid contains a compound having acidic properties.

The inventors have found that the peroxide decomposition reaction does not proceed in an acidic environment. Therefore, in compositions for generating oxygen which contain an acidic ionic liquid, the peroxide, the catalyst and the ionic liquid do not need to be stored physically separated, but can be in contact with each other, e.g. mixed. The inventors have further found, that in compositions for generating oxygen comprising an acidic ionic liquid, the peroxide decomposition reaction can be started by adding a basic compound to the ionic liquid, the catalyst and the peroxide.

Accordingly, an exemplary composition for generating oxygen comprises an oxygen source, a metal oxide compound and/or a metal salt as a catalyst, an acidic ionic liquid (an ionic liquid which is acidic itself, or which is acidic because it contains an acidic compound) and a basic compound. The oxygen source comprises a peroxide compound, the ionic liquid is in the liquid state at least in a temperature range from −10° C. to +50° C., the metal oxide compound is an oxide of a single metal or of two or more different metals, said metal(s) being selected from the metals of groups 2-14 of the periodic table of the elements, and the metal salt comprises one single metal or two or more different metals, and an organic and/or an inorganic anion.

An exemplary oxygen generator comprises the above composition for generating oxygen and a further acidic compound and/or a further basic compound.

A further exemplary composition for generating oxygen comprises an oxygen source, a metal oxide compound and/or a metal salt as a catalyst, and an ionic liquid (a neutral ionic liquid or a basic ionic liquid, i.e. an ionic liquid which is basic itself or which is basic because it contains a basic compound). The oxygen source comprises a peroxide compound, the ionic liquid is in the liquid state at least in a temperature range from −10° C. to +50° C., the metal oxide compound is an oxide of a single metal or of two or more different metals, said metal(s) being selected from the metals of groups 2-14 of the periodic table of the elements, and the metal salt comprises one single metal or two or more different metals, and an organic and/or an inorganic anion.

A further exemplary oxygen generator comprises the above composition for generating oxygen and an acidic compound and/or a basic compound.

The compositions for generating oxygen may comprise from about 10 to 80 weight % of one or more oxygen sources, from about 20 to 80 weight % of one or more ionic liquids, and from more than 0 up to about 15 weight % of one or more metal salt catalysts or from more than 0 up to about 20 weight % of one or more metal oxide catalysts. In exemplary embodiments, the oxygen source or mixture of oxygen sources constitutes from 50 to 70 weight %, the ionic liquid or mixture of ionic liquids constitutes from 30 to 60 weight %, and the catalyst or mixture of catalysts constitutes from more than 0 up to about 10 weight % of the composition. In some embodiments, the oxygen source may constitute up to 98 weight % of the composition, with the amounts of ionic liquid and catalyst being present in amounts as low as about 1% by weight, each. Optionally, further constituents may be present, for example silicon dioxide (as a heat sink) and/or radical scavengers, such as resorcinol, 2-methylhydrochinone, eugenol, phenol, and 4-propylphenol, all of which reduce the peroxide decomposition rate. In some embodiments, the amounts of such additional constituents do not exceed about 20 weight % of the composition. All constituents together add up to 100 weight %.

In the case of acidic ionic liquids, exemplary compositions also comprise a basic compound. The basic compound is added in an amount which is at least sufficient to neutralize the ionic liquid. The amounts of the remaining constituents of the compositions are lessened proportionally.

An exemplary method for generating oxygen comprises providing an oxygen source, providing an ionic liquid (neutral or basic), providing a metal oxide compound and/or a metal salt, and generating oxygen by contacting the oxygen source, the ionic liquid and the metal oxide compound and/or the metal salt. The oxygen source is a peroxide compound, the ionic liquid is in the liquid state at least in the temperature range from −10° C. to +50° C., the metal oxide compound is an oxide of one single metal or of two or more different metals, said metal(s) being selected from the metals of groups 2 to 14 of the periodic table of the elements, the metal salt comprises one single metal or two or more different metals, and an organic and/or inorganic anion.

According to an exemplary embodiment, the catalyst and the ionic liquid are provided as a first component, the oxygen source is provided as a second component, and the step of contacting comprises mixing the first component and the second component.

According to a further exemplary embodiment, the oxygen source and the catalyst are provided as a first component, the ionic liquid is provided as a second component, and the step of contacting comprises mixing the first component and the second component.

When the oxygen source and the catalyst are provided as one single component, i.e. in an admixed state, both the oxygen source and the catalyst should be thoroughly dried before mixing. Otherwise, the oxygen source will be decomposed inadvertently. In the absence of any mediator, for example water or an ionic liquid, the solid oxygen source and the solid catalyst constitute long-term stable mixtures.

A further exemplary method for generating oxygen comprises providing an oxygen source, providing an acidic ionic liquid, providing a metal oxide compound and/or a metal salt, providing a basic compound, and generating oxygen by contacting the oxygen source, the ionic liquid, the metal oxide compound and/or the metal salt and the basic compound. The oxygen source is a peroxide compound, the ionic liquid is in the liquid state at least in the temperature range from −10° C. to +50° C., the metal oxide compound is an oxide of one single metal or of two or more different metals, said metal(s) being selected from the metals of groups 2 to 14 of the periodic table of the elements, the metal salt comprises one single metal or two or more different metals, and an organic and/or inorganic anion.

According to an exemplary embodiment, the oxygen source, the catalyst and the ionic liquid are provided as a first component, the basic compound is provided as a second component, and the step of contacting the oxygen source, the ionic liquid, the catalyst and the basic compound comprises mixing the first component and the second component.

According to a further exemplary embodiment, the oxygen source is provided as a first component, the ionic liquid and the catalyst are provided as a second component, and the basic compound is provided as a third component, and the step of contacting comprises mixing the first component, the second component and the third component.

In the above methods for generating oxygen, the oxygen is produced with a particular production rate and for a particular time. The production rate and time can be influenced to some extent by appropriately selecting the type and amounts of the constituents, however, each oxygen generator having a particular combination of constituents produces oxygen at a rate inherent to that particular combination. There is no possibility to influence a running decomposition reaction.

The present invention provides the possibility to stop the peroxide decomposition reaction before the whole amount of oxygen is released. Alternatively, the oxygen production rate may be not stopped, but only decreased. Those effects can be achieved by adding an appropriate amount of an acidic compound. Depending on the type and the amount of acid, the oxygen production is stopped or is only decreased to a greater or lesser extent. The interruption or deceleration of the oxygen production is observed instantaneously upon addition of the acid to the oxygen generating composition.

The present invention provides also the possibility to restart an interrupted decomposition reaction or to increase the oxygen production rate of a running decomposition reaction. These effects can be achieved by adding an appropriate amount of a basic compound to the composition for generating oxygen. Restart of the oxygen production or acceleration of the oxygen production is observed instantaneously upon addition of the basic compound to the composition for generating oxygen. After restart of an interrupted decomposition process, the pristine oxygen production rate is achieved within a few seconds. Depending on the type and amount of the basic compound the oxygen production can be accelerated to a greater or lesser extent.

An exemplary method for controlling the oxygen production rate of an oxygen generator comprises providing an oxygen source, providing an ionic liquid (neutral or basic), providing a metal oxide compound and/or a metal salt, generating oxygen by contacting the oxygen source, the ionic liquid and the metal oxide compound and/or the metal salt, and modifying the oxygen production rate by adding an acidic compound and/or a basic compound to the oxygen source, the ionic liquid and the metal oxide compound and/or the metal salt.

A further exemplary method for controlling the oxygen production rate of an oxygen generator comprises providing an oxygen source, providing an acidic ionic liquid, providing a metal oxide compound and/or a metal salt, providing a basic compound, generating oxygen by contacting the oxygen source, the ionic liquid, the metal oxide compound and/or the metal salt and the basic compound, and modifying the oxygen production rate by adding a further acidic compound and/or a further basic compound to the oxygen source, the ionic liquid, the metal oxide compound and/or the metal salt and the basic compound.

Oxygen production interruption and restart of the oxygen production can be performed multiple times over the course of the decomposition reaction. Thus, it is possible to adapt the oxygen production rate to the particular needs. In situations where a user needs more oxygen, he may increase the oxygen flow rate, and in situations where he needs less oxygen he may save oxygen by decreasing or even interrupting the oxygen production. The inventive method for controlling the oxygen production rate of an oxygen generator supplies oxygen in a manner similar to a liquid oxygen supply system or a pressurized oxygen tank.

It goes without saying that in the above methods the acidic compound and the basic compound are not added simultaneously, but rather at the respective time when stop or decrease of oxygen production, or restart or increase of oxygen production, respectively, are desired.

The oxygen source, the ionic liquid, the metal oxide compound, the metal salt, the acidic compound and the basic compound are as described above.

In an exemplary method, modifying the oxygen production rate consists in reducing the oxygen production rate or stopping the oxygen production by adding an acidic compound to the oxygen source, the ionic liquid and the catalyst.

In another exemplary method, modifying the oxygen production rate consists in increasing the oxygen production rate or restarting an interrupted oxygen production by adding a basic compound to the oxygen source, the ionic liquid and the catalyst.

In a further exemplary method, modifying the oxygen production rate consists in decelerating or interrupting the oxygen production by adding an acidic compound to the oxygen source, the ionic liquid and the catalyst and, after a desired time interval, accelerating or restarting the oxygen production by adding a basic compound to the oxygen source, the ionic liquid, and the catalyst.

According to further exemplary methods, acceleration and/or deceleration of the oxygen production is performed stepwise by adding several portions of a basic compound or an acidic compound, respectively, with time intervals between the individual addition steps.

In another exemplary method, the process of decelerating or interrupting the oxygen production and the process of accelerating or restarting the oxygen production are performed several times.

Many compositions for generating oxygen do not produce constant oxygen flow rates, but rather show increasing or decreasing oxygen flow rates. In other oxygen generating compositions, oxygen flow rates fluctuate during the peroxide decomposition reaction. Fluctuating or increasing or decreasing oxygen flow rates, however, are undesirable. The present invention offers a possibility to influence the decomposition reaction, i.e. to accelerate the reaction when the oxygen flow rate decreases, and to decelerate the reaction when the oxygen flow rate increases, thus rendering the oxygen flow rate constant over the course of time.

In the context of this invention, a liquid is regarded neutral, if its pH is in a range from 6.5 to 7.3. In ionic liquids having a pH from 6.5 to 7.3 (because they contain an ionic liquid having a pH in this range intrinsically, or because they contain an ionic liquid having a pH in a different range, but the pH has been adjusted by adding an acidic or a basic compound, respectively), the peroxide decomposition proceeds slowly, but complete.

In the context of this invention, a liquid is regarded acidic, if its pH is in a range below 6.5. In ionic liquids having a pH below 6.5 (because they contain an ionic liquid having a pH below 6.5 intrinsically, or because they contain an ionic liquid having a different pH, but the pH has been adjusted by adding an acidic compound), the peroxide decomposition reaction proceeds slower than at a pH of 6.5 or above. The lower the pH value, the slower the decomposition reaction, and an increasingly higher amount of peroxide compound remains as an undecomposed residue. The exact pH value where the peroxide decomposition does not proceed at all, depends on the types of ionic liquid, peroxide and catalyst, and can be easily found for each particular system by a few routine experiments.

In the context of this invention, a liquid is regarded basic, if its pH is in a range above 7.3. In ionic liquids having a pH above 7.3 (because they contain an ionic liquid having a pH above 7.3 intrinsically, or because they contain an ionic liquid having a different pH, but the pH has been adjusted by adding a basic compound), the peroxide decomposition reaction proceeds faster than at a pH of 7.3 or below. The higher the pH value, the faster the peroxide is decomposed, i.e. the shorter the time period needed for complete decomposition of the peroxide. Again, reaction speeds somewhat vary depending on the types of ionic liquid, peroxide and decomposition catalyst, but a desired reaction speed for a particular system can be easily found by a few routine experiments.

Herein, the pH value of an ionic liquid is determined in an 100 mM aqueous solution (distilled water) of the ionic liquid at 20° C. The pH value can be adjusted as desired by adding acids or bases, respectively, e.g. 1 M HCl or 1 M NaOH.

An exemplary device for generating oxygen is specifically adapted for housing the components of the composition for generating oxygen in a physically separated state, and bringing them into physical contact once generation of oxygen is desired.

Another exemplary device for generating oxygen in a controlled manner is specifically adapted for housing the components of the composition for generating oxygen in a physically separated state, and for bringing them into physical contact once generation of oxygen is desired, and for housing at least one acidic compound and/or at least one basic compound in such a manner that the acidic compound and the basic compound can be added to the composition when desired.

In an exemplary embodiment, a device for generating oxygen comprises a reaction chamber housing a composition for generating oxygen, the composition comprising a combination of constituents consisting of an oxygen source, an acidic ionic liquid and a metal oxide compound and/or a metal salt, means for allowing oxygen to exit the reaction chamber, and a dosing device housing a basic compound, the dosing device being adapted to introduce the basic compound into the reaction chamber.

In another exemplary embodiment, a device for generating oxygen in a controlled manner comprises a reaction chamber housing a composition for generating oxygen, the composition comprising a combination of constituents consisting of an oxygen source, an acidic ionic liquid, and a metal oxide compound and/or a metal salt, means for allowing oxygen to exit the reaction chamber, at least one dosing device housing a basic compound and at least one dosing device housing in acidic compound, the dosing devices being adapted to introduce the basic compound and the acidic compound into the reaction chamber.

In a further exemplary embodiment, a device for generating oxygen in a controlled manner comprises a reaction chamber housing a composition for generating oxygen, the composition comprising a combination of constituents consisting of an oxygen source, a neutral or basic ionic liquid, and a metal oxide compound and/or a metal salt, at least dosing device housing an acidic compound and/or at least one dosing device housing a basic compound, the dosing device(s) being adapted to introduce the acidic compound and/or the basic compound into the reaction chamber, means for maintaining at least one of the oxygen source, the ionic liquid and the metal oxide compound and/or the metal salt physically separated from the remaining constituents, means for establishing physical contact of the oxygen source, the ionic liquid and the metal oxide compound and/or the metal salt, and means for allowing oxygen to exit the reaction chamber.

The oxygen source, the ionic liquid, the metal oxide compound, the metal salt, the acidic compound and the basic compound are as described above.

Devices for housing the components of the composition for generating oxygen in a physically separated state and for bringing them into physical contact once generation of oxygen is desired, are described in US 2018/0141810 A1 and in EP 3 323 782 A1. See, in particular, paragraphs [0053] to [0057] and [0106] to [0127], and FIGS. 18-22 of EP 3 323 782 A1. The respective disclosures are incorporated herein by reference.

A device for generating oxygen according to the present invention may be designed, for example, as illustrated in FIGS. 19 and 20 of US 2018/0141810 A1 and EP 3 323 782 A1, however, in the device of present invention, reaction chamber 2 or compartment 4, respectively, would be filled with an oxygen source, and acidic ionic liquid, and a metal oxide compound and/or a metal salt, and injection device 21, or compartment 3, respectively, would be filled with a basic compound.

In order to be suitable as a device for generating oxygen in a controlled manner according to the present invention, the devices disclosed in US 2018/0141810 A1 and EP 3 323 782 A1 must be modified by including dosing devices for housing acidic compounds and/or (further) basic compounds, the dosing devices being adapted to introduce the acidic compounds and/or the basic compounds into the reaction chamber. Exemplary devices are described with reference to FIGS. 60 and 61 below.

In exemplary embodiments the ionic liquids described above are used as dispersants or solvents and as heat sinks in the oxygen generator described above.

The disclosed generators, methods and devices may take advantage of any of the materials describe above in relation to compositions and vice versa.

All references herein to "comprising" should be understood to encompass "including" and "containing" as well as "consisting of" and "consisting essentially of."

The term "a" means "at least one."

Other features which are considered as characteristic for the invention are set forth in the appended claims.

Although the invention is illustrated and described herein as embodied in a oxygen generator and method for controlling the oxygen production rate of an oxygen generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1-13 are graphs illustrating decomposition of UHP (urea hydrogen peroxide), catalyzed be dissolved catalysts, termination of the decomposition reactions by addition of liquid acid solutions, and restart of the decomposition reactions by addition of basic solutions, FIGS. 14-25 are graphs illustrating decomposition of UHP, catalyzed by dispersed solid catalysts, termination of the decomposition reactions by addition of liquid acid solutions, and restart of the decomposition reactions by addition of basic solutions, FIGS. 30 and 31 are graphs illustrating decomposition of mixtures of UHP and SPC (sodium percarbonate), and of UHP and SPB (sodium perborate), respectively, catalyzed by dispersed solid catalysts, termination of the decomposition reactions by addition of sulfuric acid, and restart of the decomposition reactions by addition of sodium hydroxide solutions, FIGS. 32 to 39 are graphs illustrating decomposition of UHP, catalyzed by dissolved or dispersed catalysts, termination of the decomposition reactions by addition of solid acids, and restart of the decomposition reactions by addition of solid or dissolved bases, FIGS. 40 to 44 are graphs illustrating decomposition of UHP, catalyzed by dissolved lead acetate, termination of the decomposition reactions by addition of solid acids, and restart of the decomposition reactions by addition of sodium hydroxide solutions.

DETAILED DESCRIPTION OF THE INVENTION

Figure 1:
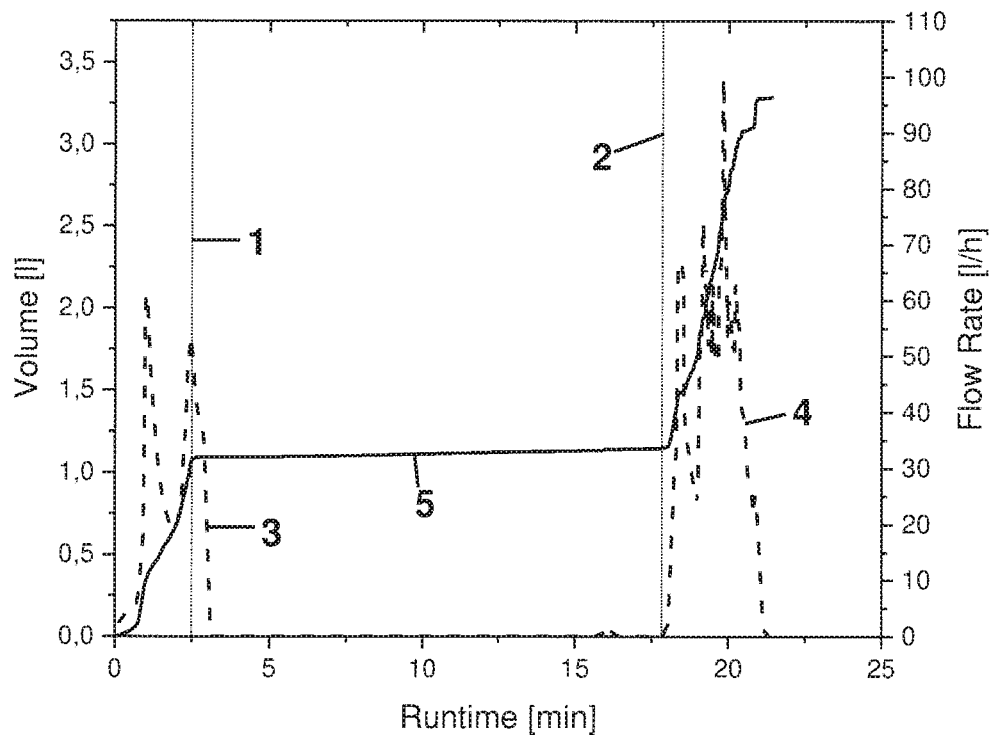
Figure 2:
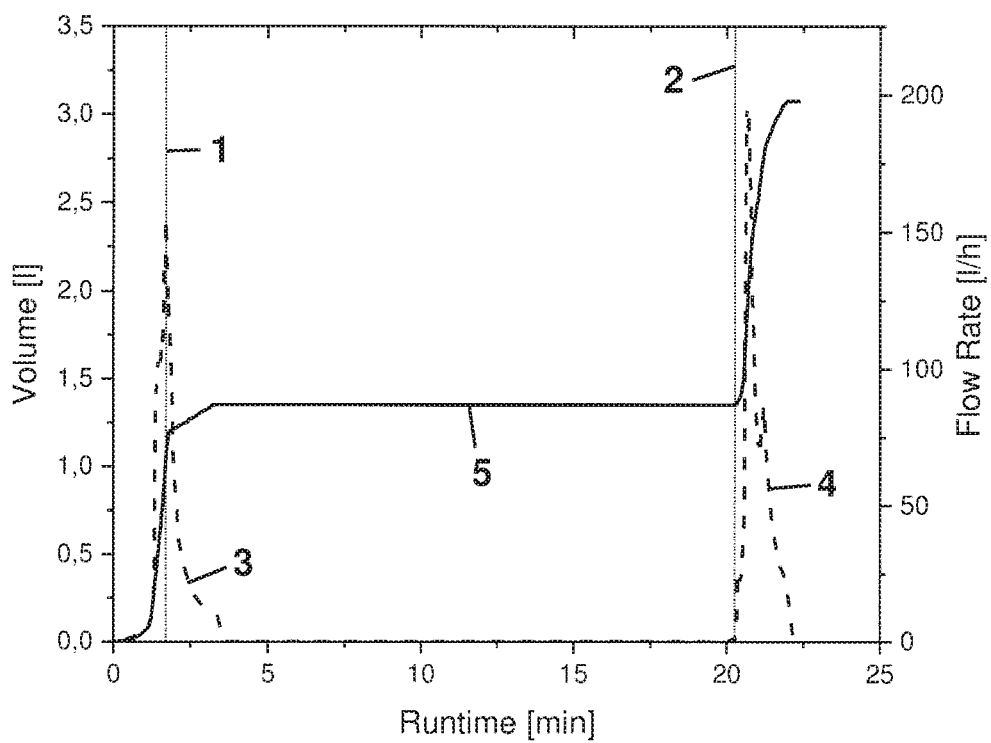

Referring now to the figures of the drawing in detail, all of the graphs illustrating oxygen release, the oxygen flow rate and the volume are plotted against run time, wherein run time is the time which starts running at the time point of contacting the oxygen source, the ionic liquid and the catalyst, or at the time point of contacting the oxygen source, the ionic liquid, the metal oxide compound and/or the metal salt with a basic compound. "Volume" is the oxygen volume released in total. Oxygen flow rate (l/h) and volume released (I) by each decomposition reaction where measured with a drum gas meter in each of the experiments of examples 1 to 14, throughout the experiments.

In the following examples acids were used in order to stop running peroxide decomposition reactions, and bases were used in order to restart the decomposition reactions. Amounts of acids were chosen to provide about 3 mmol to 6 mmol H+ ions/g ionic liquid, and amounts of bases were chosen to at least neutralize the acids. It is, however, believed that in most cases lower amounts of acid would have been sufficient for bringing the peroxide decomposition to a halt. In addition, it would have been possible to use more base than required for acid neutralization, thus speeding up the decomposition reaction.

Example 1

Example 1 comprises experiments 1 to 5. In each experiment, an ionic liquid having catalysts dissolved therein was added to a peroxide compound (UHP) contained in a glass flask. After a predetermined period of time, a liquid acid (aqueous acid solution) was added into the flask, and after a further predetermined period of time, an aqueous solution of NaOH was added into the flask.

Type and amount of the compounds used in each experiment, as well as the time of addition (in minutes after start of the run time) of acids and bases are listed in table 1. Table 1 also shows in which figure each particular experiment is illustrated.

TABLE 1

| Figure/ experiment | Catalyst (mass) | peroxide adduct (mass) | ionic liquid (mass) | acid (time of addition) | base (time of addition) |
| --- | --- | --- | --- | --- | --- |
| 1 | Pb(OAc)$_2$•3H$_2$O (1008 mg) | UHP (20 g) | [MMIM][PO$_4$Me$_2$] (10 g) | HOAc (2.5 min) | NaOH$_{(aq.)}$ (17.8 min) |
| 2 | CoSO$_4$•7H$_2$O (14.9 mg) | UHP (20 g) | [EMIM][OAc] (10 g) | HNO$_3$ (1.7 min) | NaOH$_{(aq.)}$ (20.3 min) |
| 3 | FeCl$_3$•6H$_2$O (14.4 mg) | UHP (20 g) | [EMIM][OAc] (10 g) | H$_2$SO$_4$ (1.1 min) | NaOH$_{(aq.)}$ (12.1 min) |
| 4 | Mn(OAc)$_2$•4H$_2$O (367.9 mg) | UHP (20 g) | [BMIM][OAc] (10 g) | H$_3$PO$_4$ (4.0 min) | NaOH$_{(aq.)}$ (10.5 min) |
| 5 | CuCl$_2$•2H$_2$O (18.1 mg) | UHP (10 g) | [MMIM][PO$_4$Me$_2$] (5 g) | HCl$_{(aq.)}$ (1.1 min) | NaOH$_{(aq.)}$ (15.2 min) |

In each of FIGS. 1-5, line 1 indicates the time of addition of the acid, line 2 indicates the time of addition of the base, lines 3 and 4 indicate the oxygen flow rate, and line 5 indicates the oxygen volume released in total from UHP by the respective catalyst in the respective ionic liquid.

FIGS. 1-5 show that the peroxide decomposition reaction starts nearly without delay after contacting the peroxide compound, the ionic liquid and the catalyst. Adding an acidic compound stops the peroxide decomposition reaction promptly, and adding a basic compound restarts the decomposition reaction with a reaction rate comparable to the reaction rate before interruption of the decomposition reaction.

Example 1 proves that the peroxide decomposition reaction can be stopped by different liquid acids (aqueous acid solutions) independent of the catalyst used.

Example 2

Example 2 comprises experiments 6 to 10. In each experiment, an ionic liquid having catalysts dissolved therein was added to a peroxide compound (UHP) contained in a glass flask. After a predetermined period of time, a liquid acid (aqueous acid solution) was added into the flask, and after a further predetermined period of time, an aqueous solution of NaOH was added into the flask.

Types and amounts of the compounds used in each experiment, as well as the time of addition (in minutes after start of the run time) of acids and bases are listed in table 2. Table 2 also shows in which figure each particular experiment is illustrated.

In each of FIGS. 6-10, line 1 indicates the time of addition of the acid, line 2 indicates the time of addition of the base, lines 3 and 4 indicate the oxygen flow rates, and line 5 indicates the oxygen volume released in total from UHP by the catalyst in the ionic liquid.

FIGS. 6-10 show that the peroxide decomposition reaction starts nearly without delay after contacting the peroxide compound, the ionic liquid and the catalyst. Adding a liquid acid stops the peroxide decomposition reaction promptly, and adding a liquid base restarts the decomposition reaction, the reaction rate being comparable to the reaction rate before interruption of the decomposition reaction.

Example 2 proves that the decomposition of a peroxide compound can be started by a catalyst which is dissolved in an ionic liquid. The decomposition reaction can be stopped by adding various liquid acids.

Example 3

Example 3 comprises experiments 11 to 13. In each experiment, an ionic liquid having catalysts dissolved therein was added to a peroxide compound (UHP) contained in a glass flask. After a predetermined period of time, a liquid acid (aqueous nitric acid) was added into the flask, and after a further predetermined period of time, an aqueous solution of NaOH was added into the flask.

Types and amounts of the compounds used in each experiment, as well as the time of addition (in minutes after start of the runtime) of acids and bases are listed in table 3. Table 3 also shows in which figure each particular experiment is illustrated.

TABLE 2

| Figure/ experiment | catalyst (mass) | peroxide adduct (mass) | ionic liquid (mass) | acid (time of addition) | base (time of addition) |
| --- | --- | --- | --- | --- | --- |
| 6 | Mn(OAc)$_2$•4H$_2$O (367.9 mg) | UHP (20 g) | [BMIM][OAc] (10 g) | H$_3$PO$_4$ (4.0 min) | NaOH$_{(aq.)}$ (10.5 min) |
| 7 | Mn(OAc)$_2$•4H$_2$O (367.9 mg) | UHP (20 g) | [BMIM][OAc] (10 g) | NaHSO$_{4(aq.)}$ (3.4 min) | NaOH$_{(aq.)}$ (7.9 min) |
| 8 | Mn(OAc)$_2$•4H$_2$O (735.7 mg) | UHP (40 g) | [BMIM][OAc] (30 g) | HCl$_{(aq.)}$ (8.9 min) | NaOH$_{(aq.)}$ (23.5 min) |
| 9 | Mn(OAc)$_2$•4H$_2$O (735.7 mg) | UHP (40 g) | [BMIM][OAc] (30 g) | HOAc (8.3 min) | NaOH$_{(aq.)}$ (59.1 min) |
| 10 | Mn(OAc)$_2$•4H$_2$O (367.9 mg) | UHP (20 g) | [BMIM][OAc] (10 g) | Bernsteinsaure in [EMIM][OAc] (4.0 min) | NaOH$_{(aq.)}$ (21.3 min) |

TABLE 3

| Figure/ experiment | catalyst (mass) | Peroxide adduct (mass) | Ionic liquid (mass) | acid (time of addition) | base (time of addition) |
|---|---|---|---|---|---|
| 11 | $Co(OAc)_2 \cdot 4H_2O$ (13.2 mg) | UHP (20 g) | [EMIM][OAc] (10 g) | $HNO_{3(aq.)}$ (0.8 min) | $NaOH_{(aq.)}$ (20.6 min) |
| 12 | $CoCl_2 \cdot 6H_2O$ (12.6 mg) | UHP (20 g) | [EMIM][OAc] (10 g) | $HNO_{3(aq.)}$ (0.8 min) | $NaOH_{(aq.)}$ (20.1 min) |
| 13 | $CoSO_4 \cdot 7H_2O$ (14.9 mg) | UHP) (20 g) | [EMIM][OAc] (10 g) | $HNO_{3(aq.)}$ (1.7 min) | $NaOH_{(aq.)}$ (20.3 min) |

Figure 11:
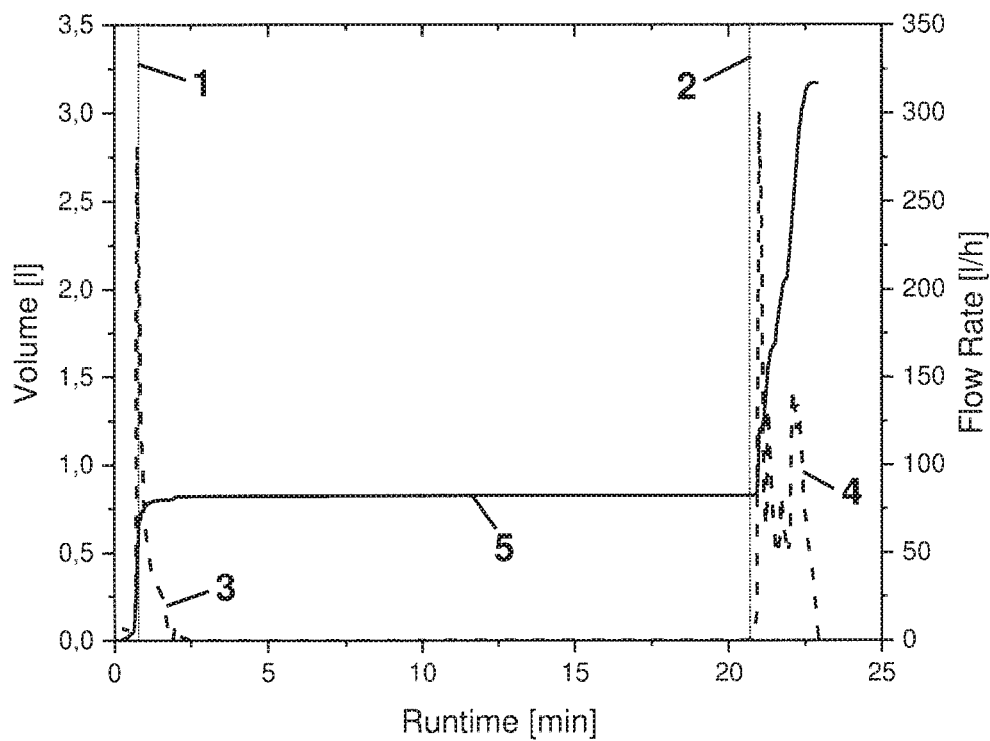
Figure 12:
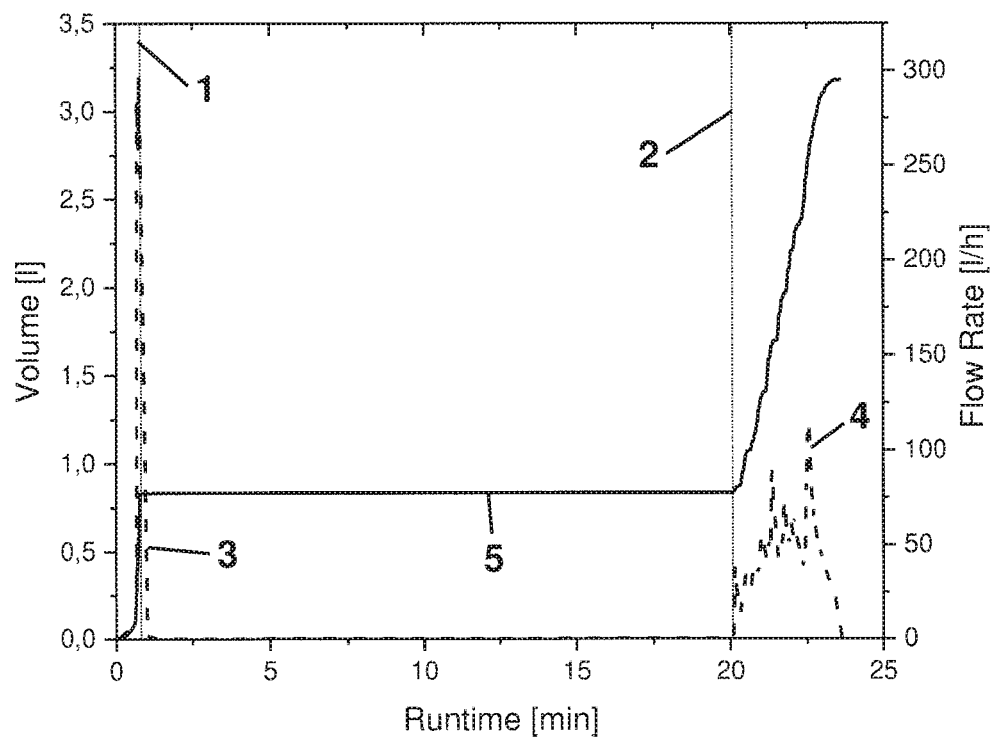
Figure 13:
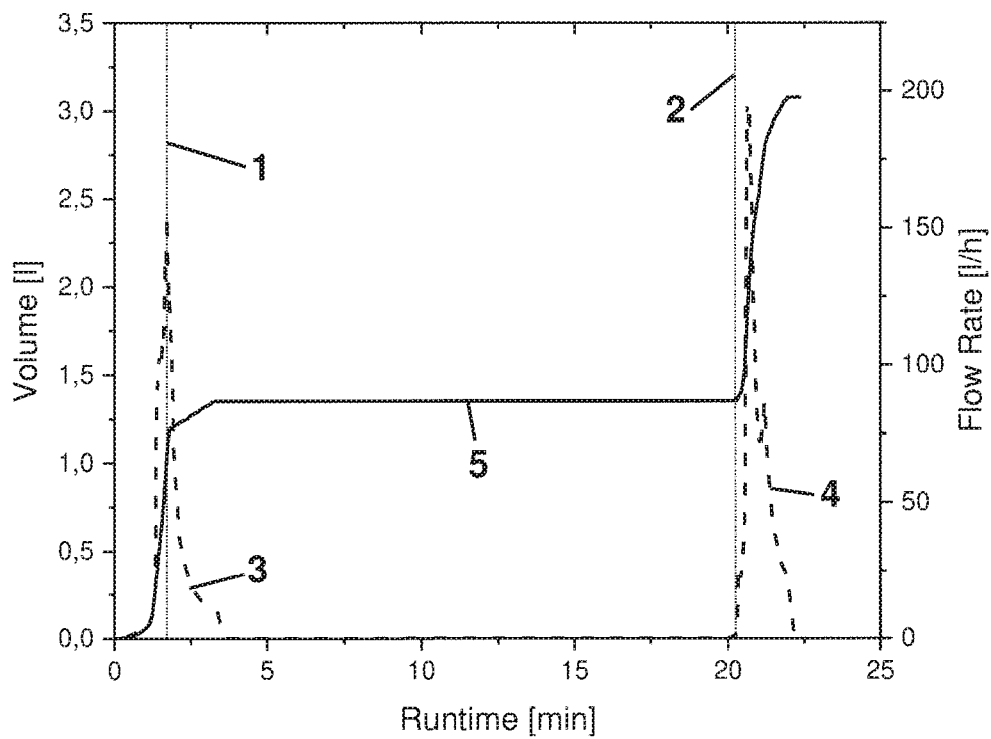
Figure 14:
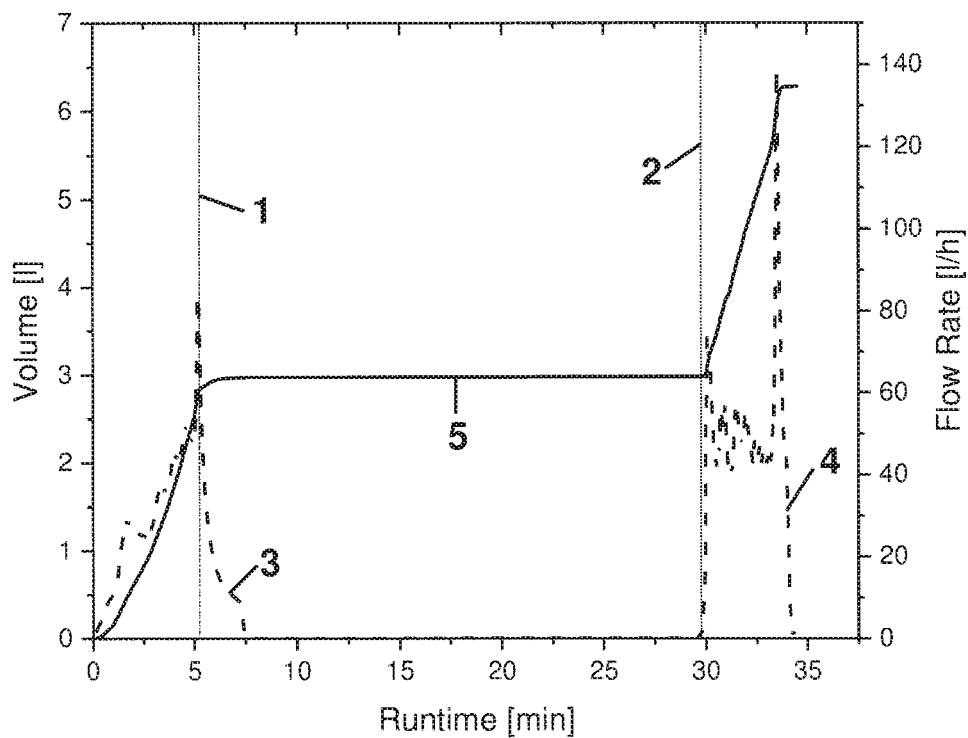
Figure 15:
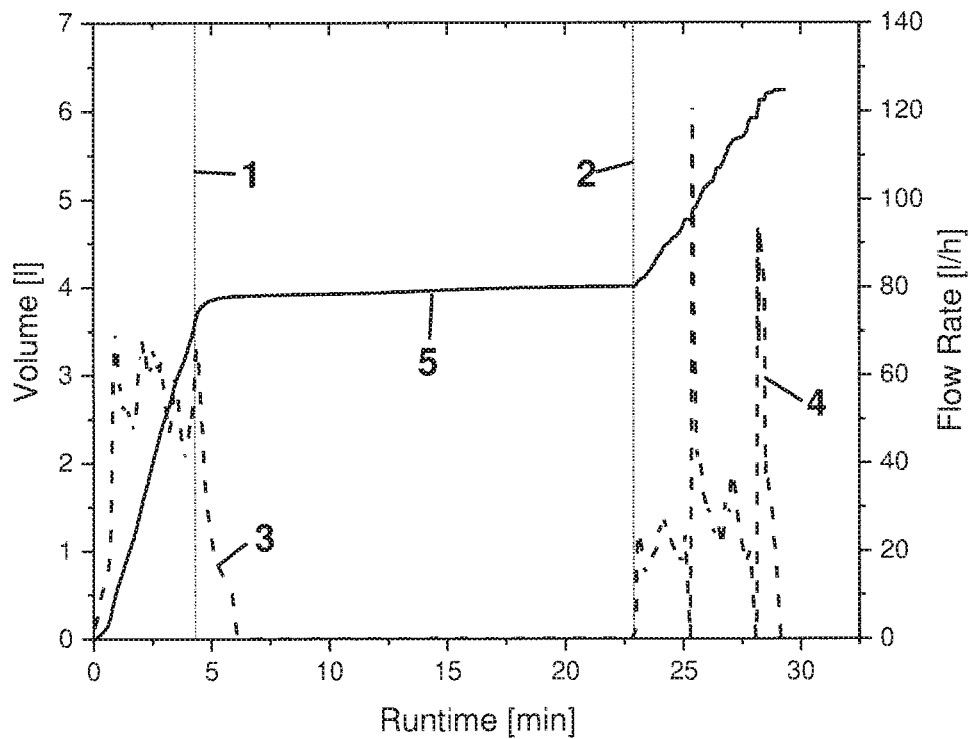
Figure 16:
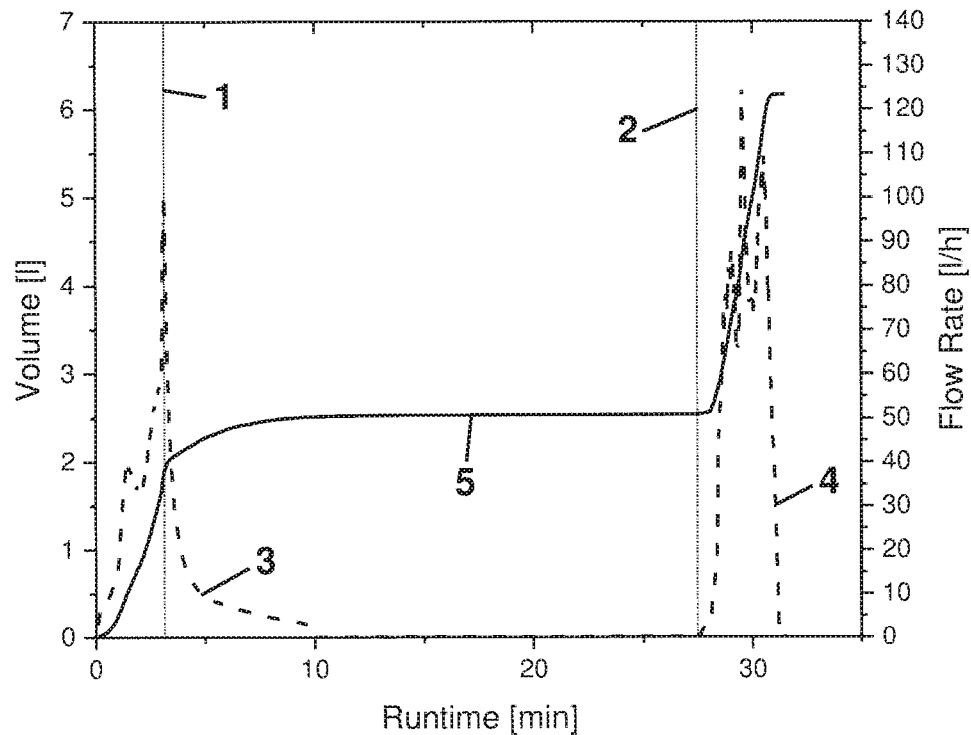
Figure 21:
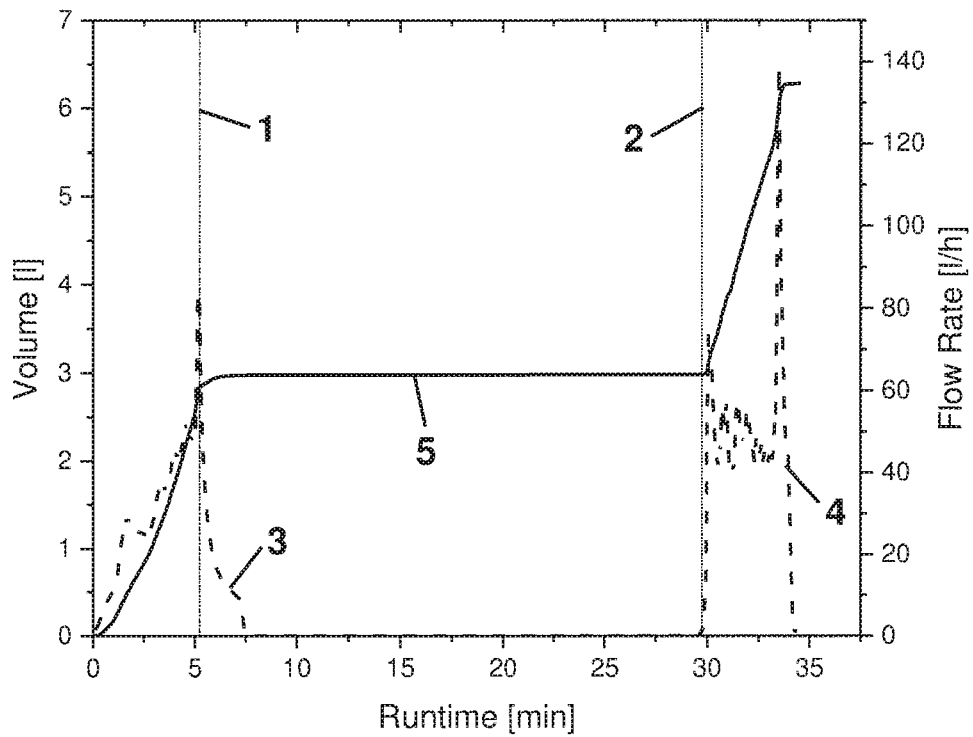
Figure 22:
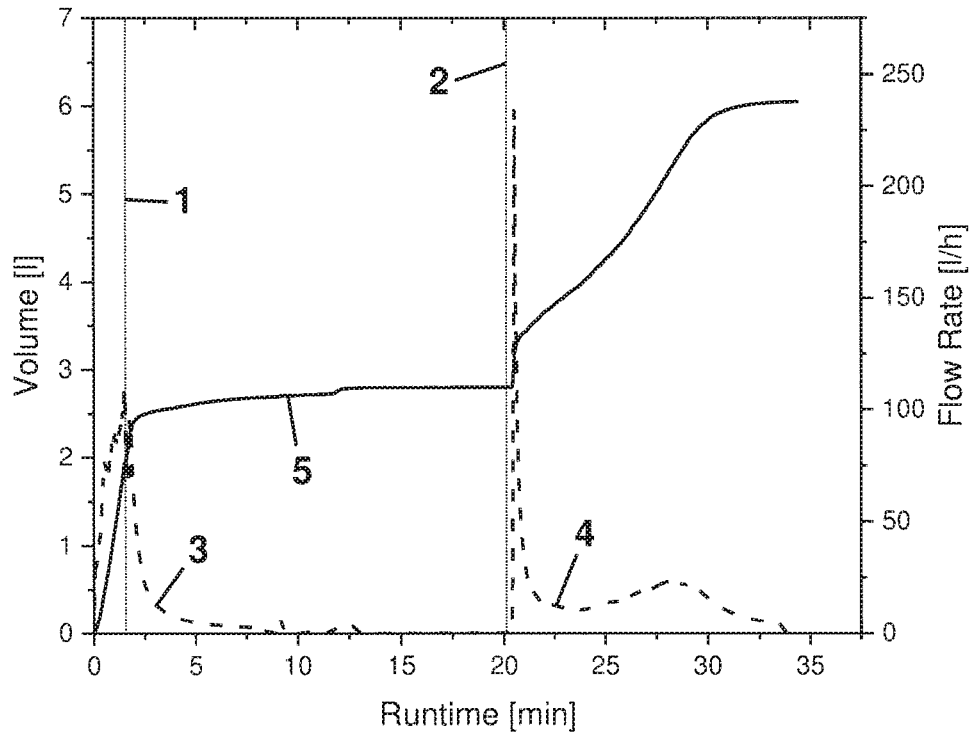

In each of FIGS. 11-13, line 1 indicates the time of addition of nitric acid, line 2 indicates the time of addition of the aqueous solution of sodium hydroxide, lines 3 and 4 indicate the oxygen flow rates, and line 5 indicates the oxygen volume released in total from UHP by the respective catalysts.

FIGS. 11-13 show that the peroxide decomposition reaction starts nearly without delay after contacting the peroxide compound with the ionic liquid and the catalyst. Adding an aqueous acid solution stops the peroxide decomposition reaction promptly, and adding an aqueous base solution restarts the decomposition reaction.

Example 3 proves that the peroxide decomposition reaction, catalyzed by a metal salt which has been dissolved in an ionic liquid, can be stopped by adding a liquid acid. Different catalyst anions are equally effective.

Example 4

Example 4 comprises experiments 14-17. In each experiment, an ionic liquid having catalysts dispersed therein was added to a peroxide compound (UHP) contained in a glass flask. After a predetermined period of time, a liquid acid (aqueous acid solution) was added into the flask, and after a further predetermined period of time, an aqueous solution of sodium hydroxide was added into the flask.

Types and amounts of the compounds used in each experiment, as well as the time of addition (in minutes after start of the runtime) of acids and bases are listed in table 4. Table 4 also shows in which figure each particular experiment is illustrated.

In each of FIGS. 14-17, line 1 indicates the time of addition of the liquid acid, line 2 indicates the time of addition of the sodium hydroxide solution, lines 3 and 4 indicate the oxygen flow rates, and line 5 indicates the oxygen volume released in total from UHP by manganese dioxide dispersed in an ionic liquid.

FIGS. 14-17 show that the peroxide decomposition reaction starts without delay after contacting the peroxide with the ionic liquid and the catalyst. Adding an acid stops the peroxide composition reaction promptly, and adding a basic solution restarts the decomposition reaction with a high reaction rate.

Example 4 proves that the peroxide decomposition reaction, catalyzed by a solid metal oxide dispersed in a ionic liquid, can be stopped by adding different liquid acids.

Example 5

Example 5 comprises experiments 18-20. In each experiment, an ionic liquid having catalysts dispersed therein was added to a peroxide compound (UHP) contained in a glass flask. After a predetermined period of time, a liquid acid (aqueous acid solution) was added into the flask, and after a further predetermined period of time, an aqueous solution of NaOH was added into the flask.

Types and amounts of the compounds used in each experiment, as well as the time of addition (in minutes after start of the runtime) of acids and bases are listed in table 5. Table 5 also shows in which figure each particular experiment is illustrated.

TABLE 4

| Figure/ experiment | catalyst (mass) | Peroxide adduct (mass) | Ionic liquid (mass) | acid (time of addition) | base (time of addition) |
|---|---|---|---|---|---|
| 14 | $MnO_2$ (1108.8 mg) | UHP (40 g) | $[MMIM][PO_4Me_2]$ (25 g) | $H_2SO_{4(aq.)}$ (5.2 min) | $NaOH_{(aq.)}$ (29.8 in) |
| 15 | $MnO_2$ (1108.8 mg) | UHP (40 g) | $[MMIM][PO_4Me_2]$ (25 g) | $H_3PO_{4(aq.)}$ (4.3 min) | $NaOH_{(aq.)}$ (23.0 min) |
| 16 | $MnO_2$ (1108.8 mg) | UHP (40 g) | $[MMIM][PO_4Me_2]$ (25 g) | $HNO_{3(aq.)}$ (3.2 min) | $NaOH_{(aq.)}$ (27.5 min) |
| 17 | $MnO_2$ (1478.0 mg) | UHP (40 g) | $[MMIM][PO_4Me_2]$ (25 g) | $HCl_{(aq.)}$ (2.5 min) | $NaOH_{(aq.)}$ (19.6 min) |

TABLE 5

| Figure/ experiment | catalyst (mass) | Peroxide adduct (mass) | Ionic liquid (mass) | acid (time of addition) | base (time of addition) |
|---|---|---|---|---|---|
| 18 | $MnO_2$ (1478.0 mg) | UHP (40 g) | [MMIM][$PO_4Me_2$] (25 g) | $HCl_{(aq.)}$ (2.5 min) | $NaOH_{(aq.)}$ (19.6 min) |
| 19 | $PbO_2$ (127.0 mg) | UHP (20 g) | [MMIM][$PO_4Me_2$] (10 g) | $HCl_{(aq.)}$ (9.9 min) | $NaOH_{(aq.)}$ (37.2 min) |
| 20 | $CoFe_2O_4$ (1372.0 mg) | UHP (20 g) | [MMIM][$PO_4Me_2$] (10 g) | $HCl_{(aq.)}$ (25.3 min) | $NaOH_{(aq.)}$ (49.9 min) |

In each of FIGS. 18-20, line 1 indicates the time of addition of the acid, line 2 indicates the time of addition of the base, lines 3 and 4 indicate the oxygen flow rates, and line 5 indicates the oxygen volume released in total from UHP by the respective catalyst dispersed in the ionic liquid.

FIGS. 18-20 shows that the peroxide decomposition reaction starts with some delay in the case of lead oxide and in the case of mixed cobalt iron oxide, and can be stopped immediately by adding an aqueous acid solution. Adding a basic compound restarts the decomposition reaction with a high reaction rate.

Example 5 proves that the peroxide decomposition reaction, catalyzed by different metal oxides dispersed in an ionic liquid, can be stopped by adding a liquid acid.

Example 6

Example 6 comprises experiments 21-24. In each experiment, an ionic liquid having catalyst ($MnO_2$) dispersed therein was added to a peroxide compound (UHP) contained in a glass flask. After a predetermined period of time, a liquid acid (aqueous $H_2SO_4$), was added into the flask, and after a further predetermined period of time, a liquid base (aqueous solution of NaOH or [EMIM][OAc]) was added into the flask.

Types and amounts of the compounds used in each experiment, as well as the time of addition (in minutes after start of the runtime) of acids and bases are listed in table 6. Table 6 also shows in which figure each particular experiment is illustrated.

FIGS. 21-24 show that the peroxide decomposition reaction is stopped promptly upon addition of aqueous $H_2So_4$, and is restarted promptly upon addition of an aqueous solution of NaOH or [EMIM][OAc].

Example 6 proves that it is possible in different ionic liquids to stop the peroxide decomposition by adding an acid, and to restart the decomposition reaction by adding a base.

Example 7

Example 7 comprises experiments 25-27. In experiment 25, an ionic liquid having catalyst dispersed therein was added to a peroxide compound (UHP) contained in a glass flask. After a predetermined period of time, a liquid acid (aqueous acid solution) was added into the flask, and after a further predetermined period of time, a liquid base (aqueous solution of NaOH) was added into the flask.

In experiment 26, an ionic liquid having catalyst dissolved therein was added to a peroxide compound (UHP) contained in a glass flask. After a predetermined period of time, a liquid acid (aqueous acid solution) was added into the flask, and after a further predetermined period of time a first portion of a liquid base (aqueous base solution) was added into the flask, and after a still further predetermined period of time, a second portion of the same liquid base was added into the flask.

In experiment 27, an ionic liquid with acidic properties having catalyst dissolved therein was added to a peroxide compound (UHP) contained in a glass flask. After a predetermined period of time, a liquid base (aqueous base solution) was added into the flask.

TABLE 6

| Figure/ Experiment | catalyst (mass) | Peroxide adduct (mass) | Ionic liquid (mass) | acid (time of addition) | base (time of addition) |
|---|---|---|---|---|---|
| 21 | $MnO_2$ (1108.8 mg) | UHP (40 g) | [MMIM][$PO_4Me_2$] (25 g) | $H_2SO_{4(aq.)}$ (5.3 min) | $NaOH_{(aq.)}$ (29.8 min) |
| 22 | $MnO_2$ (1108.8 mg) | UHP (40 g) | [EMIM][$EtSO_4$] (25 g) | $H_2SO_{4(aq.)}$ (1.6 min) | [EMIM][OAc] (20.0 min) |
| 23 | $MnO_2$ (554.4 mg) | UHP (20 g) | 1-Butylpyridinium tetrafluoroborat (10 g) | $H_2SO_{4(aq.)}$ (1.0 min) | $NaOH_{(aq.)}$ (13.8 min) |
| 24 | $MnO_2$ (554.4 mg) | UHP (20 g) | Diethylmethylammonium methanesulfonat (10 g) | $H_2SO_{4(aq.)}$ (1.0 min) | $NaOH_{(aq.)}$ (15.6 min) |

In each of FIGS. 21-24, line 1 indicates the time of addition of the acid, line 2 indicates the time of addition of the base, lines 3 and 4 indicate the oxygen flow rates, and line 5 indicates the oxygen volume released in total from UHP by $MnO_2$ in the respective ionic liquid.

Types and amounts of the compounds used in each experiment, as well as the time of addition (in minutes after start of the runtime) of acids and bases are listed in Table 7. Table 7 also shows in which figure each particular experiment is illustrated.

TABLE 7

| Figure/ experiment | catalyst (mass) | Peroxide adduct (mass) | Ionic liquid (mass) | acid (time of addition) | base (time of addition) |
|---|---|---|---|---|---|
| 25 | $MnO_2$ (1108.8 mg) | UHP (40 g) | [MMIM][$PO_4Me_2$] (25 g) | $H_2SO_4$ (5.3 min) | $NaOH_{(aq.)}$ (29.8 min) |
| 26 | $Mn(OAc)_2 \cdot 4H_2O$ (367.9 mg) | UHP (20 g) | [BMIM][OAc] (10 g) | $H_3PO_4$ (3.0 min) | $K_3PO_{4(aq.)}$ (25.9 min; 30.7 min) |
| 27 | $CoSO_4 \cdot 7H_2O$ (149.4 mg) | UHP (20 g) | [MMIM][$PO_4Me_2$] (10 g) | / | $K_2CO_{3(aq.)}$ (22.7 min) |

Figure 25:
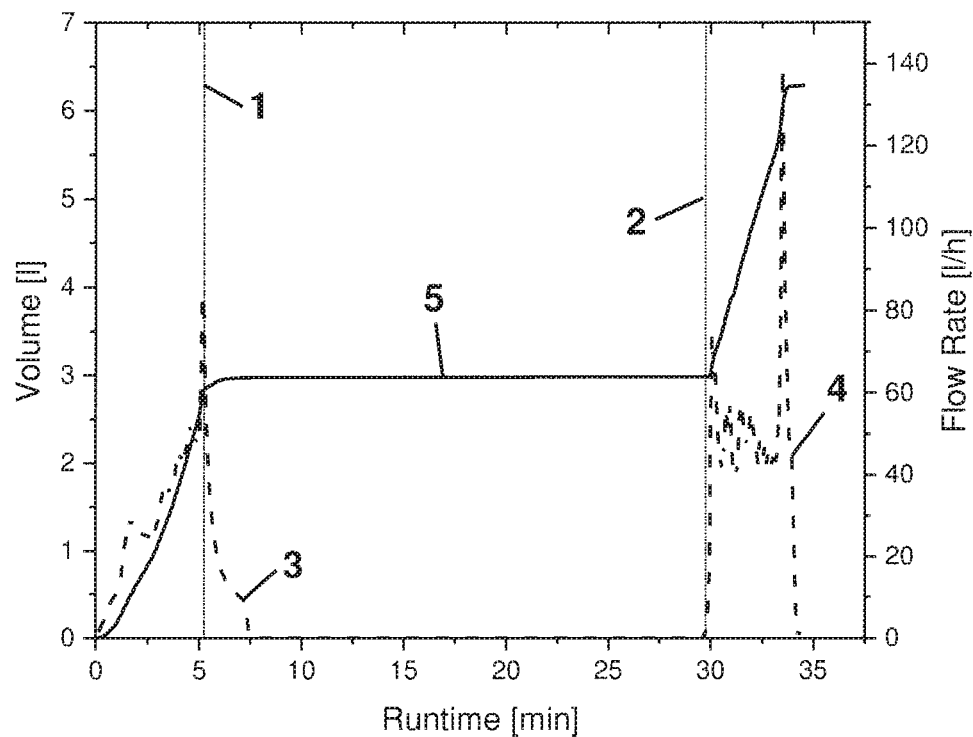

In FIG. 25, line 1 indicates the time of addition of the acid, line 2 indicates the time of addition of the base, lines 3 and 4 indicate the oxygen flow rates, and line 5 indicates the oxygen volume released in total from UHP.

Figure 26:
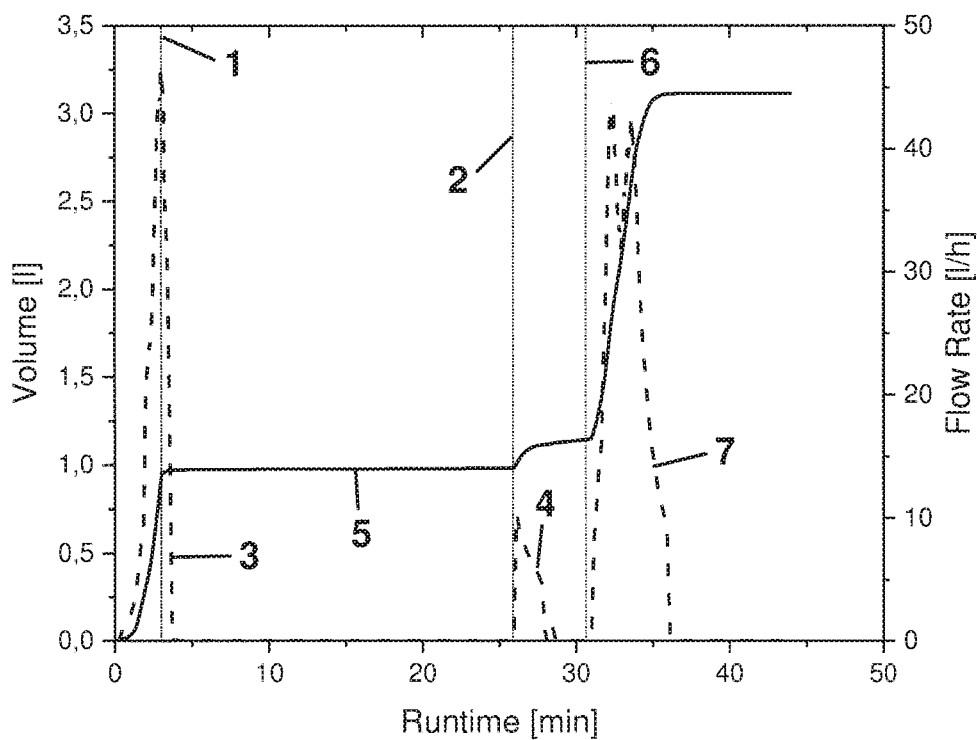
FIG. 26 is a graph illustrating decomposition of UHP, catalyzed by a dissolved catalyst, termination of the decomposition reaction by addition of a liquid acid solution, and restart of the decomposition reaction by addition of a potassium phosphate solution.

In FIG. 26, line 1 indicates the time of addition of the acid, line 2 indicates the time of addition of the first portion of the base, line 6 indicates the time of addition of the second portion of the base, lines 3, 4 and 7 indicate the oxygen flow rates (with line 4 indicating the oxygen flow rate after addition of the first base portion, and line 7 indicating the oxygen flow rate after addition of the second base portion), and line 5 indicates the oxygen volume released in total from UHP.

Figure 27:
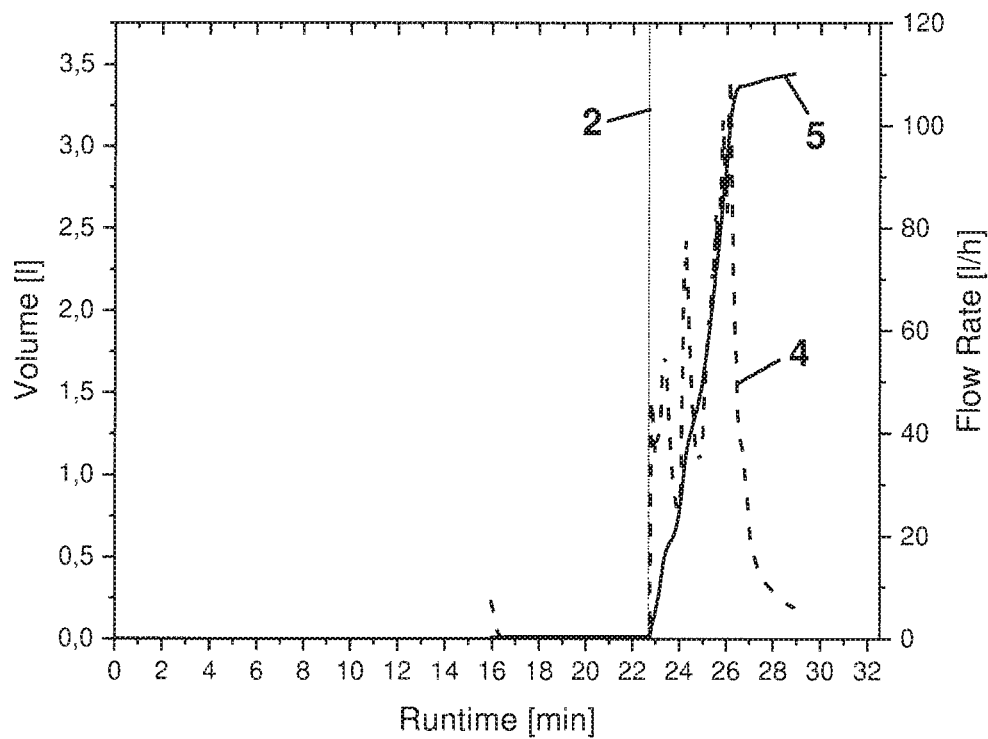
FIG. 27 is a graph illustrating start of the decomposition reaction of UHP contained in an acidic ionic liquid having catalysts dissolved therein.

In FIG. 27, line 2 indicates the time of addition of the base, line 4 indicates the oxygen flow rate, and line 5 indicates the oxygen volume released in total from UHP.

Example 7 proves that different liquid bases (aqueous base solutions) can be used for starting the peroxide decomposition reaction. Example 7 (see FIG. 26) also proves that the oxygen of a peroxide compound can be released in several steps by adding a base in several steps. Example 7 still further proves (see FIG. 27) that a peroxide decomposition catalyst does not catalyse the peroxide decomposition reaction when the catalyst and the peroxide are contained in an ionic liquid having acidic properties, i.e. the catalyst is inactive in the acidic medium. Upon addition of a base, however, the peroxide decomposition starts.

Example 8

Example 8 comprises experiments 28 and 29. In each experiment, an ionic liquid having catalyst dissolved or dispersed therein was added to a peroxide compound (UHP) contained in a glass flask. Then, liquid acids (aqueous acid solutions) and liquid bases (aqueous base solutions) were added into the flask in an alternating manner. Specifically, in experiment 28, phosphoric acid was added after a runtime of 9.1 minutes and of 30.9 minutes, and an aqueous solution of sodium hydroxide was added after a runtime of 26.8 minutes and of 44.1 minutes. In experiment 29, hydrochloric acid was added after a runtime of 4.4 minutes, of 16.3 minutes, and of 21.3 minutes, and an aqueous solution of sodium hydroxide was added after a runtime of 13.8 minutes, of 19.1 minutes, and of 24.2 minutes.

Types and amounts of the compounds used in each experiment, as well as the time of addition (in minutes after start of the runtime) of acids and bases are listed in table 8. Table 8 also shows in which figure each particular experiment is illustrated.

TABLE 8

| Figure/ experiment | catalyst (mass) | peroxide adduct (mass) | ionic liquid (mass) | acid (time of addition) | base (time of addition) |
|---|---|---|---|---|---|
| 28 | $Mn(OAc)_2 \cdot 4H_2O$ (1379.6 mg) | UHP (100 g) | [BMIM][OAc] (75 g) | $H_3PO_4$ (9.1 min; 30.9 min) | $NaOH_{(aq.)}$ (26.8 min; 44.1 min) |
| 29 | $MnO_2$ (1108.8 mg) | UHP (40 g) | [MMIM][$PO_4Me_2$] (25 g) | $HCl_{(aq.)}$ (4.4 min; 16.3 min; 21.3 min) | $NaOH_{(aq.)}$ (13.8 min; 19.1 min; 24.2 min) |

Figure 28:
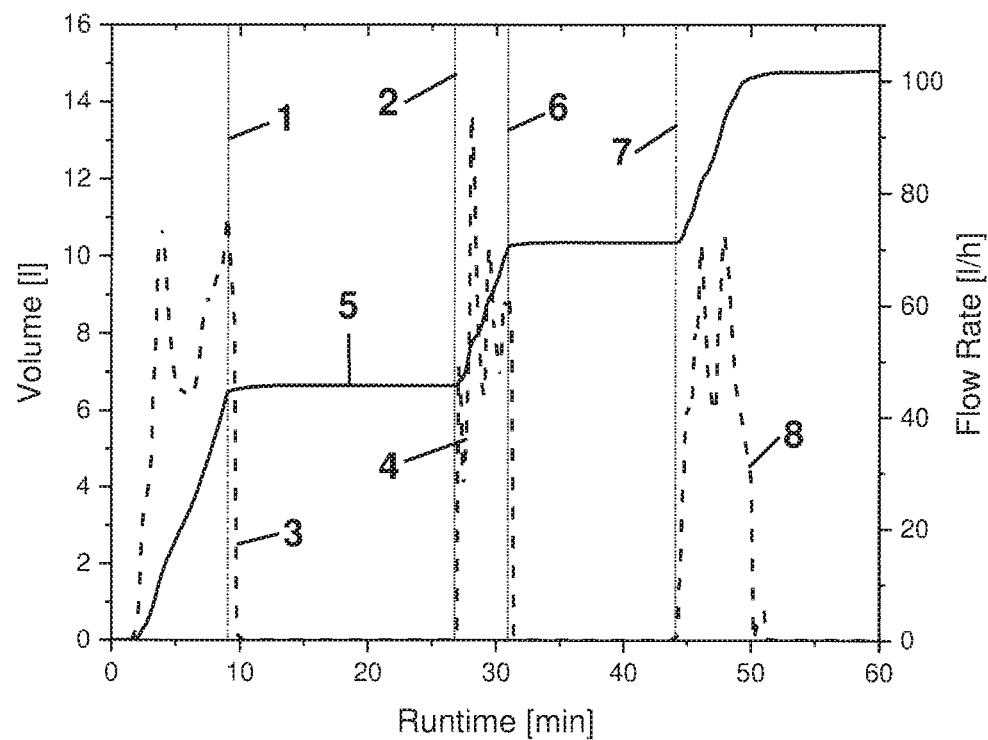
FIGS. 28 and 29 are graphs illustrating decomposition of UHP, catalyzed by dissolved or dispersed catalysts, and repeated termination and restart of the decomposition reactions by addition of liquid acid solutions and sodium hydroxide solutions, respectively.

In FIG. 28, lines 1 and 6 indicate the time points of addition of the acid, lines 2 and 7 indicate the time points of addition of the base, lines 3, 4 and 8 indicate the oxygen flow rates, and line 5 indicates the oxygen volume released in total from UHP.

Figure 29:
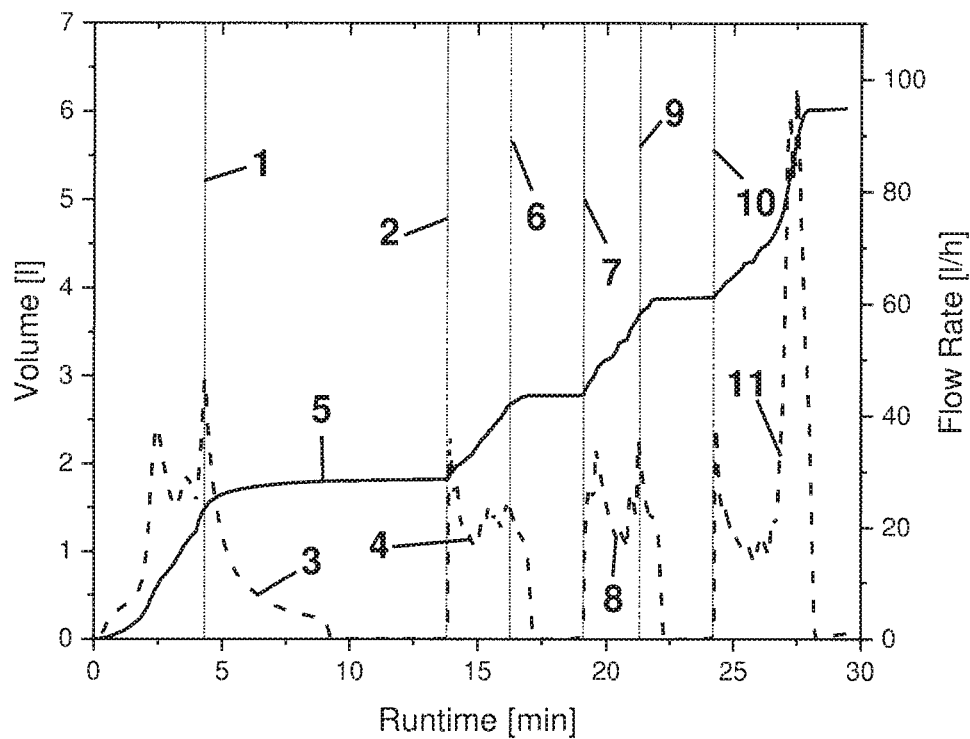

In FIG. 29, lines 1, 6 and 9 indicate the time points of addition of the acid, lines 2, 7 and 10 indicate the time points of addition of the base, lines 3, 4, 8 and 11 indicate the oxygen flow rates, and line 5 indicates the oxygen volume released in total from UHP.

Example 8 proves that the peroxide decomposition reaction can be stopped and restarted several times whenever termination of the oxygen production and restart of the oxygen production is desired until the complete supply of oxygen source has been decomposed.

Example 9

Example 9 comprises experiments 30 and 31. In each experiment, an ionic liquid having catalyst ($MnO_2$) dispersed therein was added to a mixture of UHP and SPC (sodium percarbonate), and to a mixture of UHP and SPB (sodium perborate) contained in a glass flask. After a predetermined period of time, a liquid acid (aqueous $H_2SO_4$) was added into a flask, and after a further predetermined period of time, a liquid base (aqueous solution of sodium hydroxide) was added into the flask.

Types and amounts of the compounds used in each experiment, as well as the time of addition (in minutes after start of the runtime) of acids and bases are listed in table 9. Table 9 also shows in which figure each particular experiment is illustrated.

TABLE 9

| Figure/ experiment | catalyst (mass) | peroxide adduct (mass) | ionic liquid (mass) | acid (time of addition) | base (time of addition) |
|---|---|---|---|---|---|
| 30 | $MnO_2$ (1108.8 mg) | UHP (25 g) SPC (15 g) | [MMIM]$PO_4Me_2$] (25 g) | $H_2SO_4$ (2.0 min) | NaOH (13.4 min) |
| 31 | $MnO_2$ (1108.8 mg) | UHP (25 g) SPB (15 g) | [MMIM]$PO_4Me_2$] (25 g) | $H_2SO_4$ (1.4 min) | NaOH (7.9 min) |

Figure 30:
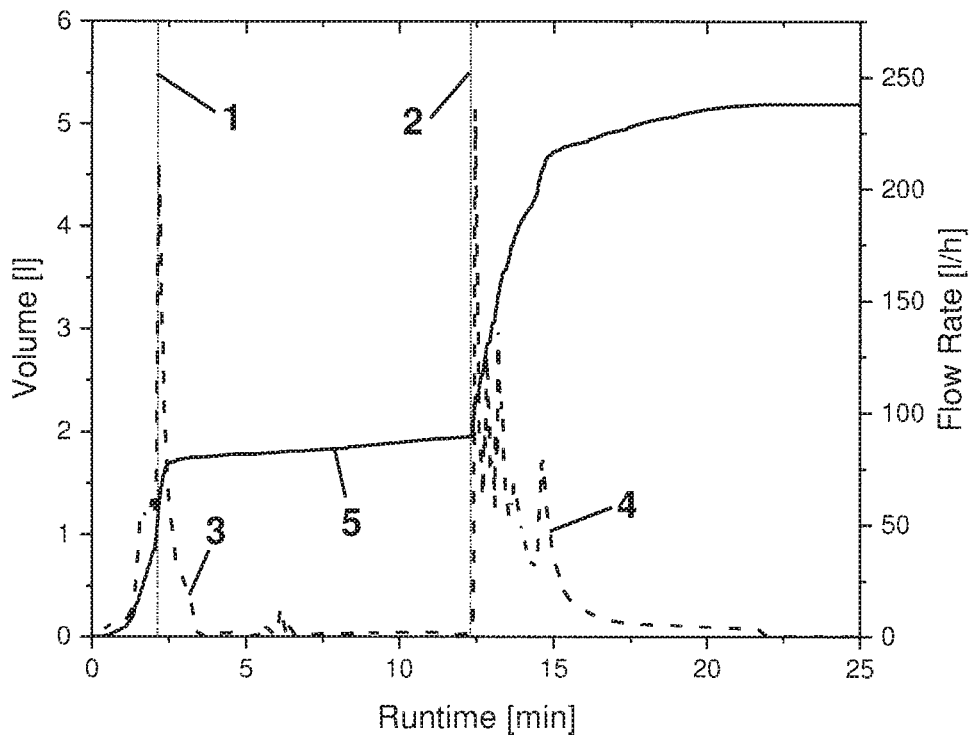
Figure 33:
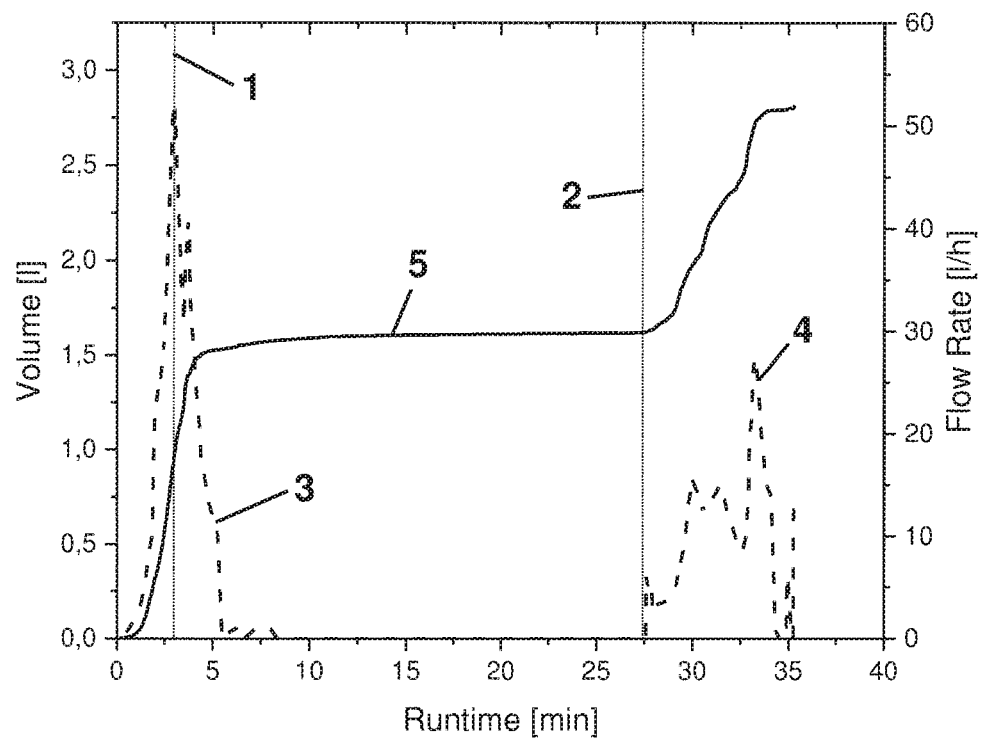
Figure 34:
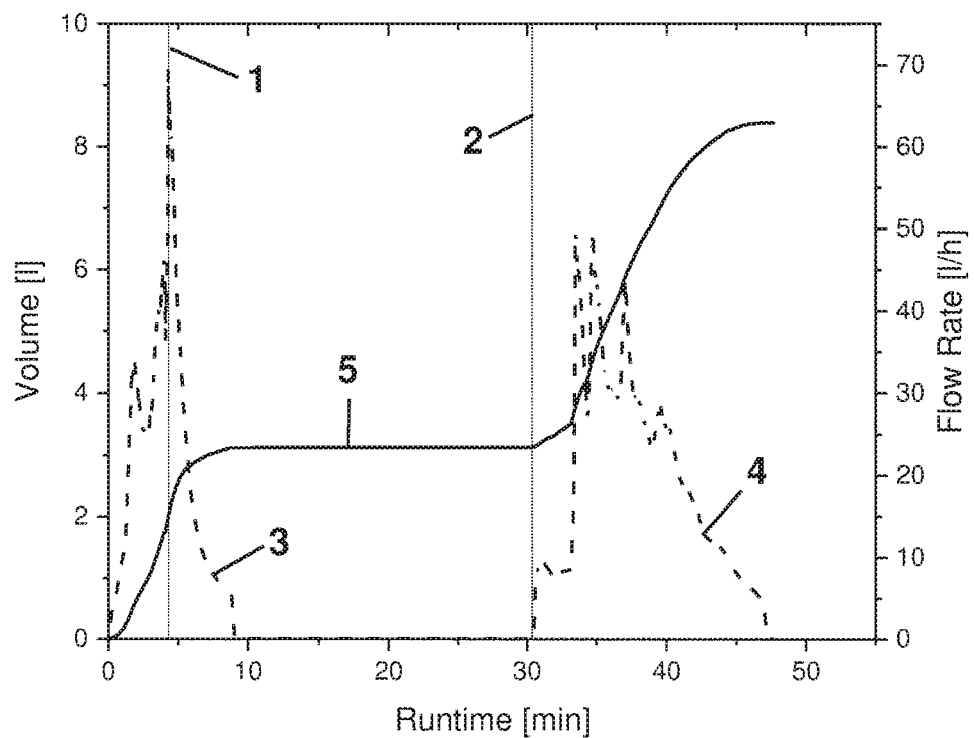
Figure 35:
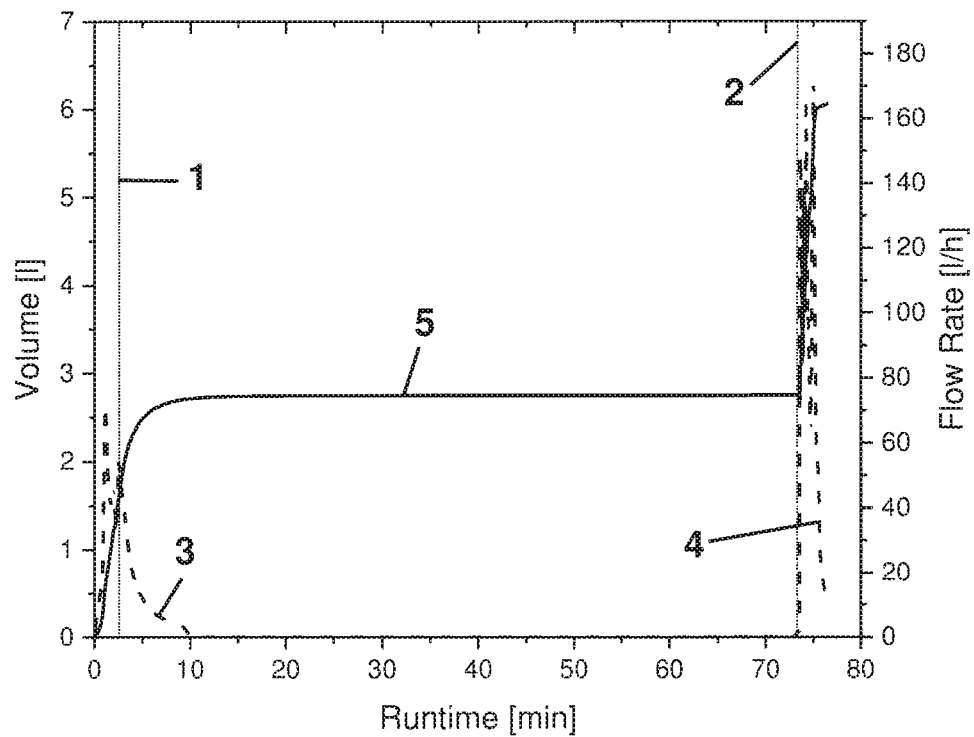
Figure 36:
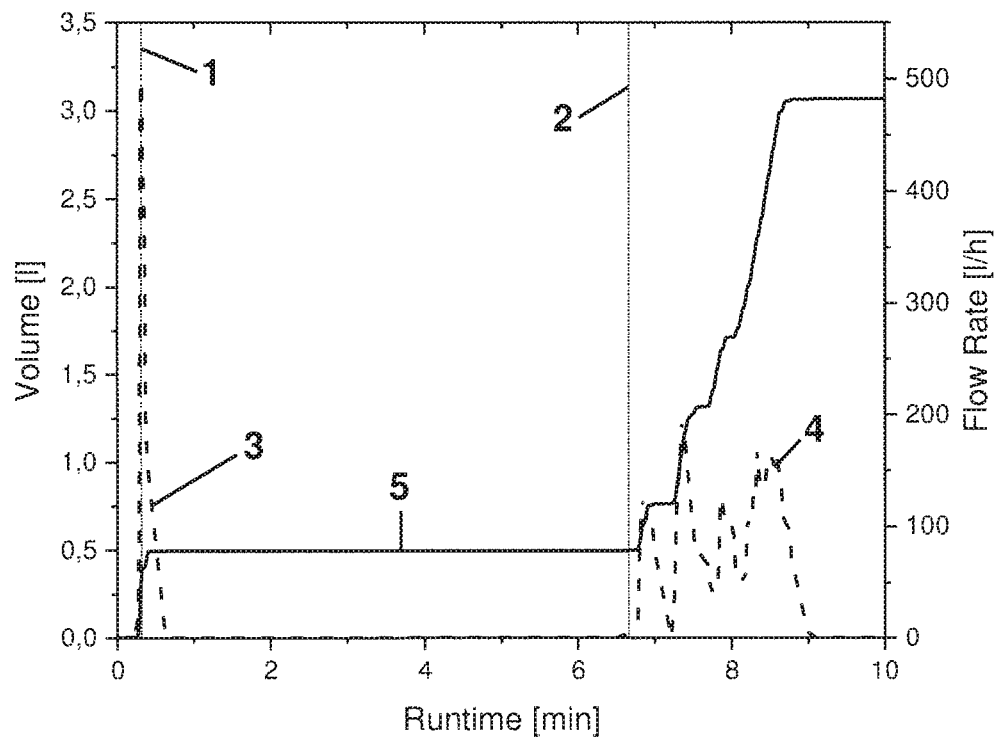
Figure 37:
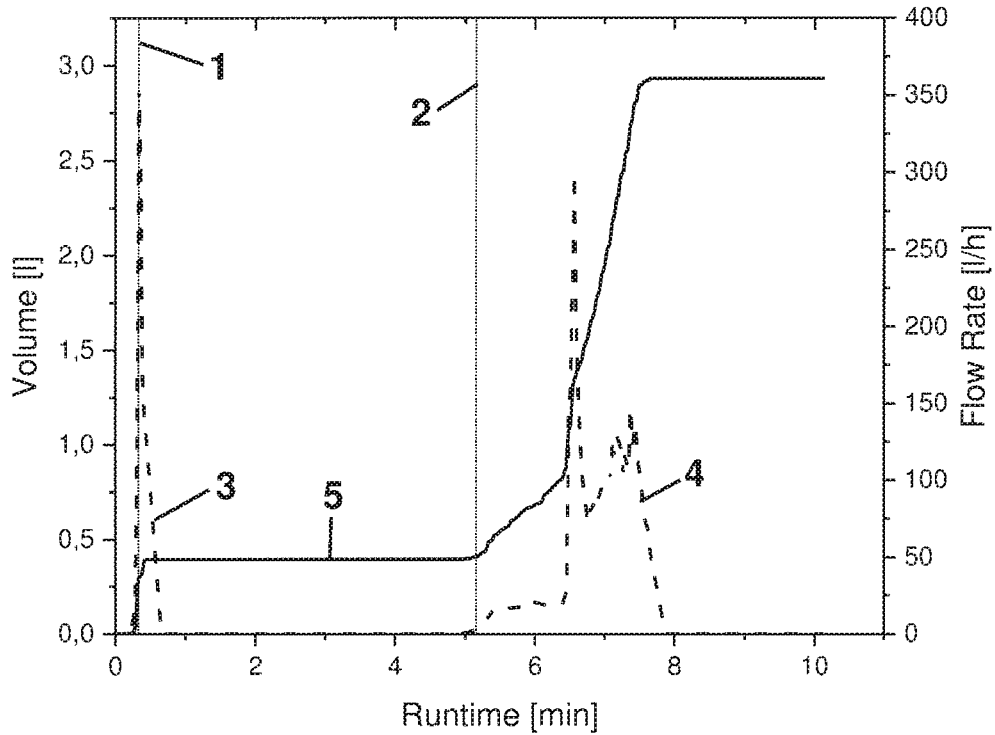
Figure 38:
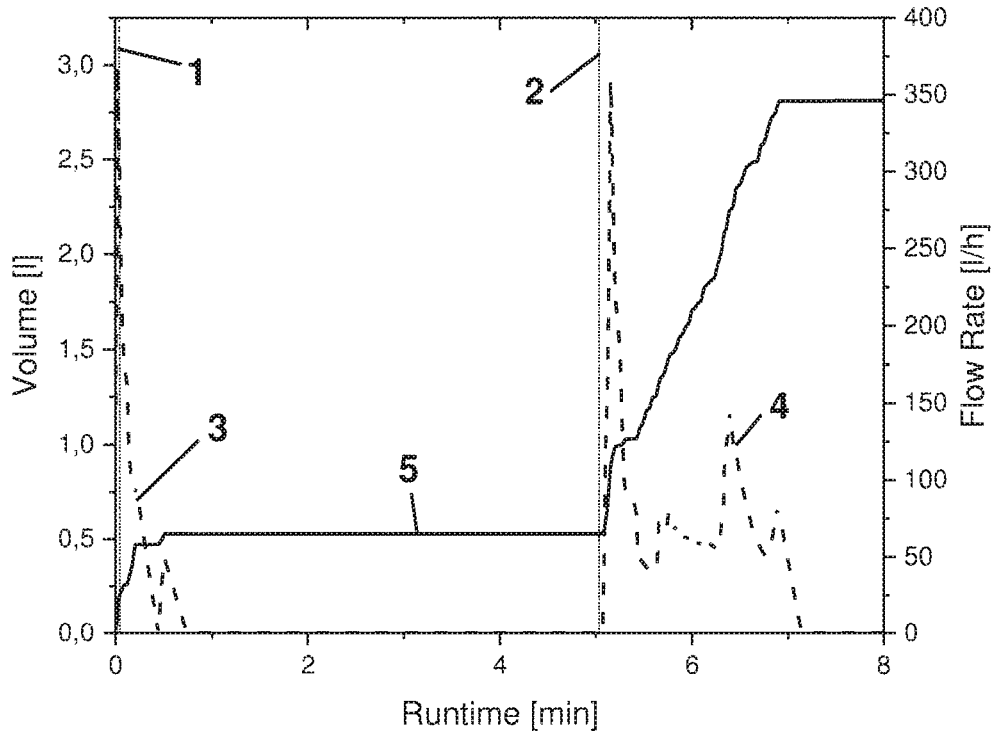
Figure 41:
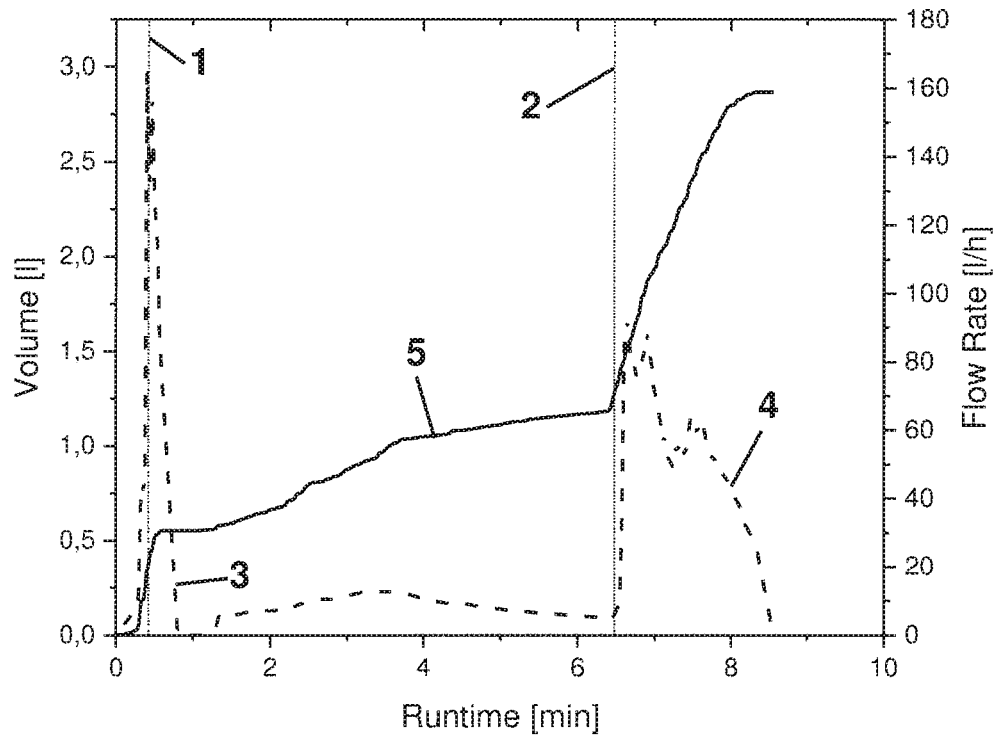
Figure 42:
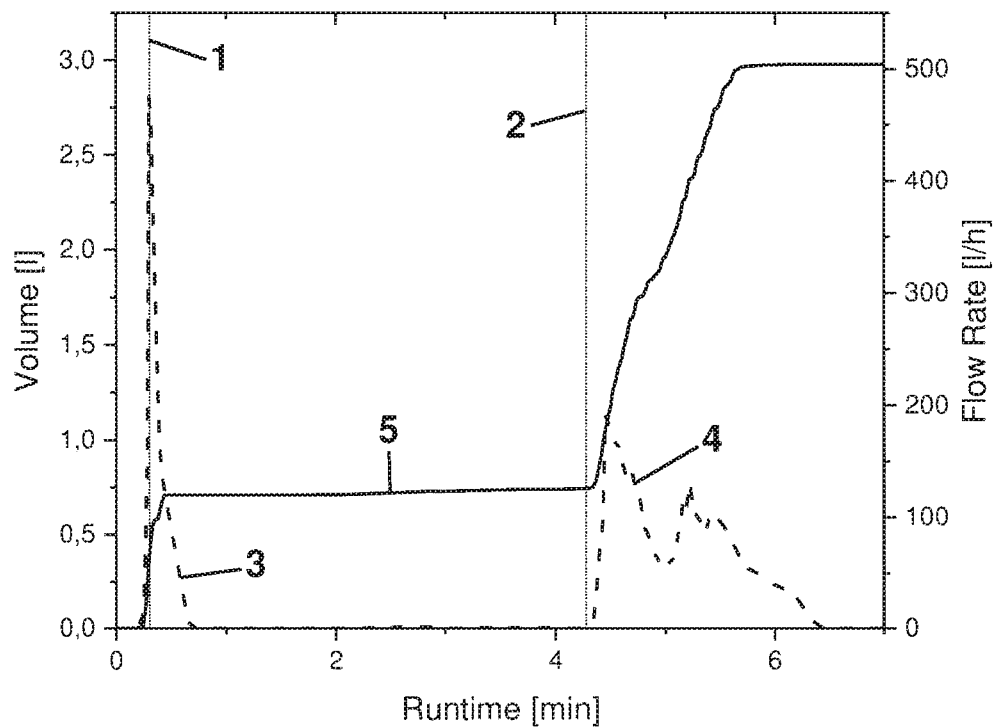
Figure 43:
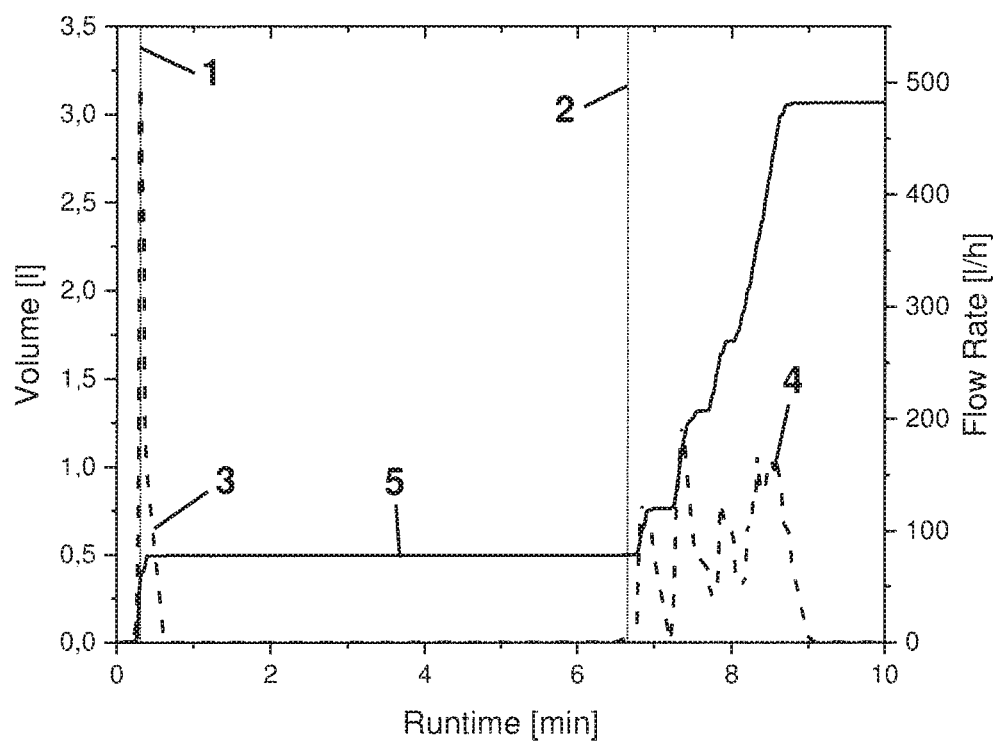
Figure 44:
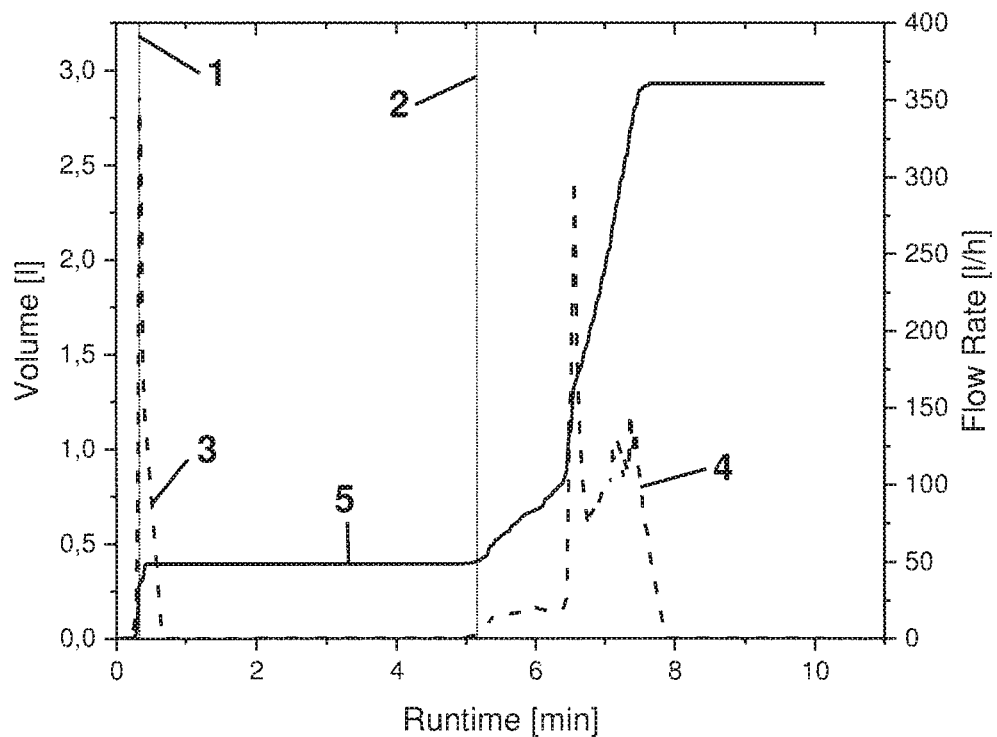
Figure 45:
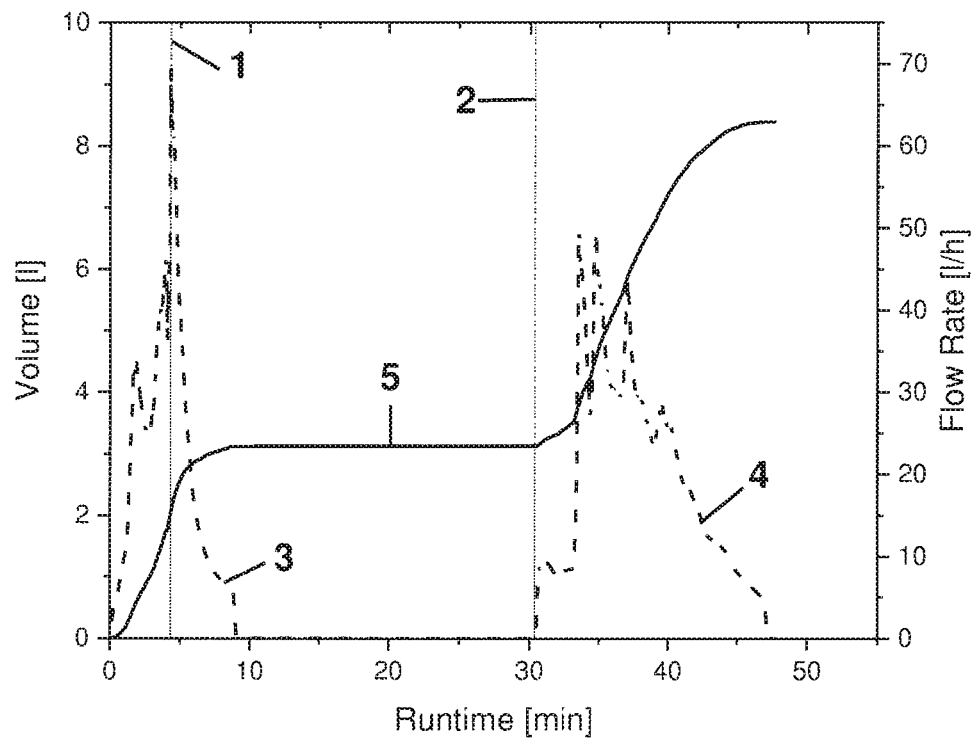
FIGS. 45 to 49 are graphs illustrating decomposition of UHP, catalyzed by dissolved or dispersed catalysts, termination of the decomposition reactions by addition of solid acids or liquid acids, and restart of the decomposition reactions by addition of solid bases.
Figure 46:
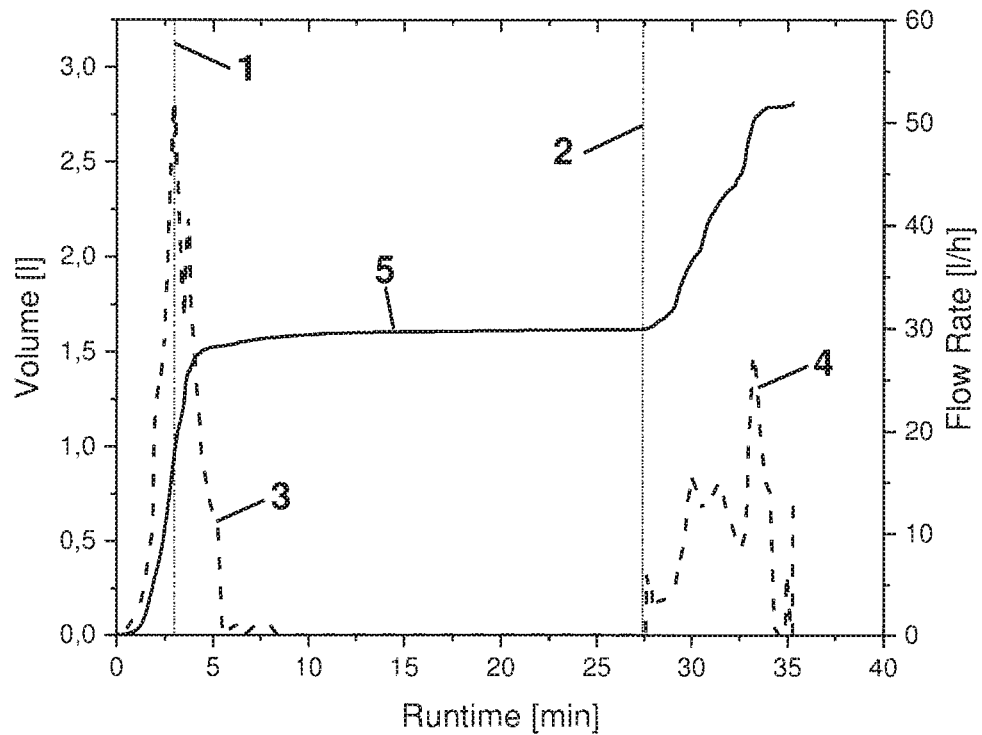
Figure 47:
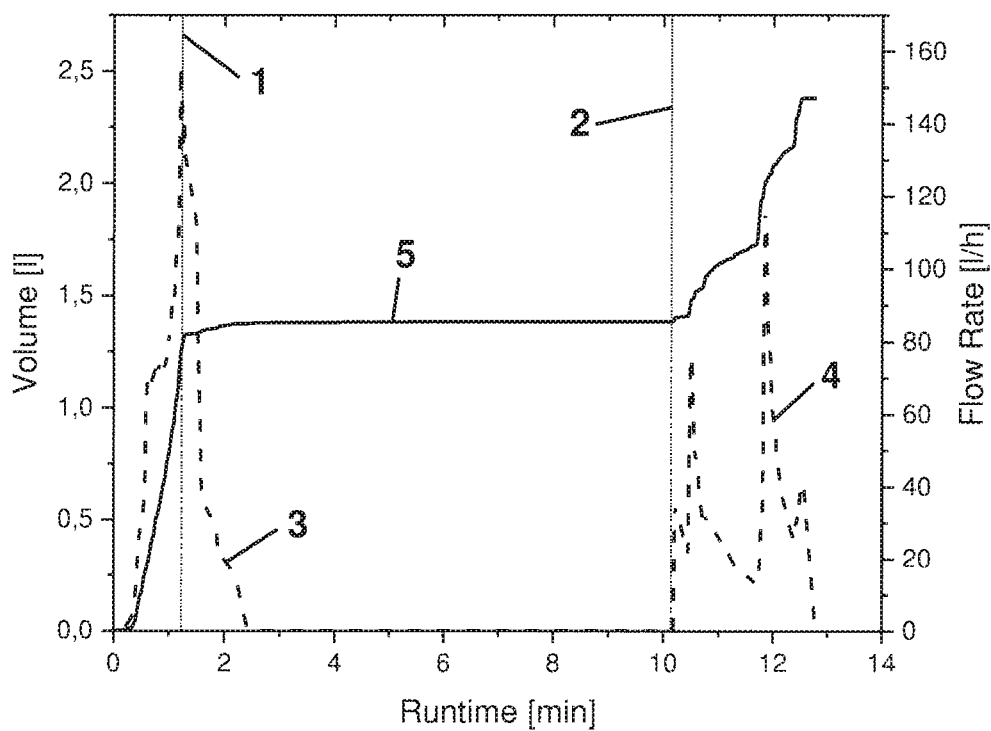
Figure 48:
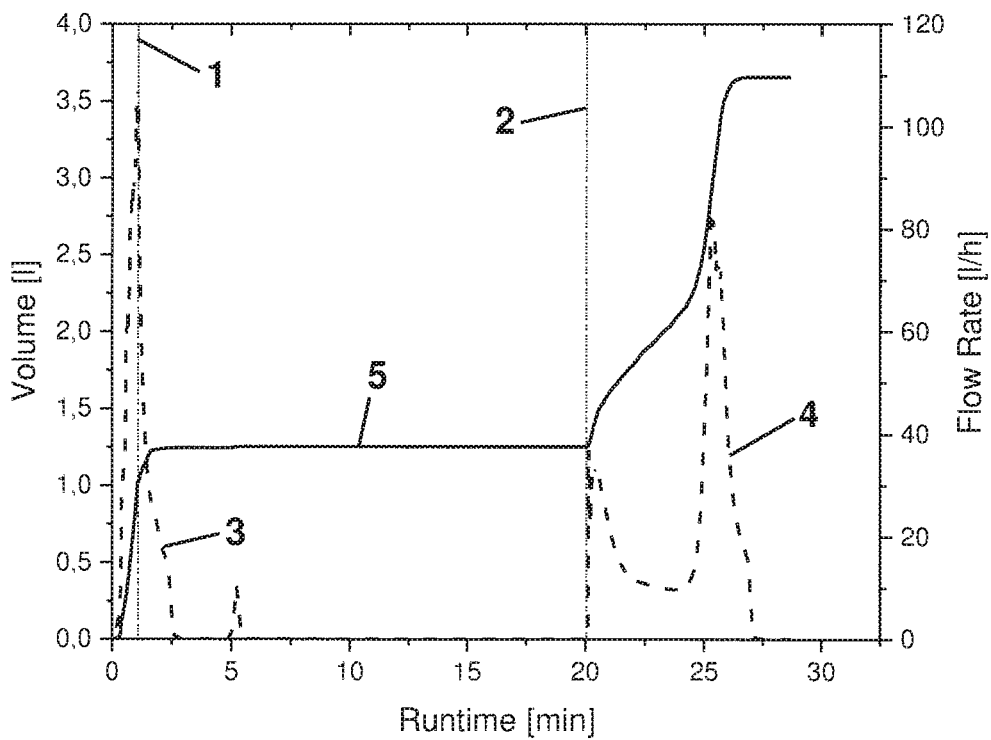
Figure 49:
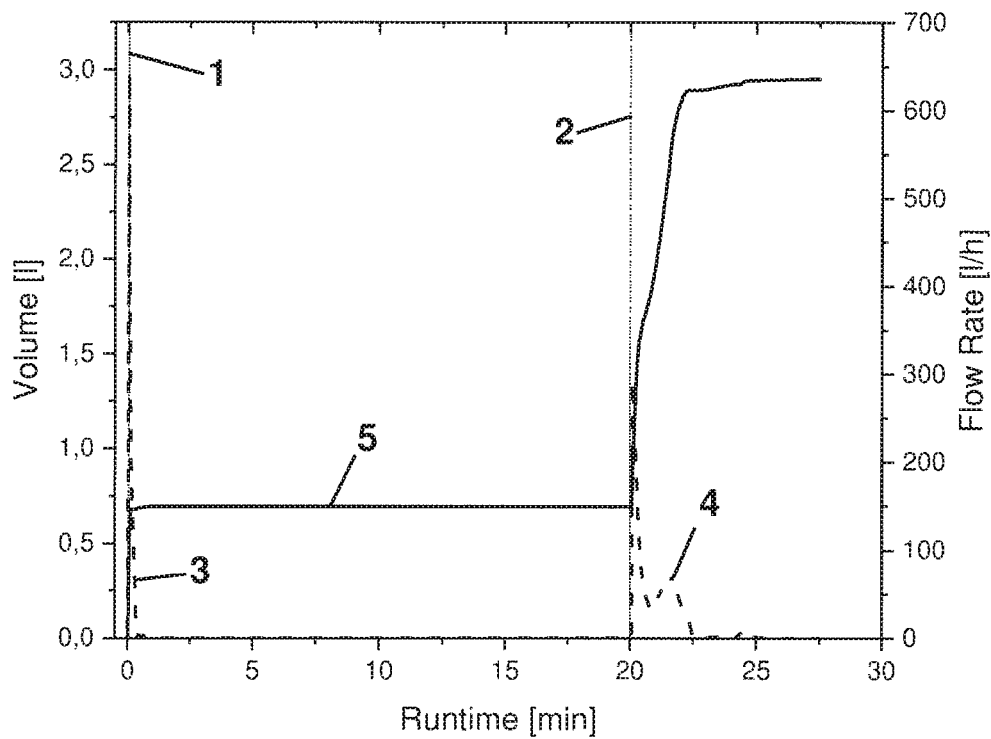
Figure 50:
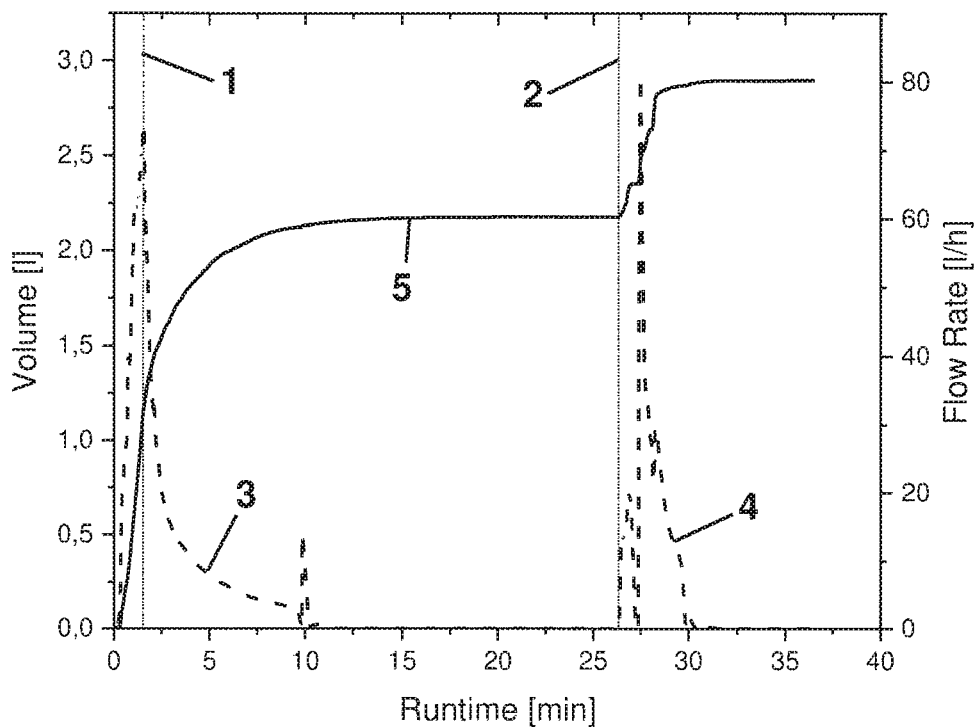
FIGS. 50 to 55 are graphs illustrating decomposition of UHP, catalyzed by dissolved or dispersed catalysts, termination of the decomposition reactions by addition of ionic liquids with acidic functionality, and restart of the decomposition reactions by addition of sodium hydroxide solutions.
Figure 51:
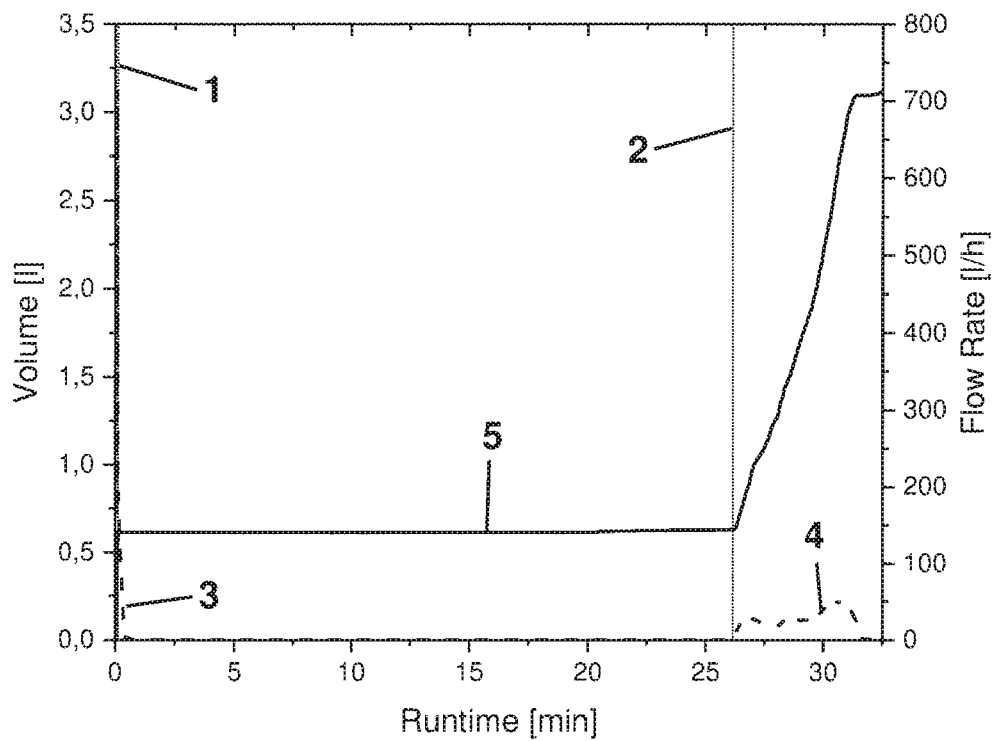
Figure 52:
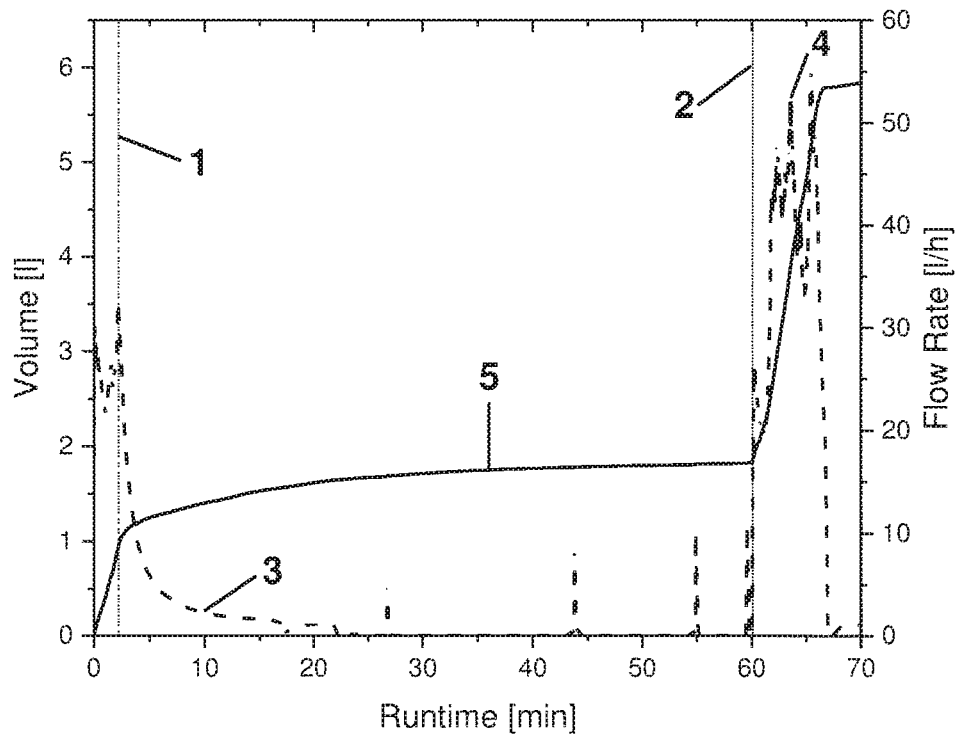
Figure 53:
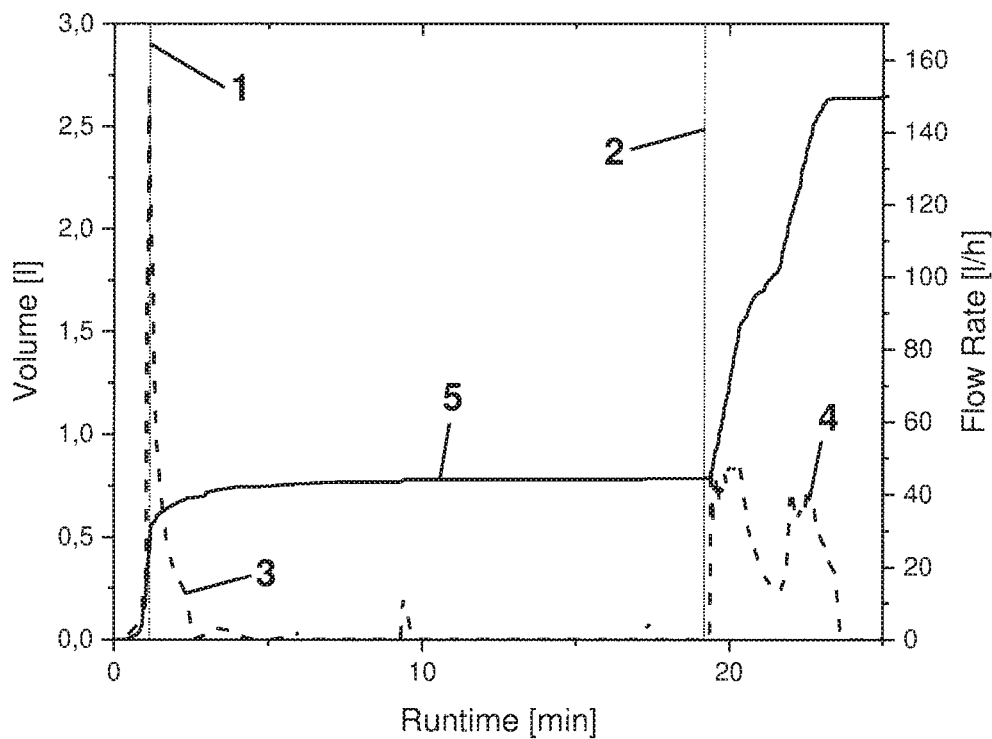
Figure 54:
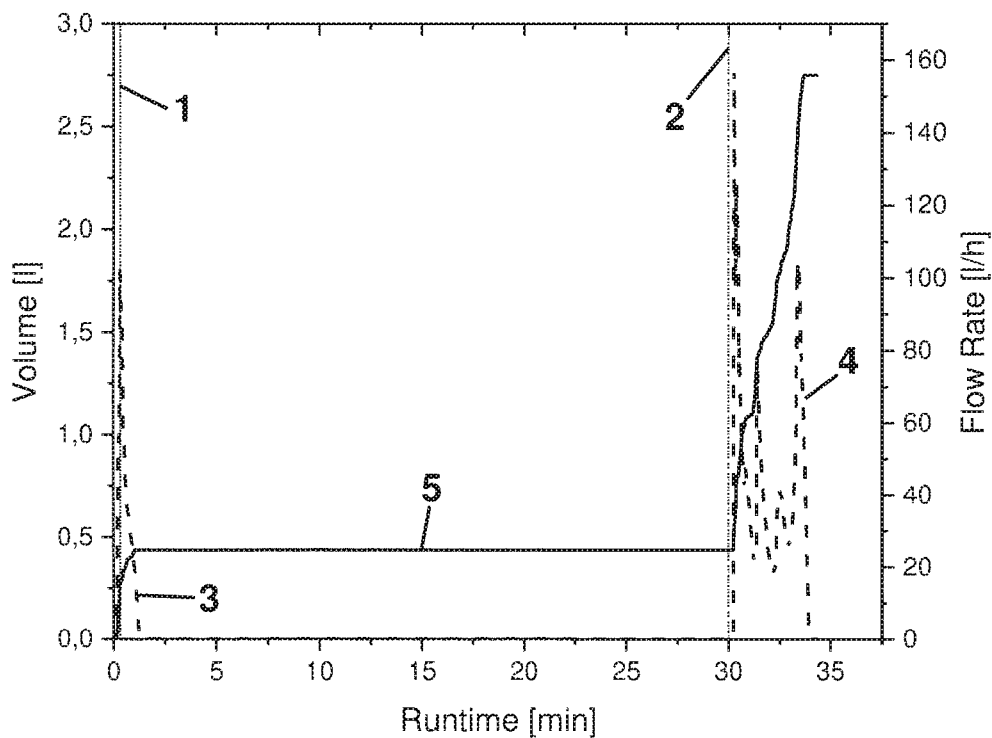
Figure 55:
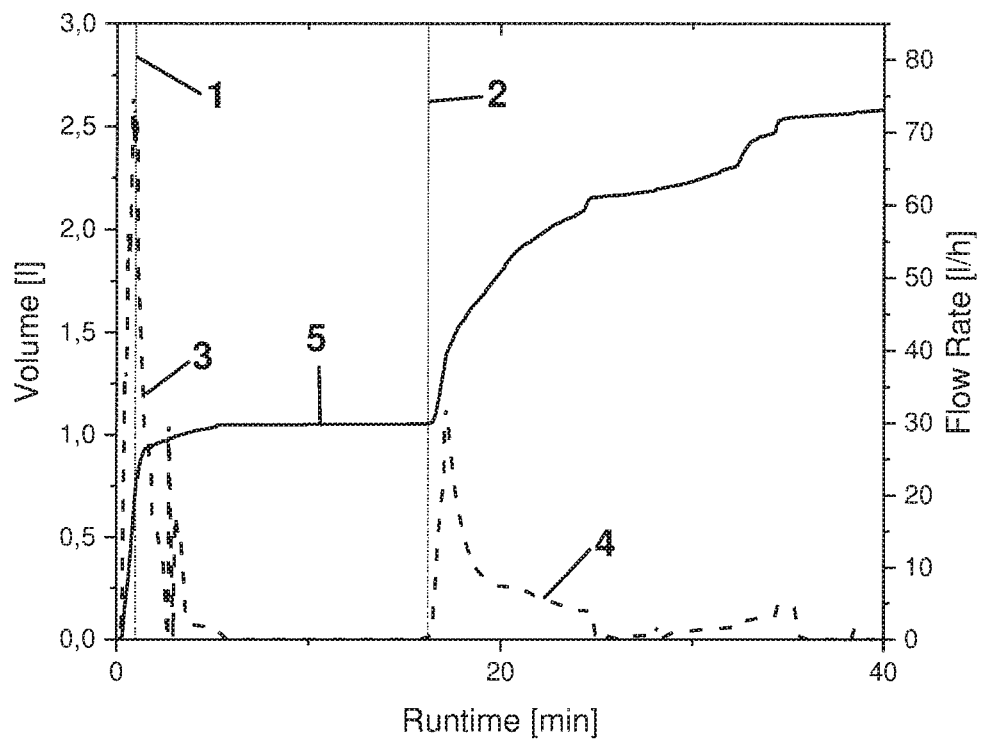
Figure 56:
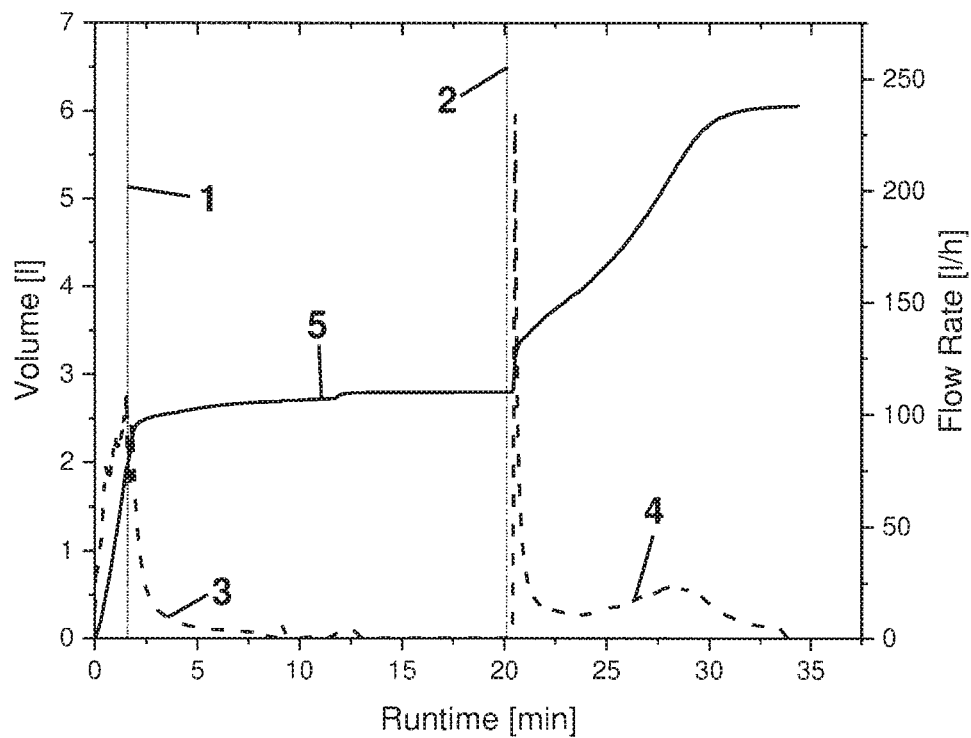
FIGS. 56 to 59 are graphs illustrating decomposition of UHP, catalyzed by dissolved or dispersed catalysts, termination of the decomposition reactions by addition of liquid acids, and restart of the decomposition reactions by ionic liquids with basic functionality.
Figure 57:
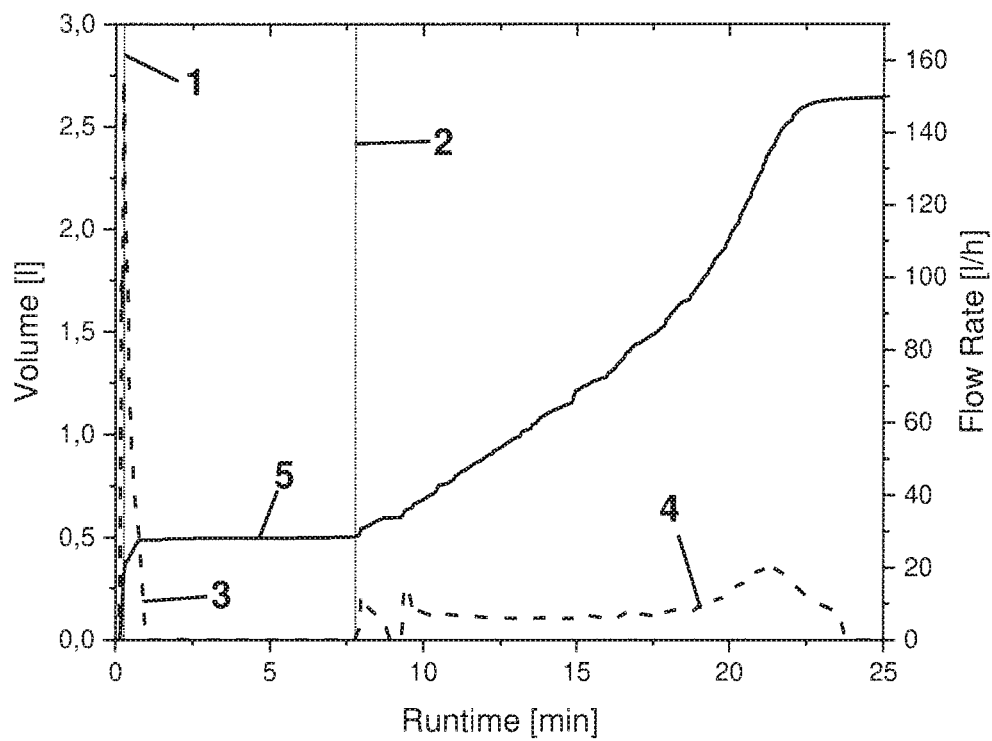
Figure 58:
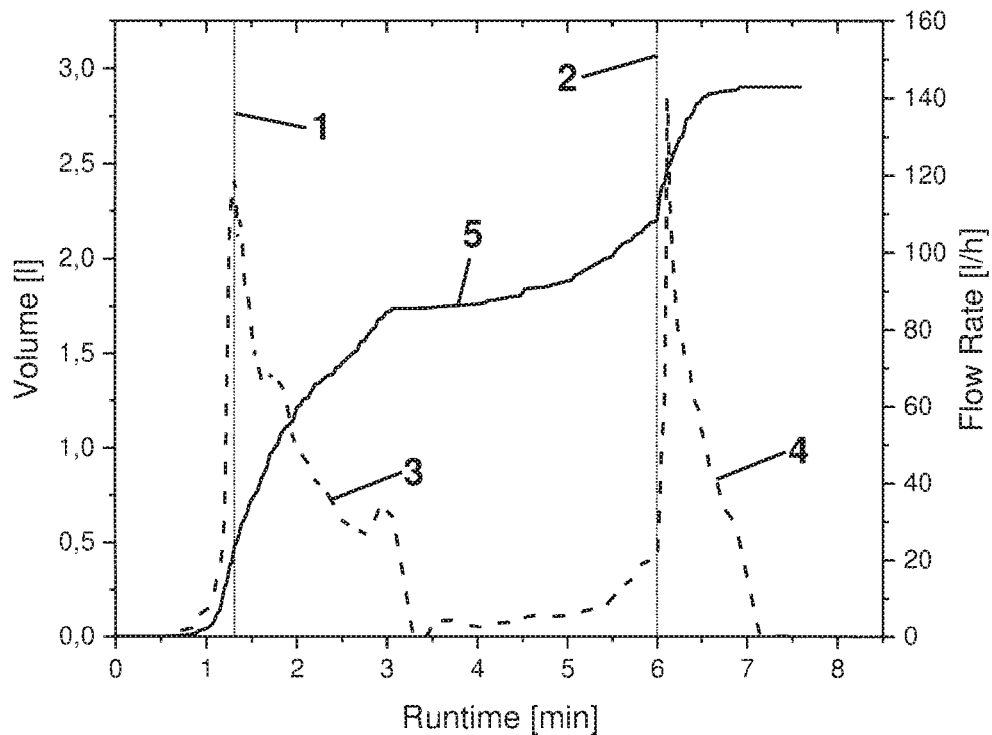
Figure 59:
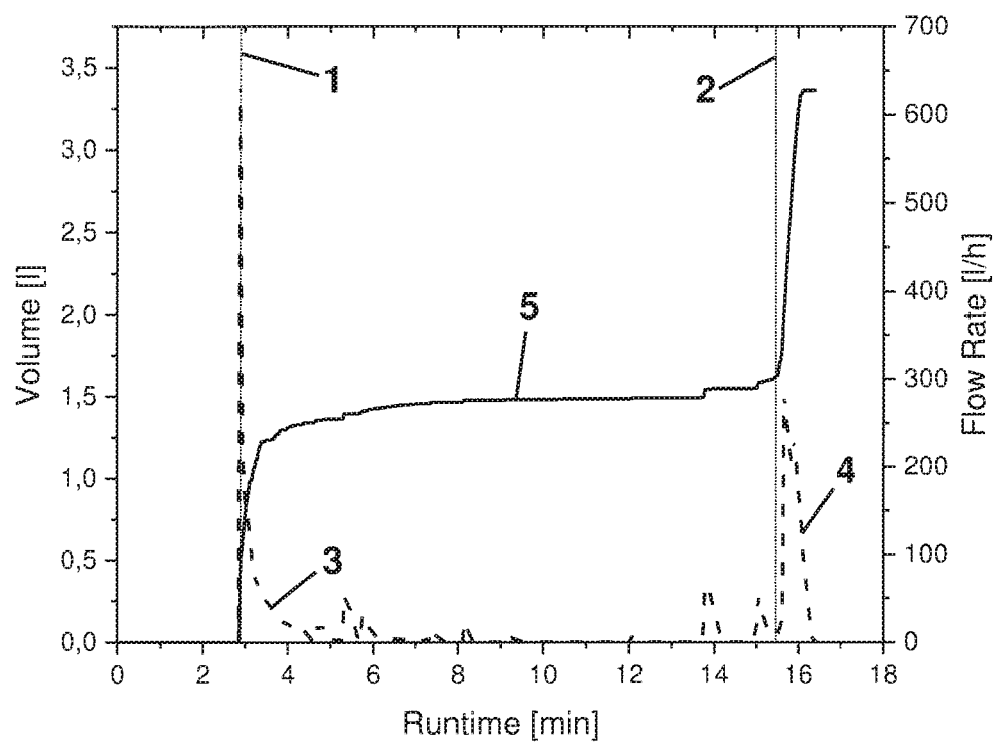

In FIGS. 30 and 31, line 1 indicates the time of addition of the acid, line 2 indicates the time of addition of the base, lines 3 and 4 indicate the oxygen flow rates, and line 5 indicates the oxygen volume released in total from the oxygen source.

Example 9 proves that the procedure of interrupting the decomposition process of a peroxide compound, and of restarting the peroxide decomposition process, is not limited to hydrogen peroxide adduct compounds such as UHP, but rather is applicable to compounds having peroxo groups in general, such as e.g. sodium percarbonate and sodium perborate.

Example 10

Example 10 comprises experiments 32 to 39. In each experiment, an ionic liquid having catalyst dissolved or dispersed therein was added to a peroxide compound (UHP) contained in a glass flask. After a predetermined period of time, a solid acid was added into the flask, and after a further predetermined period of time, a base was added into the flask.

Types and amounts of the compounds used in each experiment, as well as the time of addition (in minutes after start of the runtime) of acids and bases are listed in table 10. Table 10 also shows in which figure each particular experiment is illustrated.

TABLE 10

| Figure/ experiment | catalyst (mass) | peroxide adduct (mass) | ionic liquid (mass) | acid (time of addition) | base (time of addition) |
|---|---|---|---|---|---|
| 32 | Pb(OAc)$_2$•3H$_2$O (1008 mg) | UHP (20 g) | [MMIM][PO$_4$Me$_2$] (10 g) | citric acid (2.5 min) | NaOH$_{(aq.)}$ (21.6 min) |
| 33 | Mn(OAc)$_2$•4H$_2$O (367.9 mg) | UHP (20 g) | [BMIM][OAc] (10 g) | KH$_2$PO$_{4(s)}$ (3.0 min) | KOH$_{(s)}$ (27.5 min) |
| 34 | MnO$_2$ (1109 mg) | UHP (40 g) | [MMIM][PO$_4$Me$_2$] (25 g) | NaHSO$_{4(s)}$ (4.3 min) | K$_2$CO$_{3(s)}$ (30.4 min) |
| 35 | MnO$_2$ (1109 mg) | UHP (40 g) | [MMIM][PO$_4$Me$_2$] (25 g) | citric acid (2.7 min) | NaOH$_{(aq.)}$ (73.4 min) |
| 36 | Pb(OAc)$_2$•3H$_2$O (1008 mg) | UHP (20 g) | [EMIM][OAc] (10 g) | succinic acid (0.3 min) | NaOH$_{(aq.)}$ (6.7 min) |
| 37 | Pb(OAc)$_2$•3H$_2$O (1008 mg) | UHP (20 g) | [EMIM][OAc] (10 g) | benzoic acid (0.3 min) | NaOH$_{(aq.)}$ (5.2 min) |
| 38 | FeCl$_3$•6H$_2$O (14.4 mg) | UHP (20 g) | [EMIM][OAc] (10 g) | NaHSO$_{4(s)}$ (0.1 min) | NaOH$_{(aq.)}$ (5.0 min) |
| 39 | CoSO$_4$•7H$_2$O (14.9 mg) | UHP) (20 g) | [EMIM][OAc] (10 g) | NaHSO$_{4(s)}$ (0.8 min; 3.0 min) | NaOH$_{(aq.)}$ (7.4 min) |

In each of FIGS. 32 to 38, line 1 indicates the time of addition of the acid, line 2 indicates the time of addition of the base, lines 3 and 4 indicate the oxygen flow rates, and line 5 indicates the oxygen volume released in total from UHP.

FIGS. 32 to 38 show that the peroxide decomposition reaction is stopped promptly upon addition of a solid acid, and is restarted promptly upon addition of a base.

In FIG. 39, lines 1 and 6 indicate the time of addition of an acid, line 2 indicates the time of addition of the base, lines 3 and 4 indicate the oxygen flow rates, and line 5 indicates the oxygen volume released in total from UHP. FIG. 39 shows that the addition of an acid to the oxygen producing composition does not necessarily stop the peroxide decomposition reaction completely. Rather, the decomposition reaction may be only decelerated, depending from the type and amount of acid added to the oxygen generating composition. In experiment 39, the peroxide decomposition reaction is decelerated after addition of a first amount of solid sodium hydrogen sulfate (see line 3), and is completely stopped after addition of a second amount of solid sodium hydrogen sulfate.

Example 10 proves that the peroxide decomposition reaction can be stopped, or alternatively decelerated, by adding different solid acids. The decomposition reaction can be restarted, or alternatively accelerated, by adding a basic compound. The phenomenon is not limited to particular compounds or combinations of compounds, but is widely applicable to different catalysts, ionic liquids, acids and bases.

Example 11

Example 11 comprises experiments 40 to 44. In each experiment, an ionic liquid having catalyst (lead acetate) dissolved therein was added to a peroxide compound (UHP) contained in a glass flask. After a predetermined period of time, a solid acid was added into the flask, and after a further predetermined period of time, a liquid base (aqueous solution of sodium hydroxide) was added into the flask.

Types and amounts of the compounds used in each experiment, as well as the time of addition (in minutes after start of the runtime) of acids and bases are listed in table 11. Table 11 also shows in which figure each particular experiment is illustrated.

TABLE 11

| Figure/ experiment | catalyst (mass) | peroxide adduct (mass) | ionic liquid (mass) | acid (time of addition) | base (time of addition) |
|---|---|---|---|---|---|
| 40 | Pb(OAc)$_2$•3H$_2$O (1008 mg) | UHP (20 g) | [MMIM][PO$_4$Me$_2$] (10 g) | citric acid (2.5 min) | NaOH$_{(aq.)}$ (21.6 min) |
| 41 | Pb(OAc)$_2$•3H$_2$O (1008 mg) | UHP (20 g) | [EMIM][OAc] (10 g) | KH$_2$PO$_4$ (0.4 min) | NaOH$_{(aq.)}$ (6.5 min) |
| 42 | Pb(OAc)$_2$•3H$_2$O (1008 mg) | UHP (20 g) | [EMIM][OAc] (10 g) | NaHSO$_4$ (0.3 min) | NaOH$_{(aq.)}$ (4.3 min) |
| 43 | Pb(OAc)$_2$•3H$_2$O (1008 mg) | UHP (20 g) | [EMIM][OAc] (10 g) | succinic acid (0.3 min) | NaOH$_{(aq.)}$ (6.7 min) |
| 44 | Pb(OAc)$_2$•3H$_2$O (1008 mg) | UHP (20 g) | [EMIM][OAc] (10 g) | benzoic acid (0.3 min) | NaOH$_{(aq.)}$ (5.2 min) |

In each of FIGS. 40-44, line 1 indicates the time of addition of the acid, line 2 indicates the time of addition of the base, lines 3 and 4 indicate the oxygen flow rates, and line 5 indicates the oxygen volume released in total from UHP.

FIGS. 40-44 show that the peroxide decomposition reaction is stopped promptly upon addition of a solid acid, and is restarted promptly upon addition of an aqueous base solution.

Example 11 proves that the peroxide decomposition reaction can be stopped by addition of different solid acids.

Example 12

Example 12 comprises experiments 45 to 49. In each experiment, an ionic liquid having catalyst dissolved or dispersed therein was added to a peroxide compound (UHP) contained in a glass flask. After a predetermined period of time, a solid or liquid acid was added into the flask, and after a further predetermined period of time, a solid base was added into the flask.

Types and amounts of the compounds used in each experiment, as well as the time of addition (in minutes after start of the runtime) of acids and bases are listed in table 12. Table 12 also shows in which figure each particular experiment is illustrated.

In each of FIGS. 45-49, line 1 indicates the time of addition of the acid, line 2 indicates the time of addition of the base, lines 3 and 4 indicate the oxygen flow rates, and line 5 indicates the oxygen volume released in total from UHP.

FIGS. 45-49 show that the peroxide decomposition reaction is stopped promptly upon addition of a liquid or solid acid, and is restarted promptly upon addition of a solid base.

Example 12 proves that the decomposition of a peroxide compound in an ionic liquid can be stopped by adding an acid, and can be restarted by addition of solid bases. The phenomenon is not limited to particular acids, bases, catalysts, etc., but rather the concept is widely applicable to different combinations of catalysts, ionic liquids, peroxides, acids, and bases.

Example 13

Example 13 comprises experiments 50-54. In each experiment, an ionic liquid having catalyst dissolved or dispersed therein was added to a peroxide compound (UHP) contained in a glass flask. After a predetermined period of time, an ionic liquid having acidic functionality was added into the flask, and after a further predetermined period of time, a liquid base (aqueous solution of sodium hydroxide) was added into the flask.

Types and amounts of the compounds used in each experiment, as well as the time of addition (in minutes after start of the runtime) of acids and bases are listed in table 13. Table 13 also shows in which figure each particular experiment is illustrated.

TABLE 12

| Figure/ experiment | catalyst (mass) | peroxide adduct (mass) | ionic liquid (mass) | acid (time of addition) | base (time of addition) |
|---|---|---|---|---|---|
| 45 | MnO$_2$ (1109 mg) | UHP (40 g) | [MMIM][PO$_4$Me$_2$] (25 g) | NaHSO$_{4(s)}$ (4.3 min) | K$_2$CO$_{3(s)}$ (30.4 min) |
| 46 | Mn(OAc)$_2$•4H$_2$O (367.9 mg) | UHP (20 g) | [BMIM][OAc] (10 g) | KH$_2$PO$_{4(s)}$ (3.0 min) | KOH$_{(s)}$ (27.5 min) |
| 47 | Mn(OAc)$_2$•4H$_2$O (367.9 mg) | UHP) (20 g) | [EMIM][OAc] (10 g) | HCl$_{(aq.)}$ (1.2 min) | CaO$_{(s)}$ (10.1 min) |
| 48 | Mn(OAc)$_2$•4H$_2$O (367.9 mg) | UHP (20 g) | [EMIM][OAc] (10 g) | H$_2$SO$_{4(aq.)}$ (1.1 min) | sodium percarbonate(s) (20.0 min) |
| 49 | FeCl$_3$•6H$_2$O (57.4 mg) | UHP (20 g) | [EMIM][OAc] (10 g) | HNO$_{3(aq.)}$ (0.1 min) | K$_3$PO$_{4(s)}$ (20.0 min) |

TABLE 13

| Figure/ experiment | catalyst (mass) | peroxide adduct (mass) | ionic liquid (mass) | acid (time of addition) | base (time of addition) |
|---|---|---|---|---|---|
| 50 | $Mn(OAc)_2 \cdot 4H_2O$ (367.9 mg) | UHP (20 g) | [EMIM][OAc] (10 g) | [EMIM][$HSO_4$] (1.6 min) | $NaOH_{(aq.)}$ (26.4 min) |
| 51 | $Pb(OAc)_2 \cdot 3H_2O$ (1008.0 mg) | UHP (20 g) | [EMIM][$EtSO_4$] (10 g) | [EMIM][$HSO_4$] (0.1 min) | $NaOH_{(aq.)}$ (26.4 min) |
| 52 | $MnO_2$ (1108.8 mg) | UHP (40 g) | [MMIM][$PO_4Me_2$] (25 g) | [EMIM][$HSO_4$] (2.2 min) | $NaOH_{(aq.)}$ (60.1 min) |
| 53 | $CoSO_4 \cdot 7H_2O$ (14.9 mg) | UHP (20 g) | [EMIM][OAc] (10 g) | [EMIM][$HSO_4$] (1.2 min) | $NaOH_{(aq.)}$ (19.2 min) |
| 54 | $FeCl_3 \cdot 6H_2O$ (14.4 mg) | UHP (20 g) | [EMIM][OAc] (10 g) | [EMIM][$HSO_4$] (0.4 min) | $NaOH_{(aq.)}$ (30.0 min) |

In each of FIGS. 50-55, line 1 indicates the time of addition of the ionic liquid with acidic functionality, line 2 indicates the time of addition of the base, lines 3 and 4 indicate the oxygen flow rates, and line 5 indicates the oxygen volume released in total.

FIGS. 50-54 show that the peroxide composition reaction is stopped promptly upon addition of an ionic liquid having acidic functionality, and is restarted promptly upon addition of a liquid base.

Thus, example 13 proves that the peroxide decomposition reaction in ionic liquids can be stopped by adding an additional ionic liquid having acidic functionality. Termination of the decomposition reaction by acidic ionic liquids is not limited to particular decomposition catalysts.

Example 14

Example 14 comprises experiments 55-59. In each experiment, an ionic liquid having catalyst dissolved or dispersed therein was added to a peroxide compound (UHP) contained in a glass flask. After a predetermined period of time, a liquid acid was added into the flask, and after a further predetermined period of time, an ionic liquid having basic functionality was added into the flask.

Types and amounts of the compounds used in each experiment, as well as the time of addition (in minutes after start of the runtime) of acids and bases are listed in table 14. Table 14 also shows in which figure each particular experiment is illustrated.

TABLE 14

| Figure/ experiment | catalyst (mass) | peroxide adduct (mass) | ionic liquid (mass) | acid (time of addition) | base (time of addition) |
|---|---|---|---|---|---|
| 55 | $Mn(OAc)_2 \cdot 4H_2O$ (367.9 mg) | UHP (20 g) | [EMIM][OAc] (10 g) | [EMIM][$HSO_4$] (1.0 min) | [EMIM][OAc] (16.1 min) |
| 56 | $MnO_2$ (1108.8 mg) | UHP (40 g) | [EMIM][$EtSO_4$] (25 g) | $H_2SO_{4(aq.)}$ (1.6 min) | [EMIM][OAc] (20.2 min) |
| 57 | $FeCl_3 \cdot 6H_2O$ (14.4 mg) | UHP (20 g) | [EMIM][OAc] (10 g) | $H_2SO_{4(aq.)}$ (0.3 min) | [EMIM][OAc] (7.8 min) |
| 58 | $CoSO_4 \cdot 7H_2O$ (14.9 mg) | UHP (20 g) | [EMIM][OAc] (10 g) | $H_2SO_{4(aq.)}$ (1.3 min) | [EMIM][OAc] (6.0 min) |
| 59 | $CuCl_2 \cdot 2H_2O$ (18.1 mg) | UHP (20 g) | [MMIM][$PO_4Me_2$] (5 g) | $H_2SO_{4(aq.)}$ (2.9 min) | [EMIM][OAc] (15.4 min) |

In each of FIGS. 55-59, line 1 indicates the time of addition of the acid, line 2 indicates the time of addition of the base (additional ionic liquid having basic functionality), lines 3 and 4 indicate the oxygen flow rates, and line 5 indicates the oxygen volume released in total.

FIGS. 55-59 show that the peroxide decomposition reaction can be stopped or decelerated by adding a liquid acid. In the reaction shown in FIG. 58 the amount of added sulfuric acid was not sufficient to achieve a complete termination of the decomposition reaction promptly. FIGS. 55-59 also show that the peroxide decomposition reaction can be restarted by adding ionic liquids having basic functionality.

Thus, example 14 proves that ionic liquids having basic properties can restart interrupted peroxide decomposition reactions. This phenomenon is not limited to particular oxygen generating compositions, but rather the concept is widely applicable to different catalysts, peroxide compounds and ionic liquids.

Figure 60:
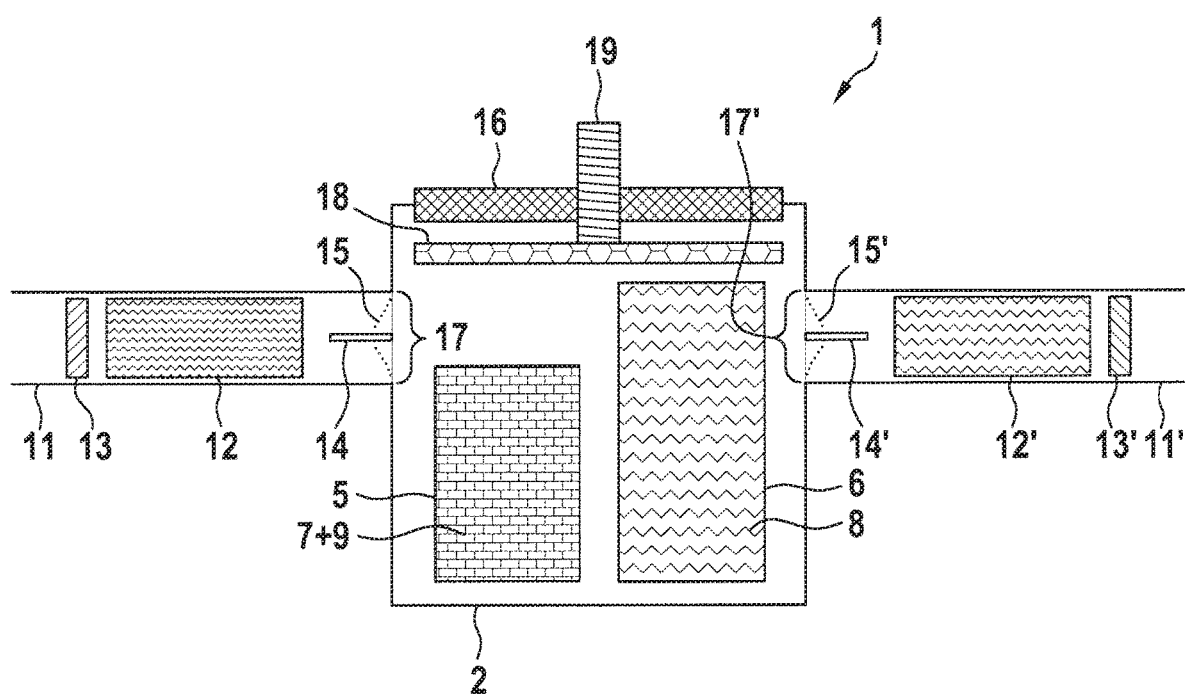
FIG. 60 is a sectional view of an embodiment of a device for generating oxygen according to this invention.

FIG. 60 illustrates an exemplary device 1 for generating oxygen in a controlled manner, the device having one single reaction chamber 2 for storing the composition for generating oxygen. In such a single reaction chamber 2 at least one of the constituents of the composition for generating oxygen can be enclosed in a receptacle in order to avoid contact with the remaining constituents of the composition contained in the reaction chamber 2. The device is particularly suitable for use with neutral and basic ionic liquids. In the embodiment shown in FIG. 60, two receptacles 5, 6 are arranged in the reaction chamber. Receptacle 5 contains an intimate mixture of the oxygen source 7 and the decomposition catalyst 9, for example in powder form or compressed into pellets, in a thoroughly dried condition. Receptacle 6 contains the ionic liquid 8.

Alternatively, there may be only one receptacle for enclosing the peroxide/catalyst mixture, while the ionic liquid is "free" within reaction chamber 2, or ionic liquid 8 may be enclosed within a receptacle, while the peroxide/catalyst mixture is not enclosed in a separate receptacle. Further alternatively, the catalyst may be dissolved (soluble metal salts) or partly dissolved (partly soluble metal salts) or dispersed (insoluble metals salts or metal oxide compounds) in the ionic liquid. This alternative is particularly advantageous. It is, in principle, also possible to enclose only the catalyst within a separate receptacle, while the ionic liquid and the peroxide are not enclosed. It is only necessary to avoid contact between all three constituents during storage of the device for generating oxygen.

It is desirable to store the peroxide 7, the ionic liquid 8 and the catalyst 9 within the reaction chamber 2 in such an arrangement that all constituents will be able to get intimately mixed once oxygen generation is required. When, for example, an insoluble or only partly soluble metal salt is used as a catalyst, and this catalyst and the ionic liquid are provided in one receptacle, and the peroxide in another receptacle, the catalyst may settle within the ionic liquid during storage. In such a case proper mixing with the peroxide may be inhibited. Quick and perfect mixing of all constituents can be achieved when the peroxide and the soluble or insoluble catalyst are intimately mixed in advance in a dry condition, optionally compacted into moulds, and filled either into the reaction chamber 2 or into a separate receptacle 5 to be placed within the reaction chamber 2, and the ionic liquid is provided in a separate receptacle 6. Quick and perfect mixing can also be achieved when the catalyst is soluble in the ionic liquid, and is essentially dissolved therein. Placing the ionic liquid (or the ionic liquid and the catalyst) in a separate receptacle, although this is not absolutely necessary in a case where peroxide and catalyst (or the peroxide alone) are placed in a receptacle 5, constitutes an advantageous precautionary measure against accidental mixing of the constituents in case of receptacle 5 leakage or breakage. Care must be taken, when UHP and catalyst are mixed, because UHP is highly hygroscopic.

In a situation where oxygen shall be generated, receptacle 5, or receptacles 5 and 6, respectively, are destroyed by a breaking device 18. In FIG. 60, breaking device 18 has the form of a plate, however, means for destroying the receptacle(s) are not limited to plates, and other means are known to persons skilled in the art, for example firing pins or grids. Movement of plate 18 can be achieved by a spring 19 or another activation mechanism. During storage of the device for generating oxygen, spring 19 is under tension and holds plate 18 at a position distant from receptacles 5, 6. Once the tension is released by a suitable trigger mechanism (not shown), spring 19 moves plate 18 towards receptacles 5, 6, and plate 18 destroys receptacles 5, 6. Such a trigger may be, for example, pulling an oxygen mask towards a passenger in an airplane.

Another exemplary trigger mechanism is an oxygen sensor sensing a low oxygen condition.

Receptacles 5, 6, and plate 18 are made from materials which guarantee that receptacles 5, 6 will be broken or ruptured when hit by plate 18. Exemplary materials are plastic foils or glass for receptacles 5, 6, and thicker plastic material or metal for plate 18.

Destruction of receptacles 5, 6 causes mixing of peroxide, ionic liquid, and catalyst, and initiates oxygen generation. In order to allow that the oxygen exits reaction chamber 2, reaction chamber 2 has an opening. In the illustrated embodiment, the opening is sealed with a gas permeable membrane 16. The opening may be at a different position than shown in FIG. 60, or there may be more than one opening.

In exemplary embodiments, the oxygen generated in the device described herein may be passed through a filter or other purification means as known in the art. The device may be equipped with such means.

The oxygen generating reaction is an only slightly exothermic process, and proceeds at low temperature, i.e. below 150° C., or even below 120° C. or below 100° C. Therefore, reaction chamber 2 does not need to resist high temperatures, and may be made from lightweight, low melting materials such as plastics. In addition, any bulky insulation is not required. This is particularly advantageous in all cases where weight must be saved and/or space is limited, for example in the case of oxygen masks which shall be installed in an aircraft.

The exemplary device illustrated in FIG. 60 is equipped with two injection devices 11, 11', for examples syringes or other dosing devices. Openings 17, 17' fluidly connect the interior spaces of reaction chamber 2 and of injection devices 11, 11' respectively.

The injection device 11 comprises a receptacle 12, a slide bar 13 and a spike 14. The injection device 11' comprises a receptacle 12', a slide bar 13' and a spike 14'. Spikes 14, 14' are held in place by fixtures 15, 15'. Receptacles 12, 12' are made from a material which can easily be ruptured, for example bags made from plastic foils. Receptacle 12 contains an acidic compound and receptacle 12' contains a basic compound.

In the exemplary embodiment illustrated in FIG. 60, slide bars 13, 13' can be actuated in an analogous manner as the braking device 18. Once actuated, slide bar 13 pushes receptacle 12 towards spike 14, receptacle 12 is ruptured and acid is injected through opening 17 into reaction chamber 2. Similarly, once actuated, slide bar 13' pushes receptacle 12' towards spike 14', receptacle 12' is ruptured and base is injected through opening 17' into reaction chamber 2.

Actuation of braking device 18 starts the peroxide decomposition reaction in reaction chamber 2. Without interference, the decomposition reaction proceeds until all peroxide compound has been decomposed. The device illustrated in FIG. 60 allows a user to stop the peroxide decomposition reaction by actuating slide bar 13, and to save the peroxide not yet decomposed for later use. Whenever oxygen is needed again, the user may actuate slide bar 13', thus starting the peroxide decomposition reaction again.

The device illustrated in FIG. 60 has only one injection device 11 containing an acidic compound, and one injection device 11' containing a basic compound. Such a device allows to stop and to restart the peroxide composition reaction only once. Providing reaction chamber 2 with several injection devices containing an acid, and with several injection devices containing a base allows to stop and to restart the peroxide decomposition several times. For example, a device 1 for generating oxygen having three injection devices containing acidic compounds and having three injection devices containing basic compounds, allows a user to interrupt and to restart the oxygen production three times, or at least until all of the oxygen source has been decomposed.

If desired, a device as illustrated in FIG. 60 can be also used for reducing or increasing the oxygen flow rate by injecting an acidic compound or a basic compound, respectively into reaction chamber 2, for example when leveling out increasing or decreasing or fluctuating oxygen flow rates shall be achieved.

It is also possible to provide only injection devices filled with acid, or only injection devices filled with base. In such a case, oxygen generating device 1 will only allow to reduce the oxygen flow rate, or to increase the oxygen flow rate, respectively.

Figure 61:
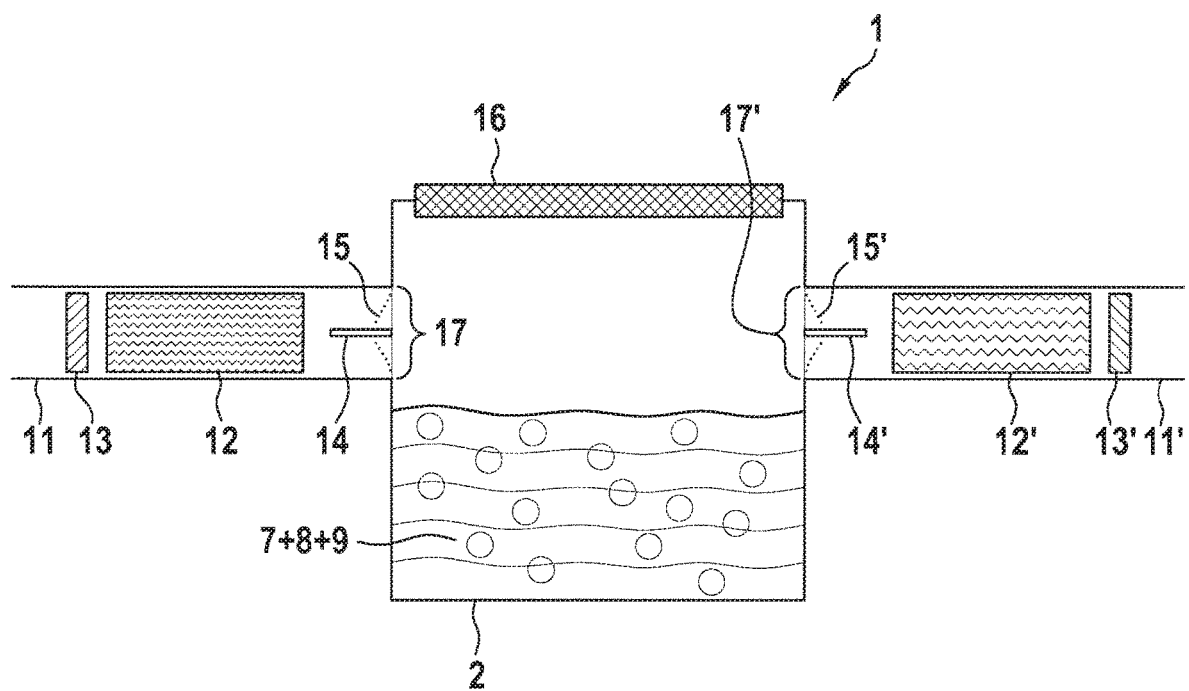
FIG. 61 is a sectional view of another embodiment of a device for generating oxygen according to this invention.

An alternative exemplary device for generating oxygen in a controlled manner is illustrated in FIG. 61. In FIG. 61 the same reference numerals as in FIG. 60 are used for designating components which correspond to components already illustrated in FIG. 60.

The device illustrated in FIG. 61 is suitable for use with acidic ionic liquids. In the illustrated embodiment, reaction chamber 2 contains a mixture of acidic ionic liquid 8, oxygen source 7 and decomposition catalyst 9, for example pellets comprising a peroxide/catalyst mixture dispersed within the ionic liquid. Of course, the acidic ionic liquid, the oxygen source and the catalyst may be provided in any different manner, for example in the form of a dispersion of oxygen source powder in a solution of the catalyst within the ionic liquid.

The exemplary device illustrated in FIG. 61 is equipped with two injection devices 11, 11', which are identical to the injection devices 11, 11' of the device illustrated in FIG. 60. Injection device 11 contains an acidic compound, and injection device 11' contains a basic compound. Injection device 11 may be omitted. An oxygen generating device 1 having only injection device 11' allows to start the peroxide decomposition reaction by destroying receptacle 12' and injecting the basic compound through opening 17' into reaction chamber 2. The peroxide decomposition reaction will then proceed until all peroxide compound has been decomposed, and the oxygen generated by the composition reaction will leave reaction chamber 2 through gas permeable membrane 16.

A device for generating oxygen in a controlled manner needs at least one further injection device, for example injection device 11 containing an acidic compound, as illustrated in FIG. 61. Injecting the acidic compound contained in injection device 11 into reaction chamber 2 allows to decelerate the peroxide decomposition reaction and to reduce a too high oxygen flow rate.

In alternative embodiments, the oxygen generating device illustrated in FIG. 61 may be provided with one or more additional injection devices containing basic compounds and/or with one or more additional injection devices containing acidic compounds. Such additional injection devices allow to increase or decrease the oxygen production rate, respectively, or to stop and restart the oxygen production several times.

The oxygen produced according to this invention is pure and at a low temperature and, therefore, ideal for applications in airplanes, in self-rescuers and in rebreathers for human breathing. However, the use for technical purposes such as in portable welding devices in mining and submarine applications, and in spaceflight, e.g. in control nozzles is also contemplated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method for controlling the oxygen production rate of an oxygen generating composition, the method comprising:
providing an oxygen source, providing an ionic liquid, and providing a metal oxide compound and/or a metal salt;
generating oxygen gas for human breathing by contacting the oxygen source, the ionic liquid and the metal oxide compound and/or the metal salt; and
modifying the oxygen production rate by selectively adding an acidic compound and/or a basic compound to the oxygen source, the ionic liquid, and the metal oxide compound and/or the metal salt;
or,
if the ionic liquid is an acidic compound or contains an acidic compound:
providing an oxygen source, providing the ionic liquid, providing a metal oxide compound and/or a metal salt, and providing a basic compound;
generating oxygen gas for human breathing by contacting the oxygen source, the ionic liquid, the metal oxide compound and/or the metal salt and the basic compound and, optionally, modifying the oxygen production rate by adding a further acidic compound and/or a further basic compound to the oxygen source, the ionic liquid, the metal oxide compound and/or the metal salt, and the basic compound;
wherein
the oxygen source comprises a peroxide compound;
the ionic liquid is in the liquid state at least in a temperature range from −10° C. to +50° C.;
the metal oxide compound is an oxide of a single metal or of two or more different metals selected from the metals of groups 2 to 14 of the periodic table of the elements; and
the metal salt has a single metal or two or more different metals, and one or both of an organic anion and/or an inorganic anion.

2. The method according to claim 1, wherein the step of modifying the oxygen production rate comprises decelerating or stopping the oxygen production by adding an acidic compound or a further acidic compound, once or multiple times.

3. The method according to claim 1, wherein the step of modifying the oxygen production rate comprises accelerating or restarting the oxygen production by adding a basic compound or a further basic compound, once or multiple times.

4. The method according to claim 1, wherein the step of modifying the oxygen production rate comprises decelerating or interrupting the oxygen production by adding an acidic compound or a further acidic compound and, after a desired time interval, accelerating or restarting the oxygen production by adding a basic compound or a further basic compound, once or multiple times.

5. An oxygen generator, comprising:
an oxygen source, an ionic liquid, and a metal oxide compound and/or a metal salt;
said oxygen source, said ionic liquid, said metal oxide compound or metal salt, upon coming into contact with one another, forming a composition for generating oxygen for human breathing;
an acidic compound for selectively decreasing a rate of reaction of the composition for generating oxygen and a basic compound for selectively initiating or increasing the rate of reaction for generating oxygen;
wherein:
the oxygen source is a peroxide compound;
the ionic liquid is in the liquid state in a temperature range from −10° C. to +50° C.;

the metal oxide compound is an oxide of a single metal or of two or more different metals selected from the metals of groups 2 to 14 of the periodic table of the elements; and the metal salt includes a single metal or two or more different metals, and one or both of an organic anion and an inorganic anion.

6. An oxygen generator, comprising:

an oxygen source, an ionic liquid, a metal oxide compound and/or a metal salt, and a basic compound, and, optionally, an acidic compound;

the oxygen source, the ionic liquid, the metal oxide compound or metal salt, and the optional acidic compound, upon coming into contact with one another, forming a composition for generating oxygen for human breathing;

wherein:

the ionic liquid is an acidic compound or contains an acidic compound;

the oxygen source is a peroxide compound;

the ionic liquid is in the liquid state in a temperature range from −10° C. to +50° C.;

the metal oxide compound is an oxide of a single metal or of two or more different metals selected from the metals of groups 2 to 14 of the periodic table of the elements; and the metal salt includes a single metal or two or more different metals, and one or both of an organic anion and an inorganic anion.

7. The oxygen generator according to claim 6, wherein the oxygen source is selected from the group consisting of alkali metal percarbonates, alkali metal perborates, urea hydrogen peroxide, and mixtures thereof.

8. The oxygen generator according to claim 6, wherein the ionic liquid is at least one salt having a cation and an anion, wherein the cation is selected from the group consisting of imidazolium, pyrrolidinium, ammonium, pyridinium, pyrazolium, piperidinium, phosphonium, and sulfonium cations and/or wherein the anion is selected from the group consisting of dimethylphosphate, methylsulfate, ethylsulfate, trifluoromethylsulfonate, bis(trifluoromethylsulfonyl)imide, chloride, bromide, iodide, tetrafluoroborate, hexafluorophosphate, acetate, and but-3-enoate.

9. The oxygen generator according to claim 6, wherein the metal oxide compound is selected from the group consisting of $MnO_2$, $Co_3O_4$, $CrO_3$, $Ag_2O$, $CuO$, $Fe_3O_4$ and $PbO_2$, or is selected from the group consisting of mixed cobalt iron oxides, mixed copper iron oxides, mixed nickel iron oxides, mixed manganese iron oxides, mixed copper manganese oxides, mixed cobalt manganese oxides, mixed nickel manganese oxides, mixed nickel cobalt oxides, mixed lanthanum iron nickel oxides, mixed lanthanum strontium manganese oxides, and mixtures thereof.

10. The oxygen generator according to claim 6, wherein the metal salt comprises at least one cation selected from the group consisting of vanadium, chromium, manganese, iron, cobalt, copper, molybdenum, ruthenium, iridium, and lead.

11. The oxygen generator according to claim 6, wherein the acidic compound is selected from the group consisting of inorganic acids, organic acids, acidic salts, and ionic liquids having acidic functionality.

12. The oxygen generator according to claim 6, wherein the acidic compound is selected from the group consisting of hydrochloric acid, sulphuric acid, nitric acid, phosphoric acid, acetic acid, succinic acid, citric acid, benzoic acid, sodium hydrogen sulfate, monopotassium phosphate, 1-ethyl-3-methylimidazolium hydrogen sulfate, trimethylammonium propanesulfonic acid hydrogen sulfate, 1-(4-sulfobutyl)-3-methylimidazolium hydrogen sulfate, and diethylmethylammonium methanesulfonate.

13. The oxygen generator according to claim 6, wherein the basic compound is selected from the group consisting of hydroxides, basic oxides, basic salts, and ionic liquids having basic properties.

14. The oxygen generator according to claim 6, wherein the basic compound is selected from the group consisting of sodium hydroxide, potassium hydroxide, potassium phosphate, sodium acetate, sodium percarbonate, potassium carbonate, calcium hydroxide, calcium oxide, 1-ethyl-3-methylimidazolium acetate, tetrabutylammonium arginine, and tetraethyl-ammonium but-3-enoate.

15. The oxygen generator according to claim 6, wherein the acidic compound is provided in a form selected from the group consisting of a solid form, the form of a solution or dispersion, and the form of a pure liquid substance, and/or wherein the basic compound or the further basic compound is provided in a form selected from the group consisting of a solid form, the form of a solution or dispersion, and the form of a pure liquid substance.

16. The oxygen generator according to claim 5, wherein the oxygen source is selected from the group consisting of alkali metal percarbonates, alkali metal perborates, urea hydrogen peroxide, and mixtures thereof.

17. The oxygen generator according to claim 5, wherein the ionic liquid is at least one salt having a cation and an anion, wherein the cation is selected from the group consisting of imidazolium, pyrrolidinium, ammonium, pyridinium, pyrazolium, piperidinium, phosphonium, and sulfonium cations and/or wherein the anion is selected from the group consisting of dimethylphosphate, methylsulfate, ethylsulfate, trifluoromethylsulfonate, bis(trifluoromethylsulfonyl)imide, chloride, bromide, iodide, tetrafluoroborate, hexafluorophosphate, acetate, and but-3-enoate.

18. The oxygen generator according to claim 5, wherein the metal oxide compound is selected from the group consisting of $MnO_2$, $Co_3O_4$, $CrO_3$, $Ag_2O$, $CuO$, $Fe_3O_4$ and $PbO_2$, or is selected from the group consisting of mixed cobalt iron oxides, mixed copper iron oxides, mixed nickel iron oxides, mixed manganese iron oxides, mixed copper manganese oxides, mixed cobalt manganese oxides, mixed nickel manganese oxides, mixed nickel cobalt oxides, mixed lanthanum iron nickel oxides, mixed lanthanum strontium manganese oxides, and mixtures thereof.

19. The oxygen generator according to claim 5, wherein the metal salt comprises at least one cation selected from the group consisting of vanadium, chromium, manganese, iron, cobalt, copper, molybdenum, ruthenium, iridium, and lead.

20. The oxygen generator according to claim 5, wherein the acidic compound is selected from the group consisting of inorganic acids, organic acids, acidic salts, and ionic liquids having acidic functionality.

21. The oxygen generator according to claim 5, wherein the acidic compound is selected from the group consisting of hydrochloric acid, sulphuric acid, nitric acid, phosphoric acid, acetic acid, succinic acid, citric acid, benzoic acid, sodium hydrogen sulfate, monopotassium phosphate, 1-ethyl-3-methylimidazolium hydrogen sulfate, trimethylammonium propanesulfonic acid hydrogen sulfate, 1-(4-sulfobutyl)-3-methylimidazolium hydrogen sulfate, and diethylmethylammonium methanesulfonate.

22. The oxygen generator according to claim 5, wherein the basic compound is selected from the group consisting of hydroxides, basic oxides, basic salts, and ionic liquids having basic properties.

23. The oxygen generator according to claim 5, wherein the basic compound is selected from the group consisting of sodium hydroxide, potassium hydroxide, potassium phosphate, sodium acetate, sodium percarbonate, potassium carbonate, calcium hydroxide, calcium oxide, 1-ethyl-3-methylimidazolium acetate, tetrabutylammonium arginine, and tetraethyl-ammonium but-3-enoate.

24. The oxygen generator according to claim 5, wherein the acidic compound is provided in a form selected from the group consisting of a solid form, the form of a solution or dispersion, and the form of a pure liquid substance, and/or wherein the basic compound or the further basic compound is provided in a form selected from the group consisting of a solid form, the form of a solution or dispersion, and the form of a pure liquid substance.

* * * * *